United States Patent [19]
Beale

[11] Patent Number: 6,155,772
[45] Date of Patent: Dec. 5, 2000

[54] LIFT-LINER APPARATUS WITH IMPROVED WEIGHT-CARRYING CAPACITY

[76] Inventor: Aldon Evans Beale, 352 Southshore Dr., Greenback, Tenn. 37742

[21] Appl. No.: 09/176,441

[22] Filed: Oct. 21, 1998

Related U.S. Application Data

[63] Continuation-in-part of application No. 08/971,051, Nov. 14, 1997.

[51] Int. Cl.$^7$ ........................................................ B66C 1/12
[52] U.S. Cl. .................... 414/607; 414/592; 294/68.1; 294/68.3; 294/74; 383/18; 383/24; 383/98; 383/99; 383/117
[58] Field of Search ................................. 414/608, 607, 414/422, 592; 220/23.91; 383/24, 113, 98, 99, 18, 117; 294/75, 81.56, 68.3, 68.21, 68.1, 74, 77

[56] References Cited

U.S. PATENT DOCUMENTS

| | | | |
|---|---|---|---|
| 525,951 | 9/1894 | Flaniken | 294/75 |
| 2,555,031 | 5/1951 | Fox et al. | 383/113 |
| 3,674,073 | 7/1972 | Hendon | 383/18 |
| 4,113,146 | 9/1978 | Williamson | 294/75 |
| 4,224,970 | 9/1980 | Williamson et al. | 383/18 |
| 4,493,109 | 1/1985 | Nattrass | 383/24 |
| 4,564,161 | 1/1986 | Frye | 294/68.3 |
| 4,730,942 | 3/1988 | Fulcher | 383/18 |
| 4,792,171 | 12/1988 | Lamy | 414/608 |
| 4,969,750 | 11/1990 | Russo et al. | 383/113 |
| 5,066,597 | 11/1991 | Stinson et al. | 383/113 |
| 5,108,196 | 4/1992 | Hughes | 383/117 |
| 5,269,579 | 12/1993 | DeCrane | 294/75 |
| 5,810,478 | 9/1998 | LaFleur | 383/24 |
| 5,860,525 | 1/1999 | Bellehchili | 383/18 |
| 5,934,807 | 8/1999 | Futerman | 383/105 |
| 5,967,579 | 10/1999 | Hebert | 294/74 |

*Primary Examiner*—Douglas Hess
*Attorney, Agent, or Firm*—C. E. Martine, Jr.

[57] ABSTRACT

A system provides a lift-liner for efficient transport of units of bulk cargo (especially bulk cargo that is radioactive hazardous material waste), and economical disposal of the lift-liner for storage of the waste therein. The cargo is transported in the lift-liner from a remediation site to a railroad siding, during transport on a railroad gondola car, from the gondola car to a waste storage site, and within such storage site to a storage cell, in which the lift-liner and the waste therein are placed. The units are defined by the lift-liner, which is capable of containing up to about twelve tons of the waste. A container of the lift-liner is provided with at least five straps connected to two opposite walls, and four straps connected to two other opposite walls, and a bottom between corners of the container. Collectively, the straps may receive up to about twelve tons of vertical lifting force from a lift grid having a connector vertically above and aligned with each strap. The straps assist the container in containing the waste and apply vertical forces to the walls and to the bottom to lift the container. Embodiments of the lift-liner are provided for waste in the form of contaminated dirt, and for contaminated demolition materials. Flaps at the top of the container are provided with loops and webs to facilitate defining tucks as the flaps are pulled across the open top of the container, and for tying the flaps securely closed.

18 Claims, 47 Drawing Sheets

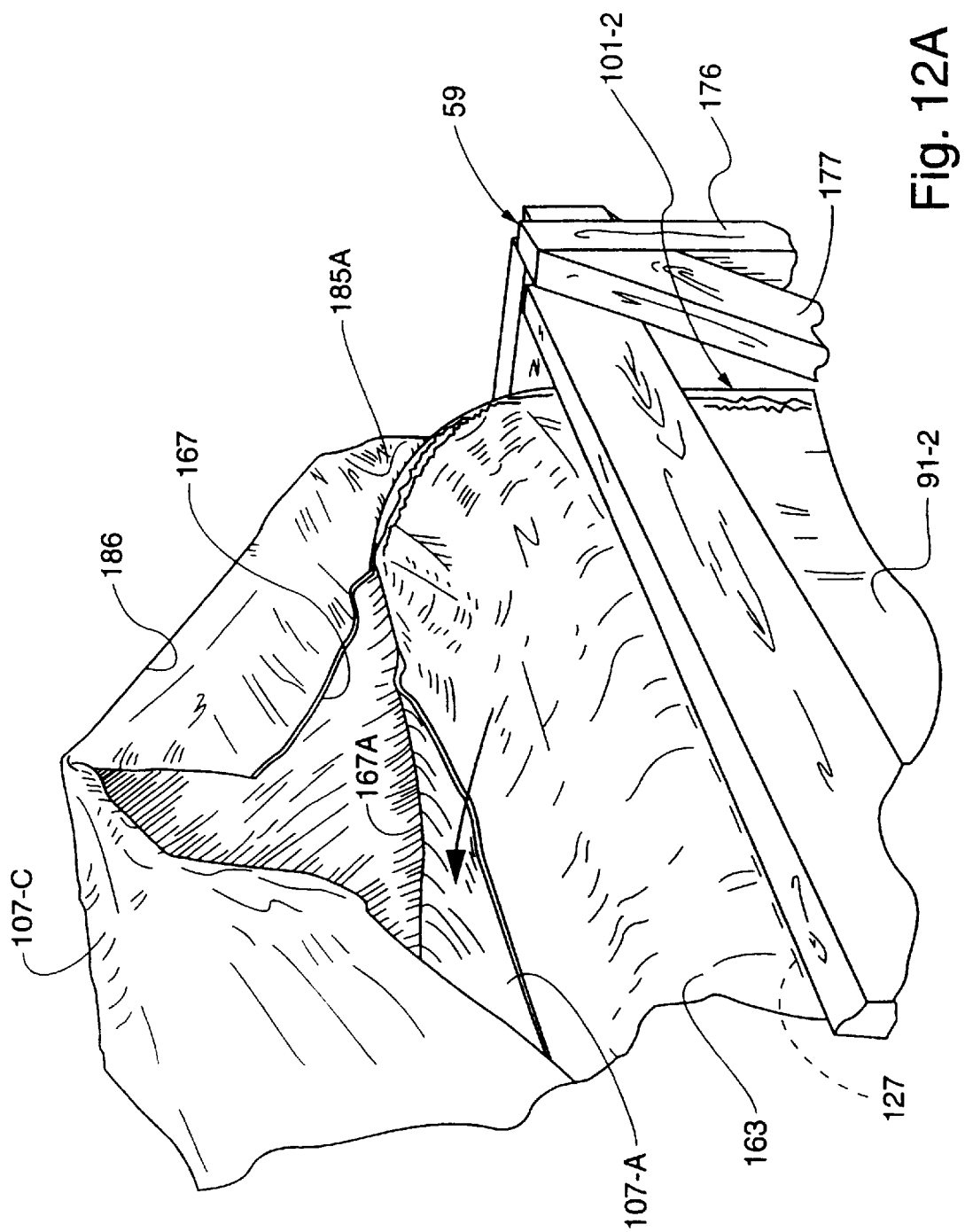

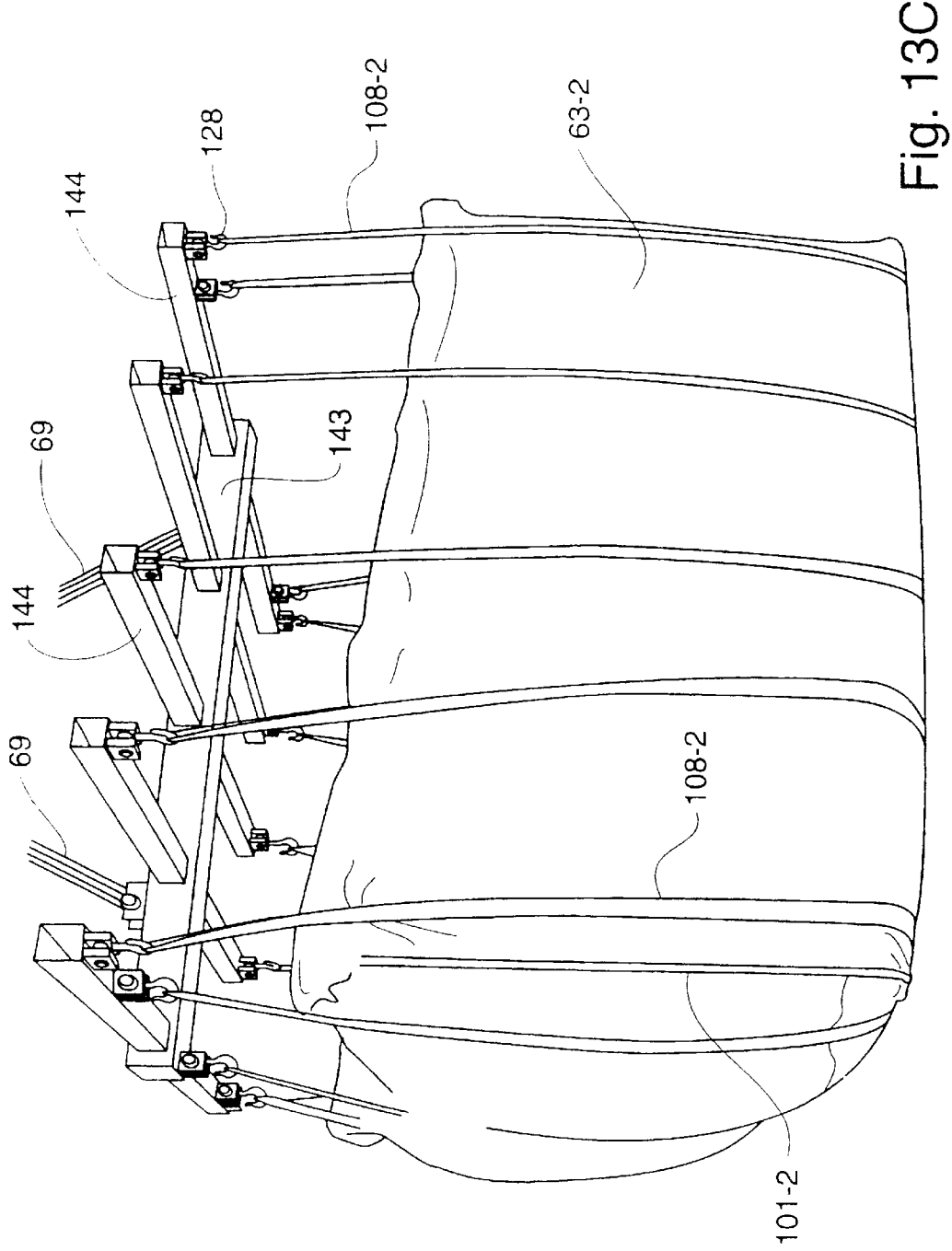

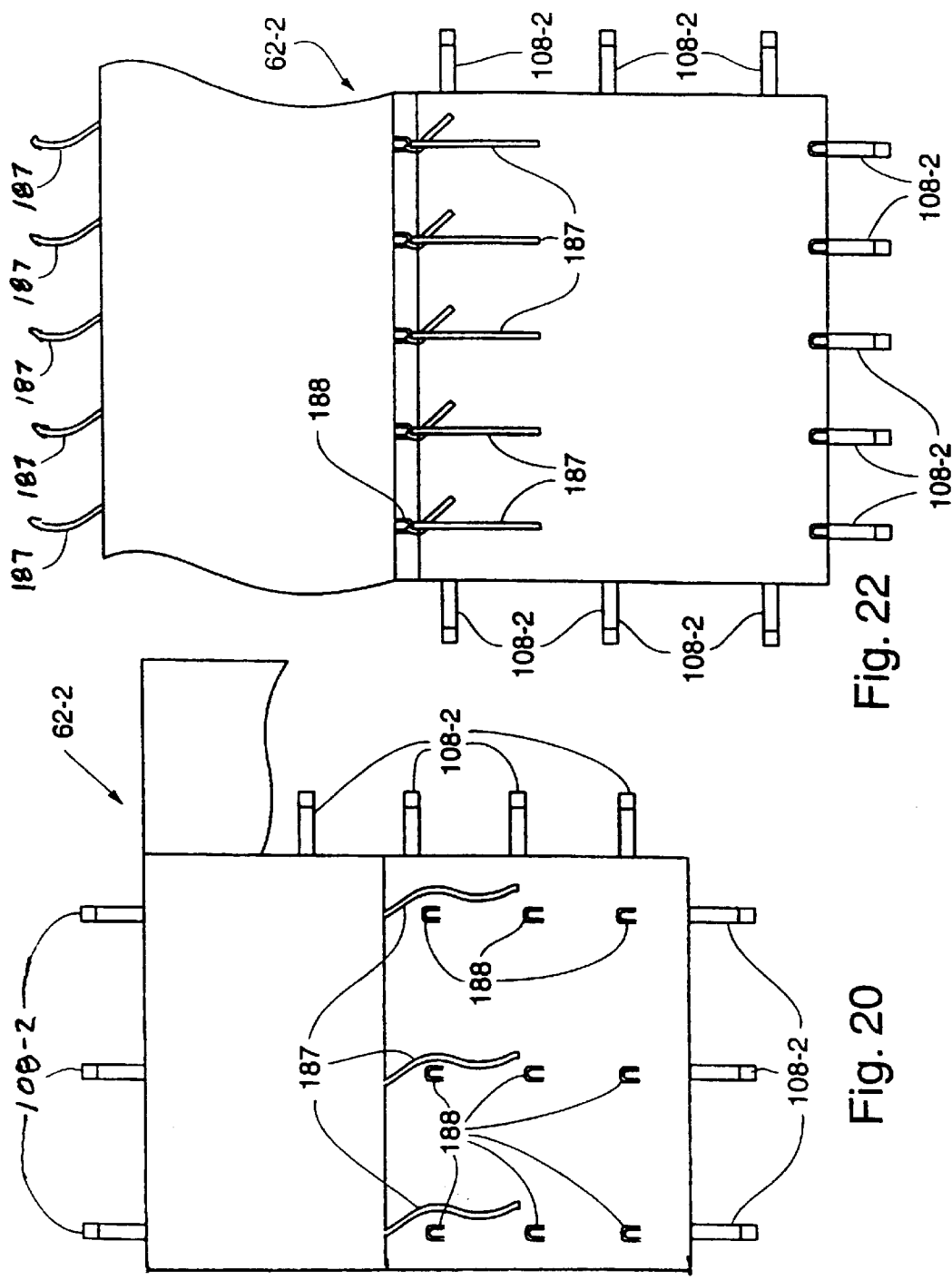

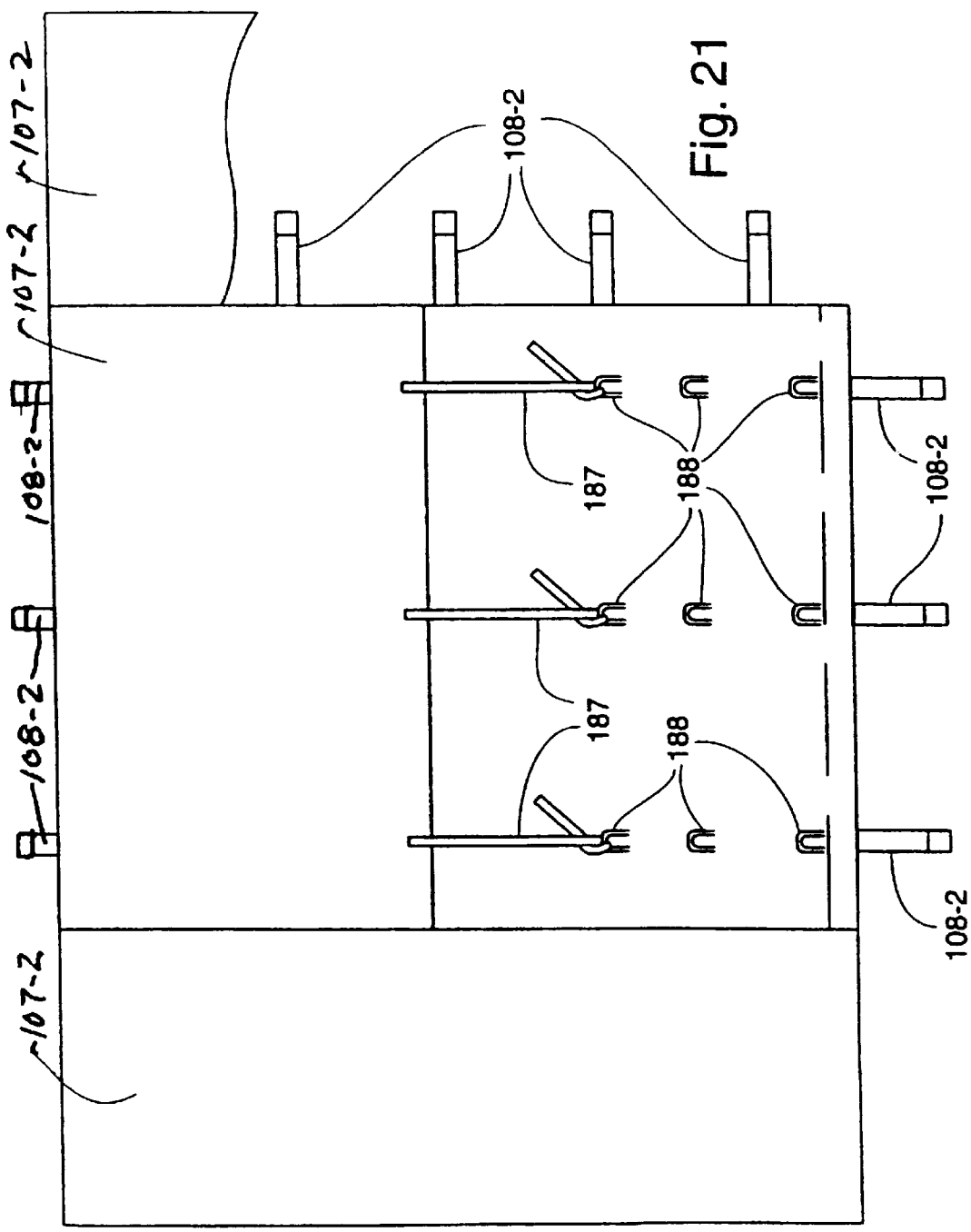

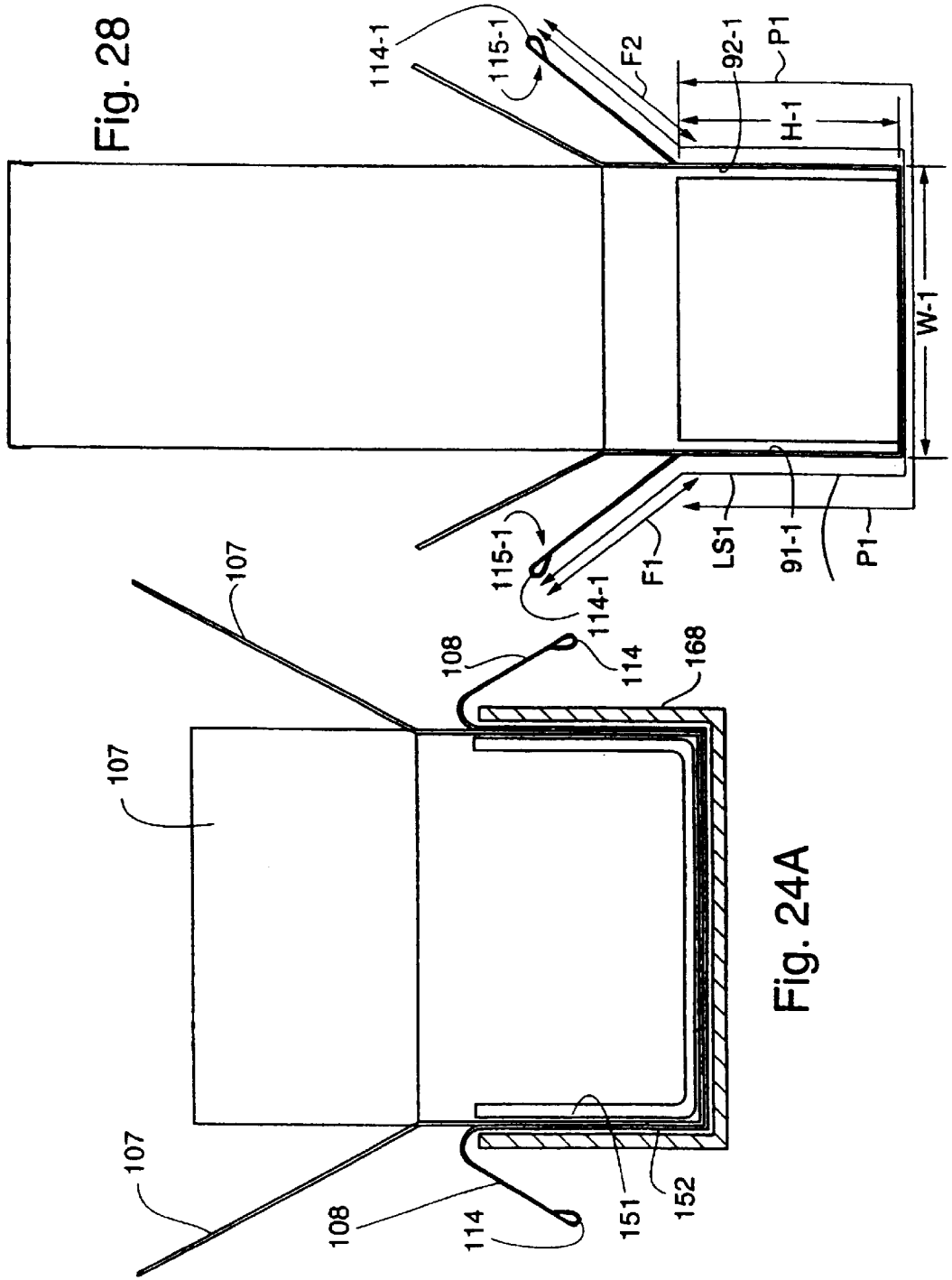

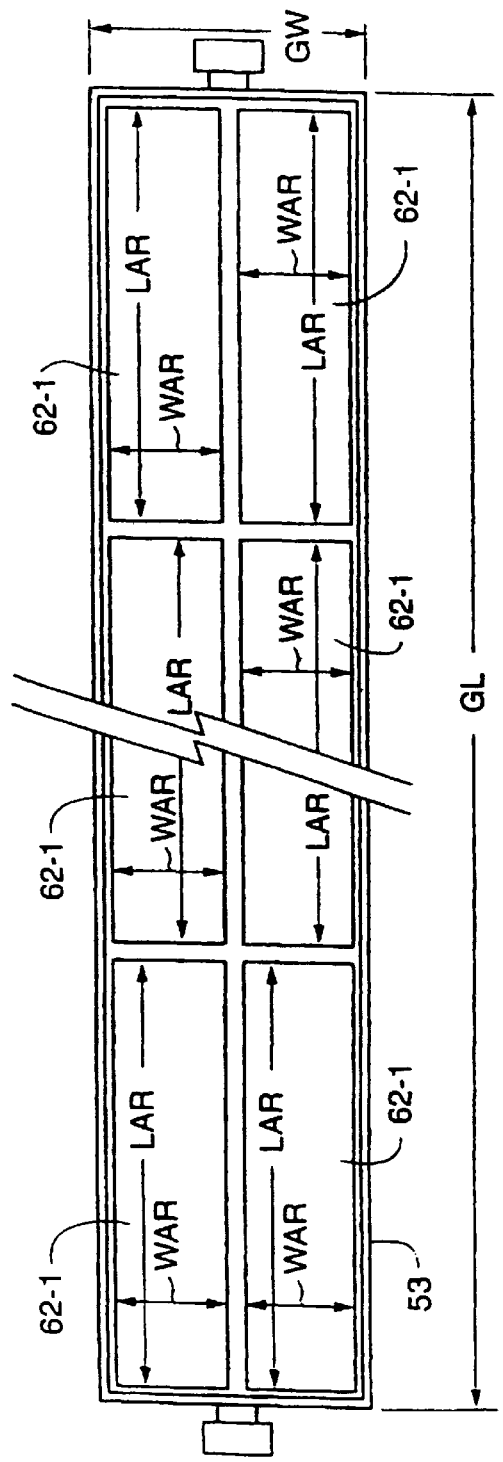
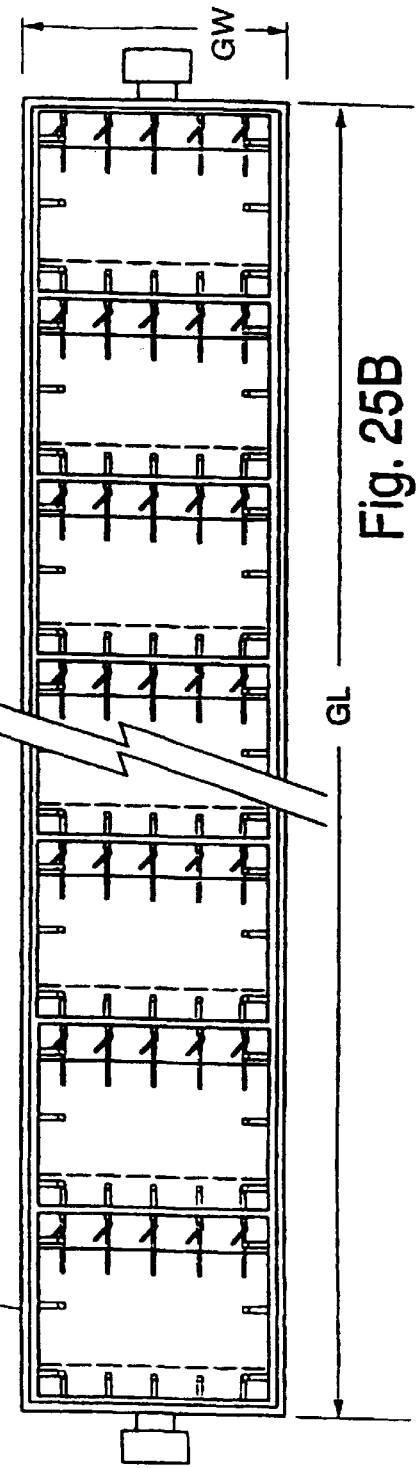

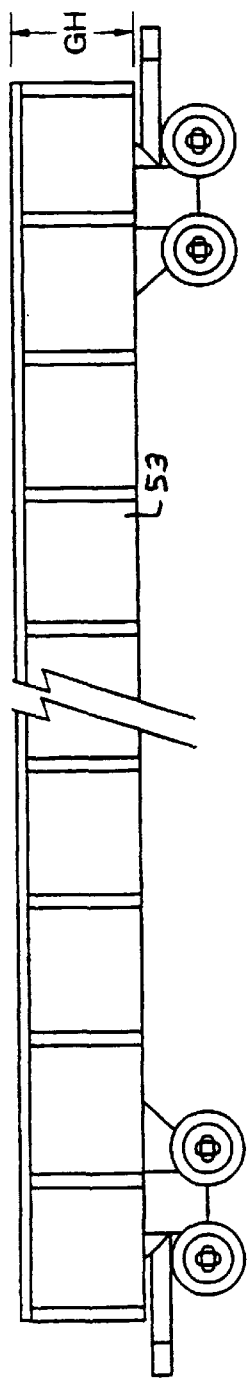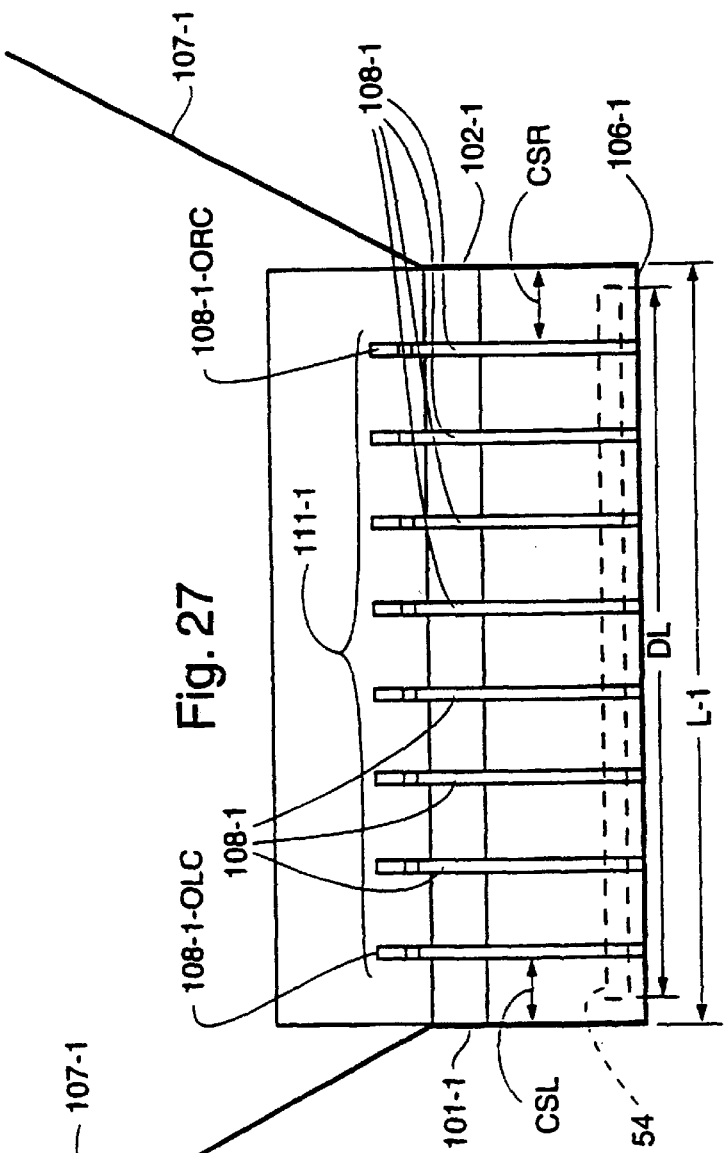

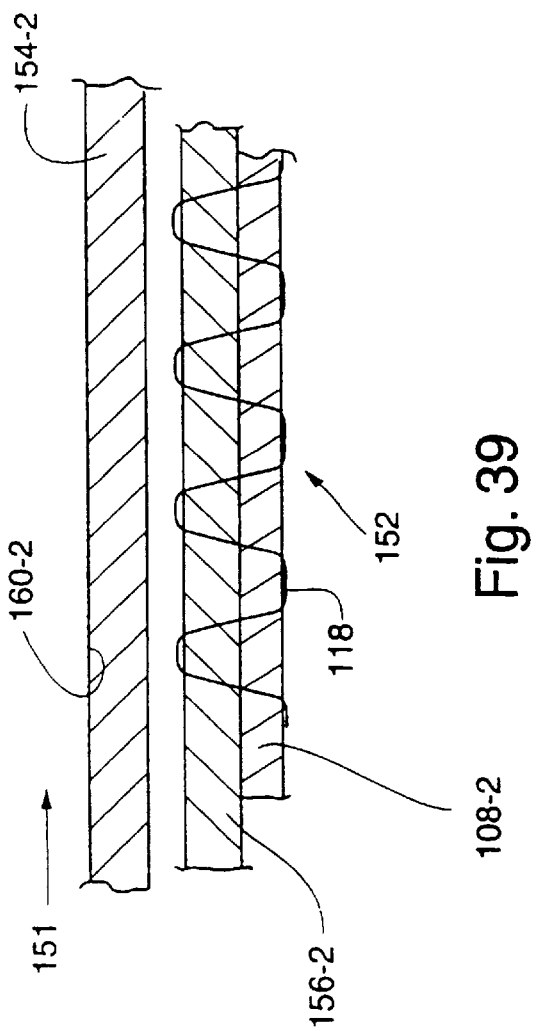
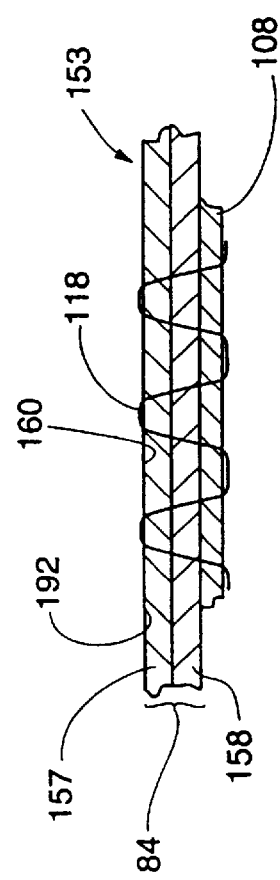
Fig. 39
Fig. 30

FIG. 33A

STEP 201: provide the bulk cargo unit container 63 defining the 3 dimensional enclosure 87 having the open top 88, the plurality of opposite walls 91 through 94, and the bottom 106; the container 63 defining a volume sufficient to contain in excess of three tons of the bulk cargo 51.

STEP 202: provide the lifter 64 with the plurality of the straps 108 extending in the continuous paths P1 along and secured to one of the opposite walls and in the continuous path P1 along and secured to the bottom 106 and in the continuous path P1 along and secured to another of the opposite walls.

FIG.33B

STEP 203: place the bottom 106 of the container 63 on the support surface 116.

STEP 204: load into the open top 88 of the container 63 the unit 52 of bulk cargo 51 having the weight in excess of three tons, and close the open top 88.

STEP 205: apply forces 74 to the straps 108 substantially in a vertical direction and collectively sufficient to lift the container 63, and the bulk cargo 51 having a contained weight in excess of three tons, off the surface 116.

STEP 206: provide two separate sets 111 and 112 of the straps 108, one set 111 on the first and second walls 91 and 92, respectively, and across the bottom 106; and the second set 112 on the third and fourth walls 93 and 94, respectively, and across the bottom 106.

The straps 108 of the first set 111 and of the second set 112 each cross the bottom 106 and intersect at right angles with respect to each other to form the grid 119 and the uniform areas A-3.

FIG. 34

STEP 211: provide the overhead lift device 57 that applies the vertical force components 72.

STEP 212: provide a bulk cargo unit container 63 in the form of the flexible container 63 made from the sheet-like material 84 that defines the three dimensional enclosure 87 having the open top 88 (with the flaps 107), the plurality of opposite walls 91 through 94, and the bottom 106; such container 63 defining a volume sufficient to contain in excess of three tons of the bulk cargo 51.

STEP 213: provide the container 63 with the straps 108, each of the straps 108 extending in the continuous path P1 along and secured to the opposite walls 91 and 92 and to the bottom 106; the continuous paths P1 of each of the straps 108 being in such number and being made from the material 132 to enable the straps 108 to collectively apply to the container 63 more than six thousand pounds of the vertical forces 74.

STEP 214: divide the vertical lifting force of the force components 72 into a plurality of the substantially vertical upward forces 74.

STEP 215: simultaneously apply the vertical upward forces 74 to the straps 108.

FIG. 35

STEP 221: divide the bulk cargo 51 into a plurality of units 52 each having a unit width dimension that varies from an "at-rest" width WAR having a value about equal to one-half of a given width GW of a gondola car, to a "lifted-width" WL having a value less than about one-half of a given width GW of the gondola car; the units having a unit length dimension which is a fraction of the given length GL and varying from an "at-rest" length LAR having a value greater than the value of a "lifted" length LL to a "lifted-length" LL having a value less than about one-half of the given length GL of the gondola car.

STEP 222: lift a first of the units 52 to provide the unit with the lifted width WL and lifted length LL dimensions.

STEP 223: place the lifted unit 52 in the gondola car 53 with the lifted length LL parallel to the direction of travel T and the lifted width WL transverse to such direction T.

STEP 224: repeat the lifting step 222 and the placing step 223 to load other units in the gondola car.

FIG.36

STEP 231: divide the bulk cargo 51 into a plurality of the units 52 having a unit length that varies from an "at-rest" length LAR (having a value about equal to the given width GW) to a "lifted-length" LL having a value less than the given width GW of the gondola car 53; the units 52 having a unit width dimension which is a fraction of the given length GL; the unit width varying from an "at-rest" width WAR having a value greater than the value of the "lifted" width LL.

STEP 232: lift a first of the units 52 to provide the unit 51 with the lifted width WL and lifted length LL dimensions.

STEP 233: place the lifted unit 52 in the gondola car 53 with the lifted length LL transverse to the direction of travel T and the lifted width parallel to such direction T.

STEP 234: repeat the respective lifting and placing STEPS 232 and 233 with respect to all of the other units 52 of the plurality of units to load the gondola car 53.

LIFT-LINER APPARATUS WITH IMPROVED WEIGHT-CARRYING CAPACITY

RELATED APPLICATION

This application is a continuation-in-part application based on parent application Ser. No. 08/971,051 filed Nov. 14, 1997, by Aldon E. Beale for Lift-Liner Apparatus and Methods Relating To Lift-Liner Apparatus.

FIELD OF THE INVENTION

This invention relates to methods of and apparatus for transporting bulk cargo in a unit, and more particularly to a securely closable container for receiving hazardous material waste of significant weight and volume while the container is at rest on a support surface, and containing such hazardous material waste as forces are applied to the container to lift the container from such surface and place such container on another surface for transport or on a final surface for storage (if the hazardous material waste therein is radioactive), or disposal (if the hazardous material waste therein is not radioactive, for example); wherein the methods lift the container by applying vertical forces to straps secured to the container between the corners of the container to lift a unit of bulk cargo having significant weight and volume, and fabricate the container for lifting such units of bulk cargo having significant weight and volume, and efficiently fill a railroad gondola car with such units of the bulk cargo.

BACKGROUND OF THE INVENTION

Transport of Cargo

Methods of and apparatus for transporting cargo (or goods) are as varied as the cargo that is transported. Transporting (or transport) involves moving one or more items of the cargo from one place (point of origin) to another place (destination point). The cargo may be said to be "shipped" or "transported" from the point of origin to the destination point.

Transport of Bulk Cargo

When the items of the cargo are loose, such items are not contained for transport by other than the walls or the bottom or the top of the transport vehicle (e.g., a railroad car or a truck) that is used for the transport. Thus, the loose items are not in packages or boxes when they are transported. Such loose cargo is said to be transported "in bulk", and may be referred to as "bulk cargo" or as "bulk goods".

Transport of Bulk Cargo That is Hazardous Material Waste or Radioactive Hazardous Material Waste There are regulations controlling many forms of transport. For normal bulk cargo, such as plastic pellets for extruding machines or bulk foodstuffs, the regulations are relatively simple, as compared to regulations controlling the transport of hazardous material waste. Such hazardous material waste may include waste generated during manufacturing operations, such as toxic chemicals, or waste resulting from discarding a product after use, e.g., polychlorinatedbiphenols ("PCBs") which were in electrical transformers. Although such toxic chemicals and PCBs, for example, are closely regulated at the state and Federal levels, hazardous material waste that is radioactive or that is nuclear waste ("radioactive hazardous material waste") is even more closely regulated. Such radioactive hazardous material waste includes materials resulting from the manufacture of weapons (e.g., radioactive dirt) and radioactively contaminated demolition debris (e.g., building materials, concrete pillars and beams and scrap steel found, for example, at sites which are being dismantled). These materials are forms of bulk cargo.

The radioactive hazardous material waste may include radioactive materials that meet criteria as "low level radioactive" radioactive hazardous material waste, which has a radioactivity of two picoCuries. Such control of radioactive hazardous material waste includes:

(i) complete accountability and documentation for every pound of radioactive hazardous material waste;

(ii) state licensing of certain containers in which radioactive hazardous material waste is transported, e.g., licensing of intermodal containers ("IMCs"), which includes documenting the transport of such IMCs;

(iii) Federal, local, and state control of movement of radioactive hazardous material waste at or from a site at which the radioactive hazardous material waste was generated (the "remediation site");

(iv) requirements that containers in which radioactive hazardous material waste is transported either not become contaminated with the radioactive hazardous material waste, or that such contaminated containers be decontaminated after use;

(v) prohibitions against transferring loose (uncontained) radioactive hazardous material waste from one transport container to another, for example, and requiring the radioactive hazardous material waste to be contained within a licensed container prior to and during transfer from one transport vehicle to the next transport vehicle;

(vi) establishing "exclusionary zones" at sites at which radioactive hazardous material waste is located, defining personal protection levels (PPLs) which vary according to the level of radioactivity of the radioactive hazardous material waste, and requiring that personnel who enter such "exclusionary zones" wear clothing suitable for protecting against injury from the radioactive hazardous material waste (they must be "suited up") according to the applicable PPL; and (vii) prohibitions against allowing loose liquid ("free liquid") from being transported in other than a special tank car (whether via railroad or truck); for example.

These and other Federal, local, and state regulations place on the transporter of radioactive hazardous material waste numerous restrictions with which the transporter must comply in transporting the radioactive hazardous material waste. If the point of origin (the remediation site, for example) does not have a railroad spur on-site (i.e., if it is not "rail-served"), such transporting can be "intermodal", such as via truck (one mode) from the remediation site (the point of origin) to a nearby railroad for long-distance railroad transport (another mode) to the destination point. If the destination point is not rail-served and the licensed container is an intermodal container ("IMC"), for example, the railroad delivers the licensed IMC (which contains radioactive hazardous material waste) to an intermodal railyard near the destination point. At the intermodal railyard, such licensed IMC is taken off the railroad car and put on a truck, for example, for further transport to the destination point, e.g., a storage site for the radioactive hazardous material waste. Such IMC may be moved within the storage site to a "cell" to which the radioactive hazardous material waste from the particular point of origin is assigned for storage.

The radioactive hazardous material waste is said to be "stored" because the radioactive materials of such hazardous material waste do not decompose in the manner of other hazardous material waste, due to the very long half-life of radioactive materials. Hazardous material waste that does not contain radioactive materials is said to be "disposed of", or put into a landfill for "disposal", because it decomposes over a relatively short time period, e.g., a few years.

Strong Tight Containers For Transport

From the standpoint of the licensed container or the railroad car or the other vehicle that is used for the transport of the radioactive hazardous material waste, the transporter must provide a "strong, tight container" ("STC") in which the radioactive hazardous material waste is contained during every aspect of such transport. Use of such STCs is intended to avoid spilling the radioactive hazardous material waste on the ground during transport, for example, (which would result in creating another hazardous material waste site). Also to be avoided is mixing one load of radioactive hazardous material waste with another load of radioactive hazardous material waste. For example, if a licensed container has not been decontaminated after transporting a first load of one type of radioactive hazardous material waste before being loaded with a second load of another type of radioactive hazardous material waste, the mixing results in generating a new kind of radioactive hazardous material waste. As described below, the IMC and a related type of transport container, the "sea-land" container ("S/L IMC"), are types of transport containers that states require to be licensed as being suitable for the transport of any hazardous material waste, including radioactive hazardous material waste. On the other hand, as noted below, the standard railroad gondola car used with a suitable liner is exempt from state licensing and may be used on existing railroads for transporting hazardous material waste, including radioactive hazardous material waste.

Remediation Sites

To appreciate other aspects of the transport of hazardous material waste such as radioactive hazardous material waste, the regulatory aspects and characteristics of remediation sites must be understood. For example, the typical remediation site is generally not rail-served. The current cost of building a rail spur to a remediation site is prohibitive. Further, at this time, substantial amounts of the hazardous material waste at remediation sites, and most, if not all, of the radioactive hazardous material waste at remediation sites, must be removed from the site for either storage (for radioactive hazardous material waste) or processing to produce non-hazardous waste (for non-radioactive hazardous material waste). As an example, at the Department of Energy remediation site in Fernald, Ohio, there is so much radioactive hazardous material waste that it has been proposed to transport the radioactive hazardous material waste to a distant storage site using seventy car railroad trains. Since the storage facility in Utah noted below is the only radioactive hazardous material waste storage site in the United States which is rail-served and has rail car roll-over equipment, the volume of radioactive hazardous material waste and the current mode of transport place limitations on where the radioactive hazardous material waste from this remediation site in Ohio may be transported for storage. As another example, at the Department of Energy remediation site in Miamisburg, Ohio, there are millions of cubic feet of radioactive hazardous material waste, including such waste in the form of demolition debris to be transported to a distant storage site.

For a remediation site that is not rail-served, the hazardous material waste or radioactive hazardous material waste that is to be removed from the remediation site cannot be directly loaded into a railroad car, but instead must be transported from the remediation site (as the point of origin) via truck to a railroad line. For radioactive hazardous material waste, since regulation item (v) above prohibits transferring loose (uncontained) radioactive hazardous material waste from one transport container to another after the waste leaves the remediation site, the original loose hazardous material waste or radioactive hazardous material waste at the remediation site must be loaded directly into an STC for transport to the railroad.

Further limitations relating to such loading include the fact that many remediation sites that are not rail-served are very small relative to the room necessary for moving semi-trailer trucks, for example, into position for being loaded. Therefore, smaller tandem dump trucks are used at such smaller sites. At some remediation sites there is some room available for setting up many strong tight containers so that loading of the hazardous material waste into STCs can be done continuously. In this case, local roll off containers may be used. The roll off containers have a twenty by eight foot footprint and are rolled (pulled) onto a roll off truck from the narrow end. This requires fifty feet of distance perpendicular to the row of roll off containers for loading and driving the roll off truck away from the row of roll off containers.

Even if the remediation site is rail-served, it is frequently necessary to load semi-trailer trucks and carry the bulk cargo within the remediation site to the railroad car. In that case, one requires one hundred fifty feet of distance perpendicular to the railroad track to move the semi-trailer truck onto a ramp for dumping a load into the railroad car. This problem is increased by the fact that from four to five semi-trailer truck loads are required to fill one gondola car.

Sites For Disposal or Storage of Hazardous Material Waste

To appreciate other aspects of the transport of hazardous material waste, such as radioactive hazardous material waste, the regulatory aspects and characteristics of sites for disposal or storage of hazardous material waste must also be understood. Sites at which hazardous material waste is disposed of ("disposal site"), or at which radioactive hazardous material waste is stored ("storage site"), may be operated by or for the Federal government or be privately owned. The operators of such sites have their own regulations, and those regulations impact the type of container that may be used to transport the hazardous material waste or radioactive hazardous material waste to the site.

Idaho National Engineering and Environmental Laboratory (INEEL)

With respect to the storage of radioactive hazardous material waste, for example, INEEL in Idaho Falls, Id., is both a remediation site and stores radioactive hazardous material waste generated by INEEL. The INEEL site is not available for storage of radioactive hazardous material waste generated other than at INEEL. INEEL not only prohibits transferring loose radioactive hazardous material waste from one transport container to another at the storage site, but requires that such containers be capable of being stacked at least one on top of one other container. This stacking requirement means that one must be able to lift the container at the storage site and place the container in a stacked position.

Nevada Test Site

The Nevada Test Site in Mercury, Nevada is operated for the Federal government and accepts radioactive hazardous material waste, provided the radioactive hazardous material waste is not loose or uncontained as with true bulk cargo. Further, the Nevada Test Site is not rail-served. To avoid expensive, single mode, long distance transport of the radioactive hazardous material waste via truck from the remediation site to the Nevada Test Site, e.g., from the Miamisburg, Ohio remediation site, such transport must be intermodal. Long distance intermodal transport of radioactive hazardous material waste by rail involves use of the North Las Vegas "transload" facility. Such facility is not a true radioactive hazardous material waste "transload" facility in that true transload facilities allow bulk (uncontained) cargo to be unloaded from a gondola car, for example, as by an excavator hoe. As noted above, regulation item (v) prohibits such loose unloading of radioactive hazardous material waste. Rather, the North Las Vegas transload facility allows transfer from the railroad to trucks of units of bulk radioactive hazardous material waste in licensed containers.

Such regulation item (v), and local regulations, also mean that whatever the manner of transport of the radioactive hazardous material waste to the Nevada Test Site, the radioactive hazardous material waste must be in an STC that is capable of being moved upon arrival at the Nevada Test Site. Further, there is no decontamination facility at the Nevada Test Site. Without a decontamination facility, as one example, if a S/L IMC is the strong, tight container used to deliver the radioactive hazardous material waste to the Nevada Test Site, the S/L IMC itself must be "buried" at the Nevada Test Site to achieve storage of the radioactive hazardous material waste. The cost of the S/L IMCs themselves (noted below as $135.00 per cubic yard of radioactive hazardous material waste stored) makes the S/L IMC a very costly mode of storage. Without such decontamination facility, and to avoid burying such S/L IMCs which transport the radioactive hazardous material waste to the Nevada Test Site, the Nevada Test Site recently started accepting radioactive hazardous material waste that is wrapped in a non-liftable liner, called a "Burrito Wrap", sold by Transport Plastics, Inc., of Sweetwater, Tenn. The Burrito Wrap liner was designed to prevent contamination of the vehicle that is used to transport the radioactive hazardous material waste to the Nevada Test Site, so that without decontamination the vehicle may return to the remediation site for another load. However, the Burrito Wrap liner was designed to be transported only by a side dump truck which transports the radioactive hazardous material waste directly from the remediation site, and which carries the Burrito Wrap liner to the exact location within the Nevada Test Site at which the radioactive hazardous material waste is to be stored. At that location, the Burrito Wrap liner (and the radioactive hazardous material waste therein), are rolled out of the side dump truck. Although such Burrito Wrap liner is cost-effective (seven dollars per ton of radioactive hazardous material waste stored), because such Burrito Wrap liner cannot be lifted it cannot be used at the INEEL facility, for example. Since the side dump truck has a net load limit of 35,000 pounds, and since the side dump truck must return empty to the remediation site, it is too costly to use the Burrito Wraps and the side dump trucks for transport of radioactive hazardous material waste from far away places such as the Miamisburg, Ohio remediation site, for example.

It is also acceptable to store hazardous material waste and radioactive hazardous material waste at the Nevada Test Site if contained in drums, but the high cost of typical drums ($60.00 each) and the low capacity of each drum (less than one-third cubic yards) significantly increases the cost of storage using such drums.

The Nevada Test Site is an important site for storage of radioactive hazardous material waste because it has a very large capacity (e.g., one measured in millions of cubic yards), and only recently started to accept for storage bulk radioactive hazardous material waste in units such as that defined by the Burrito Wrap liners. Therefore, it is important to provide an efficient mode of transporting radioactive hazardous material waste to the Nevada Test Site.

Facility In Utah

There is a storage facility in Utah which is rail-served, and which is the only radioactive hazardous material waste storage site in the United States which, on arrival at the site, will work with true "bulk", low-level radioactive hazardous material waste. However, to comply with other regulations, an STC must be used for the transport to the site. For example, a load of very low level radioactive hazardous material waste that is wrapped in a non-liftable "Super Load Wrapper" liner sold by Transport Plastics, Inc., may be transported in a gondola car. Such Super Load Wrapper liner and gondola car together form the STC. At this Utah storage site, the Super Load Wrapper liner containing the load of radioactive hazardous material waste is rolled out of the gondola car as the gondola car is inverted (rolled over). However, the Super Load Wrapper liner must be rolled off directly into a receiving area below the inverted gondola car. An earth mover is used to move the Super Load Wrapper liner (or the now-loose radioactive hazardous material waste from the Super Load Wrapper) within the storage facility to the final "cell" in which the radioactive hazardous material waste is to be stored.

Alternatively, the STC may be provided as an IMC which is not lined to prevent contamination of the IMC. In this case, as noted above, because of the requirement that containers in which radioactive hazardous material waste is transported either not become contaminated with the radioactive hazardous material waste, or that such contaminated containers be decontaminated after use, the IMC must be decontaminated after use. As noted below, use of the decontaminated IMC inherently adds to total transport costs since the IMC must be returned empty to the remediation site. Such storage facility in Utah will also accept higher levels of radioactive hazardous material waste. Although this facility can invert gondola cars, it will also accept radioactive hazardous material waste in smaller units.

Liftable Containers

As a preface to describing liftable containers, it was noted above that certain liners, such as the Burrito Wrap liner and the Super Load Wrapper liner, may not be lifted. This is because such liners are designed to only line the container and passively contain the load therein, and not to be able to support the load therein as forces are applied to the liner to lift the liner and the load therein off a transport vehicle or the ground. Although those liners successfully perform those liner functions, in contrast to such liners the liftable containers described below not only contain a load, but forces may be applied to the liftable containers from above to cause the containers to lift the load contained therein. However, the prior liftable containers described below have significant disadvantages also described below, such that these liftable containers do not solve the problem of efficiently transporting materials such as hazardous material waste and radioactive hazardous material waste.

The IMC

The IMC is a sturdy heavy steel container having a size of about twenty two feet long by eight feet wide and five feet high. The IMC is not self-propelled (as is a truck). Instead, the IMC may be lifted onto a transport vehicle, e.g., by a crane or an IMC lift truck having a boom on the truck. For long distance transport, the IMC is lifted onto a railroad car. IMCs must, and have been, licensed by various states for use as an STC for transporting hazardous material waste or radioactive hazardous material waste. The IMC may be lined with a standard liner which keeps the hazardous material waste and radioactive hazardous material waste from contacting the inner walls of the IMC. Thus, the IMC does not become contaminated. Alternatively, the IMC may be used without such a liner at sites which have a decontamination facility, and must be decontaminated before leaving the storage site.

IMCs are generally leased at a price of about ten dollars per day, and on a long-term basis, such as monthly or annually. Thus, the lessee has the incentive to make the best use possible of every particular IMC. A particular IMC is generally leased for a specific job, i.e., for one remediation site, and is licensed at least by the state in which such remediation site is located. For ongoing operations, that licensed IMC is generally returned empty from the disposal site or the storage site to the remediation site. Therefore, even if that IMC would be better next used at another site, generally a particular licensed IMC is returned empty to the remediation site in the state that licensed such particular IMC.

The cost charged by a railroad for such empty return (on a special flat bed railroad car) is almost the same as the cost the railroad charges to transport the full IMC from the remediation site to the storage site. Also, the IMC does not collapse, such that the entire twenty-two foot by eight foot footprint is involved if the IMC is to be stored at the remediation site prior to reuse or stored at the waste storage site prior to such empty return.

Since it is unlikely that the destination point will be rail-served (except for the above-noted facility in Utah), an intermodal railyard must be available to transfer the IMC from the railroad car to an IMC truck. As noted, once the IMC arrives at the disposal site, or the storage site, if the storage site has regulations prohibiting the hazardous material waste in the IMC from becoming loose, some way has to be provided for the hazardous material waste or radioactive hazardous material waste in the IMC to be contained and moved to the appropriate cell for storage. The noted solution (burying the S/L IMC with the hazardous material waste or radioactive hazardous material waste) is a very costly solution because even a used S/L IMC costs about $135 per cubic yard of stored load.

Although the IMC may be used to carry the cargo the entire way from the point of origin (e.g., the remediation site) to the destination point (e.g., the storage site), the IMC requires a truck for an entire short transport, or a truck for transport from the point of origin to the railroad, from the railroad to the destination point, and a special railroad flat car for transport on the railroad. Further, the IMC requires the truck in each such case for the return to the point of origin of the next load. Also, in view of the large size of IMCs, for example, space may not be available to facilitate loading of IMCs at the remediation site. Finally, when the IMC is used to carry the cargo the entire way from the point of origin to the destination point, the entire round trip from the point of origin to the storage site and back to the point of origin may take up to five weeks, whereas the actual amount of time the IMC is being moved is much less. Thus the shipper needs to lease many extra IMCs to offset the number of IMCs in transit.

Roll Off Containers

Roll off containers are sturdy open top steel containers designed to be loaded while resting on the ground, and pulled from one narrow end onto rails of a roll off truck. The bed of the roll off containers is about twenty feet by eight feet. The roll off truck backs up to the narrow end of the roll off container and pulls the container onto the rails. Such containers are used for local, not long distance, transport, such as from a remediation site to a railroad siding, or within the remediation site. The walls of the roll off containers are about five feet high. For non-hazardous material waste, the waste is dumped into the roll off container from the ground.

Valve-Type Bag

A valve-type bag has been used to define a unit or a volume of bulk material such as plastic pellets or foodstuffs. The unit and volume are small in that this valve-type bag has a "footprint" of about three feet by three feet, a height of about forty inches and a rated (maximum) capacity of only about one ton. At the top, the three feet by three feet size provides an opening into which the bulk material is fed, e.g., from a hopper or chute. As described below, however, the three feet by three feet size opening does not allow the valve-type bag to be loaded by a front end loader. At the bottom of the valve-type bag a valve is provided for controlling the flow of the material out of such bag. The size of three feet by three feet, and the height of forty inches, provides the small volume of just more than one cubic yard.

To enable the valve-type bag to be lifted from above, straps are sewn to the outside of corners of the bag, with one strap sewn to each of the four corners of the bag. Each corner strap is sewn along a vertical line at which the strap overlaps only a short length of adjacent side walls of one corner of the bag. The overlap is about twelve to eighteen vertical inches. There is thus a vertical distance of about twenty-two to twenty-eight inches from the lower end of each corner strap to the bottom of the bag. No corner strap is provided or connected to the bag over that distance, nor on the bottom of the bag, nor on the side walls of the bag.

It is typical for a fork lift truck having two spaced lift bars to engage the straps. One such bar is used to engage two of the corner straps, and the other of such bars is used to engage the two other corner straps to lift the bag. Alternatively, each corner strap is connected to a six foot cable, and the four cables connect to the same ring. A back hoe bucket is used to engage the ring and lift the bag.

Also, it is common to transport such valve-type bags either on a flat bed truck or in a van-type semi-trailer truck (van trailers). A crane or other overhead lifting equipment is used to load such bag onto the flat bed truck. The use of the flat bed truck is acceptable for the plastic pellet or foodstuff bulk cargo usually carried in such bags, but is not an STC for transport of hazardous material waste or radioactive hazardous material waste. As to loading the van trailer, which is considered as an STC when used with such a valve-type bag, a fork lift truck is used to lift such bag enough to be moved into the van trailer and set on the floor. The height of the ceiling of the van trailer (e.g., about eight feet) prevents use of the fork lift truck to lift such bag via the corner straps and stack the bags on top of each other, because the mast of the fork lift truck must be higher than the top of such bag. Thus, one layer of (or about 34 of the three foot by three foot footprint) such bags will fit in a seven and one half foot by fifty-two and one-half foot van trailer; which is a load of about seventeen tons (compared to the capacity of such van trailer of about twenty-four tons).

Love Canal Bag

A liftable bag is in use in transporting hazardous material waste that was removed from the Love Canal area, and previously stored. This bag has the same design features and limitations as the valve-type bag, also defines a relatively small unit or small volume of bulk material, but has a slightly larger footprint. In particular, the Love Canal bag has a footprint of about four and one-half feet by four and one-half feet, and a height of about fifty-four inches. The exact rated (or maximum load) capacity of such bag is not clear. The weight of loads customarily carried in such bags depends on the density of the material being carried. However, it appears that such bag is regularly used to carry loads that do not exceed six thousand pounds, e.g., in the range of five to five and one-half thousand pounds. Therefore, Applicant has concluded that it is unlikely that the rated capacity of such bags exceeds six thousand pounds, and clearly does not extend to even seven thousand pounds.

At the top of the Love Canal bag, the four feet by four feet size provides an opening into which the bulk material is fed, e.g., from a hopper or chute. The four feet by four feet size opening does not allow the Love Canal bag to be loaded by a front end loader.

To enable the Love Canal bag to be lifted from above, the same type corner straps are provided as for the valve-type bag; i.e., a corner strap sewn to each of the four corners of the bag along a vertical line at which the strap overlaps adjacent side walls of a corner of the bag, so that there is about twelve to eighteen vertical inches of overlap. A vertical distance of about thirty-six to forty-two inches is left from the lower end of each corner strap to the bottom of the bag. No corner strap is provided or connected to the bag over that distance, nor on the bottom of the bag, nor on the side wall of the bag.

With about a four and one-half foot by four and one-half foot footprint, one would expect to be able to fit twenty-two Love Canal bags in the nine and one-half foot by fifty-two foot bed of a standard railroad gondola car. With the seven hundred-twenty cubic foot size of such bag and at eighty pounds per cubic foot of cargo, the twenty-two bags would weigh about 64 tons. It appears that in the Love Canal transport situation, however, it was desired to increase the number of such bags which would fit into one railroad car. As understood, there was no change made in the size or design of such bags. Rather, it appears that to increase the number of the Love Canal bags that would fit into a railroad car, it was decided not to use the standard railroad gondola car described below. Instead, a special (so-called "non-pool") sixty-five foot long gondola car was used to carry an additional six Love Canal bags (for a total of twenty-eight of such bags per special car). Despite the adverse logistics of using such special cars (e.g., difficulties in obtaining such non-pool cars, not being able to release such cars at the end of a shipment, but instead returning them empty to the point of origin), and waiting for such return before loading more bags), such special cars were used rather than change the bag design or size. To Applicant's knowledge, the Love Canal bag remains the largest bag available to both contain and lift a unit of bulk load.

Concord, Mass. Bag

At a remedial site in Concord, Mass., small boxes and small bags are being used to remove hazardous material waste from inside a building. The bags are small versions of the Love Canal bags, and have sides that are three feet by three feet, and a height of three feet. Straps are also attached to the corners as described above for the Love Canal bag. Due to difficulty in loading these bags, the bags are loaded with from 0.6 to one ton of the hazardous material waste, although the rated capacity of the bags is about 1.2 tons. The difficulty is apparently that it is not possible to quickly put the hazardous material waste through the three foot by three foot top opening to load the bag.

B25 Box

A box known as the "B25" box has about a three and one half cubic yard volume (four feet by four feet by six feet) and is made from metal. It is typical to lift the B25 box from underneath using a fork lift truck which places the B25 box directly in a cell of a hazardous material waste or radioactive hazardous material waste storage site. This requires the forklift truck driver to enter the exclusionary zone.

Non-Liftable Wrappers

The Burrito Wrap liner and the Super Load Wrapper liner have been mentioned above. Another liner is being used at an oil drilling location in the North Sea (the "North Sea wrap", or "wrap").

These three are non-liftable liners, i.e., that are "not able to lift" the load contained therein. The phrase "not able to lift" means that the liners cannot receive forces applied to the upper areas of the liners, and in response to such forces cannot raise the liner and the load therein off the ground or off any other support surface on which the liner has been at rest. These three are examples of liners designed for special situations that do not require the liners to be "able to lift". The phrase "able to lift" means that the a container can receive forces applied to the upper areas of the container, and in response to such forces, the container and the load therein can be lifted off the ground or off any other support surface on which the container has been at rest. Thus, the Burrito Wrap liner was designed specifically for use at the Nevada Test Site in the (side dump truck) situation described above which did not require lifting of the Burrito Wrap liner after it was loaded. The Super Load Wrapper liner was similarly designed specifically for use in a standard gondola car at the facility in Utah, also in a situation (invert the gondola car) in which it was acceptable for the Super Load Wrapper liner to be not able to lift after it was loaded. The lined side dump truck and the lined standard gondola car have very large top openings (e.g., such gondola car has a fifty-two and one-half by nine and one-half feet opening) and are thus easy to load.

The wrap which is understood to be in use at the North Sea location was apparently designed to be placed empty in the bucket of a front end loader (e.g., having a six feet by four feet size). Such wrap has laces to provide an openable top, and has sides, and a bottom. The top is opened to enable material such as gravel to be loaded, and then the laces are tied to close the top. The front end loader then carries such now-full wrap to the seashore, at which a crane having a clam-shell bucket is provided. Since the laces cannot support the weight of such fully loaded wrap, which is about seven tons, such wrap is not able to lift in that it cannot be lifted by the laces. Rather, the clam-shell bucket closes under the bottom of the wrap and then lifts the wrap, so the wrap can be placed where desired. Thus, the containment capacity of the wrap compares to that of the Burrito Wrap liner, and each of these three wraps is not able to lift such a weight.

Loading Bulk Cargo Into Containers

There are a variety of situations in loading the bulk cargo into the containers, liners and wraps described above. One of the most common pieces of equipment for loading bulk cargo (such as hazardous material waste or radioactive hazardous material waste) is the front end loader. As noted, the front end loader has a bucket that is six feet wide and four feet deep. It is thus very difficult to use the front end loader to load the hazardous material waste or radioactive hazardous material waste into any unlined or lined container lined if the container has a top opening smaller than about six feet by about four feet. Although the large IMCs and S/L IMCs may be readily loaded using a front end loader, the above-described disadvantages of the large IMCs and S/L IMCs render them inefficient for transporting the hazardous material waste or radioactive hazardous material waste.

While the Burrito Wrap liner and Super Load Wrapper liner which are used with large containers (e.g., with respective side dump trucks and railroad gondola cars) may be easily loaded using a front end loader, and while these liners have successfully served the radioactive hazardous material waste liner purposes for the sites and modes of transport for which they are intended, those purposes were not to contain and lift these large loads for transloading of a unit of radioactive hazardous material waste, e.g., from one mode of transport to another mode of transport. Thus, notwithstanding the ease of being loaded, the Super Load Wrapper liner is not suitable for transport of radioactive hazardous material waste to the Nevada Test Site, and the Burrito Wrapper liner is not suitable for transport of radioactive hazardous material waste to the noted site in Utah. Although the North Sea wrap fits into the bucket of a front end loader, such wrap is not able to lift.

On the other hand, although the valve-type bag and the Love Canal bag, for example, are able to lift, neither of these has any side that exceeds four and one-half feet. Due to the significantly larger size of the front end loader bucket than the size of the openings at the top of such bags, if one were to try to load hazardous material waste into such bags, a back hoe having a much smaller bucket, or some other smaller equipment, would have to be used, and would need to carefully and slowly direct the bulk hazardous material waste into the small open top of the bags to load the bags without spilling. This would slow down the loading of these bags, and would still risk spilling. Similarly, if the hazardous material waste is demolition debris, and if one tries to use such small bags to carry such hazardous demolition debris, the small size of the opening would require the time-consuming steps of cutting up the demolition debris into small enough pieces to fit through such small open tops. Such cutting would be too time consuming to be practical.

When millions of cubic yards of radioactive hazardous material waste, for example, must be transported, slowness in loading becomes a major problem.

Transloading Facilities

As noted, when the remediation site is not rail-served, or when the storage site is not rail-served, more than one mode of transport must be used. The transfer from one mode to the next mode is done at a transloading facility, such as the North Las Vegas facility. Although such facility is not a radioactive hazardous material waste transloading facility, such facility, and one at Clive, Utah, are licensed for transloading hazardous material waste such as PCBs. The North Las Vegas facility also has a crane for lifting heavy loads. Such hazardous material waste transloading is performed with the hazardous material waste loose, as by using an excavator hoe to remove the bulk hazardous material waste from a gondola car, for example.

Most transloading facilities are not designed for transloading radioactive hazardous material waste, such that a way must be found to keep the radioactive hazardous material waste contained during transfer between modes of transport, here also called "transloading". One such way is to use IMCs, which were used near the now-unlicensed Beatty, Nevada storage site. In that case, the transload facility transferred the IMCs from the special IMC railroad car to a flat bed truck. During the truck transport of the IMC to the Beatty storage site, the special IMC railroad cars were stored at the transload facility, which takes a substantial amount of room because of the large size of the IMCs. The low level radioactive hazardous material waste was dumped from the IMC, the IMC decontaminated, and then returned by flat bed truck to the transload facility.

The true use of such transload facilities for loose bulk transloading is thus not available for radioactive hazardous material waste, and the noted alternate, IMC transfer, requires decontamination and return of the IMC. Therefore, there is still a need to provide a way of complying with the regulations applicable to radioactive hazardous material waste, yet efficiently "transloading" (or transferring) radioactive hazardous material waste from one mode of transport to the next mode.

Use of Railroad Gondola Cars

There are many advantages to using standard gondola cars that are used on a railroad (the standard gondola car is referred to herein as the "gondola car"). Compared to using special, non-pool (non-standard) gondola cars such as the sixty-five foot long special gondola cars noted above, and as compared to the process of leasing IMCs, for example, the gondola car is readily available to railroad customers in most situations. Also, gondola cars are one of the most universally used cars of a railroad. Therefore, once one load of bulk cargo has been emptied from a particular gondola car, the railroad customer may "release" that particular gondola car to the railroad, such that it is readily available at the destination point for use in transporting another load of cargo. At or near the point of origin at which the bulk materials are loaded, many gondola cars can generally be scheduled to be available to receive successive loads of the bulk cargo. Further, gondola car are exempt from state and local government licensing.

The gondola car has a large carrying capacity of 100 tons, and is fifty two and one-half feet long by nine and one-half feet wide. The gondola car is provided with low (sixty inch) sides and an open top for ease in receiving, and transporting, bulk cargo. Normal (non-hazardous and non-radioactive) scrap and waste materials are bulk cargo, and without being packaged, may be loaded directly into the gondola car through the open top. These bulk materials are contained within the car by the sides and the bottom of the car. Such bulk materials are generally covered with one cover that extends over the entire load that is carried by the gondola car. The bulk materials remain loose in the gondola car and are not in separate packages or boxes.

When the bulk material is scrap metal, the scrap metal may be loaded into and removed from the gondola car by an overhead crane and magnet, for example. For other types of bulk cargo carried in gondola cars, equipment is provided for rotating the gondola car on its longitudinal axis to invert the car and dump the cargo out of the car.

When the bulk cargo is hazardous material waste or radioactive hazardous material waste, to avoid time consuming and costly decontamination of the gondola car, the gondola car must be protected, such as being lined with a protective liner, which may be the Super Load Wrapper liner, for example.

The only practical problem in the planned use of such gondola cars is that few remediation sites are rail-served. However, no matter what type of railroad transport is to be used for long distance transport, the lack of rail-service at the remediation site requires that the cargo be moved some distance to the nearest railroad.

SUMMARY OF THE INVENTION

Applicant's studies of prior methods of and apparatus for transporting bulk materials in a unit indicates that there are still problems in efficiently transporting bulk cargo in a unit. These problems are especially critical when the bulk cargo is hazardous material waste, such as radioactive hazardous material waste. Applicant has determined that there are at least two essential requirements for transport of bulk cargo such as hazardous material waste and radioactive hazardous material waste: (a) at all times the bulk cargo should be transported in a unit that is smaller than the size of an entire gondola car, and (b) such transport must be "efficient", as defined below. Generally, efficient transport applies to every mode of the transport, e.g., at the remediation site, between the remediation site and the railroad, during railroad transport, at a transloading facility, during transport to the storage facility, and at the storage facility. For example, at the remediation site, considerations are that (i) most remediation sites are not rail-served, therefore one must haul the bulk cargo to the railroad over the highway in volumes smaller than the gondola car (i.e., truck-sized units); (ii) there is a limited load capacity on highways, which is less than one-half of the load capacity of the standard gondola car; and (iii) there is limited area available at most remediation sites for loading, such that at some remediation sites only a tandem dump truck can be used for loading. For transport from the remediation site to the railroad, Applicant has concluded that to meet these two requirements, there should be as large a unit volume and weight as can be loaded at most remediation sites and be carried within such highway load limits. The smallest remediation site would be served, e.g., by a tandem dump truck having a seven and one-half foot by eighteen foot bed and a forty-six thousand pound load capacity. Somewhat larger remediation sites would, e.g., be served by roll off containers having about the same size beds as the tandem dump truck, and by roll off trucks which carry the roll off containers.

Since most storage sites are not rail-served, there is also the need to remove the unit from the railroad car and load it onto a truck, for example. Even if the storage site is rail-served, if there is no available facility for inverting the gondola or other railroad car (for dumping the unit), the unit must be removed from the gondola car by other facilities. Further, such unit must be substantially larger than the small valve-type bag and the small Love Canal type-bag that have limited weight carrying capacities of from one to three tons, because (a) such small bags require too many crane operations to load a gondola car; and (b) there are too many spaces between such small bags when loaded into a gondola car, which reduces the usable load-carrying area of the floor of such gondola cars; for example.

As further aspects of such essential requirements, Applicant has determined that (a) a container-lifter for defining such a unit should be as large as is possible to be able to contain the larger volume and weight of bulk cargo, and (b) the lifter of the container-lifter should be "integral" with the container in such manner as to be able to lift the container with the substantially larger weight and volume bulk cargo therein into a gondola car, while the container retains integrity as a container. This is in contrast to the Love Canal bags which apparently fail when attempts are made to lift more than about three tons. Thus, such a unit defined by a container-lifter must not only contain much more than three tons, but in response to lifting forces applied from above such container-lifter, such container-lifter must be able to lift that greater amount of weight so as to permit moving such unit between transport vehicles and at storage sites. Finally, such unit should facilitate keeping the load separate from the gondola car in the manner of a liner, so as to avoid having to decontaminate the gondola car after removal of the unit from the gondola car.

In the present invention, an apparatus having these characteristics necessary to satisfy such two essential requirements is generally referred to as a "bulk cargo unit container-lifter-liner", which is abbreviated and called a "lift-liner", or "container-lifter". Each example of efficient transport discussed below is provided by such lift-liners of the present invention.

Applicant's studies indicate that the efficient transport is provided when the bulk cargo is transported using a gondola car during the mode of transport that covers the longest distance from the point of origin to the destination point. That is, in transport which include both rail transport and other modes of transport to the railroad or from the railroad, the distances travelled using the other modes of transport are short relative to the distance travelled by rail. The conclusion that only gondola cars should be used for such longest portion of transport took into consideration the most efficient use of an IMC. For example, Applicant considers the most efficient use of an IMC used to transport radioactive hazardous material waste as being for transport to the above-described rail-served storage site in Utah. The IMC is lined using a standard plastic liner and is loaded at the remediation site (point of origin). A truck is used for transporting the loaded IMC from the remediation site to the railroad, where it is lifted onto a special railroad flat car. After the long distance transport by railroad, at the Utah site the IMC is removed from the flat car, the radioactive hazardous material waste and the liner are dumped out of the IMC, and the IMC is decontaminated. The decontaminated IMC is then returned empty to the remediation site (point of origin) for reloading. The operator of the storage site will not generally accept the decontaminated IMCs for release to the railroad. Such refusal is generally due to the need to store such decontaminated IMCs prior to actual "pick-up" by the railroad, and the large amount of room necessary for such storage. Thus, even though this is the most efficient use of the IMC for this waste, there is no practical way to avoid the need to return the IMC empty to the point of origin for reloading, nor to avoid the logistics of arranging for the empty return via railroad, nor to avoid the transport from the railroad to the remediation site, nor to avoid the documentation of the return transport. These necessary logistical activities attendant such return render such use of IMCs substantially less efficient than the efficient transport contemplated by the present invention.

Such studies took into account the requirements that if decontamination is to be avoided when the bulk cargo is hazardous material waste, neither the gondola car nor any other car of the railroad is permitted to become contaminated during the transport. The "liner" aspect of the lift-liner of the present invention (which keeps the gondola car uncontaminated) avoids the need to somehow cover the contaminated gondola car and return the gondola car empty to the point of origin for reloading, rather than releasing the gondola car to the railroad for further use. By using the unregulated gondola car, this aspect of efficient transport avoids use of a state-licensed container such as the IMC. Further, since the use of a lined gondola car is recognized as an acceptable STC (i.e., the gondola car lined with a Super Load Wrapper liner), the gondola car containing a lift-liner is acceptable as an STC. In summary, the lift-liner does not raise any new regulatory issues, and as noted, avoids the state licensing required for IMCs, for example.

Efficient transport is also provided when there is "ease of filling". With ease of filling, the bulk cargo is transferred to the lift-liner using standard material handling equipment, such as front loaders having the buckets that are six feet by four feet. Applicant has determined that for efficient transport the lift-liner that receives and defines the unit of the bulk cargo should have a top opening at least as large as the size of such bucket of the front loader. For the hazardous material waste, the conformity of the size of such a top opening of the lift-liner with at least the size of such bucket of the front loader, are important factors in achieving efficient transport operations because such conformity facilitates ease of filling, e.g., loading without spilling the radioactive hazardous material waste. Thus, efficient transport avoids use of containers such as the valve-type bag and the Love Canal bag, having the top openings of inherently small dimensions when compared to the size of the equipment that is available and regularly used to load the hazardous material waste. Instead, the efficient transport uses such standard front loaders, which may be used to readily load hazardous material waste carefully and directly into the lift-liner without spilling.

Efficient transport is additionally provided when as much as possible of the load capacity of the gondola car is used. This means that the weight of the units of the bulk cargo loaded into the gondola car should be as high as possible a percent of the weight-carrying capacity of the gondola car. Ideally, one hundred percent is desired. For transporting hazardous material waste and radioactive hazardous material waste with the unit lift and containment, and with all of the other aspects of efficient transport, by the present invention, eighty four percent is acceptable.

Applicant's studies indicate that such eighty four percent capacity of efficient transport is provided by lift-liners having substantially greater weight-carrying and lifting capabilities than the valve-type bag or the Love Canal bag. For example, the hazardous material waste or radioactive hazardous material waste have a typical density of about eighty pounds per cubic foot). Moreover, one embodiment of the lift-liner is rated to carry during lifting off the ground a unit of the radioactive hazardous material waste weighing up to twelve tons. This embodiment has been successfully tested carrying and lifting up to fifteen tons. This embodiment of the lift-liner with the twelve ton rated lifting capacity is referred to as a "twelve ton" lift-liner. The twelve ton lift-liners carry more weight in the same "footprint", or area which rests on the floor of a gondola car, than the ten ton lift-liner, for example. Further, seven twelve ton lift-liners will fill the volume of a gondola car, such that the noted eighty-four percent relates to the 100 ton weight capacity of a standard gondola car which may contain the seven twelve ton lift-liners.

Efficient transport is further provided when there is efficient transfer of the bulk cargo into the gondola car. The lift-liner divides the bulk cargo at the point of origin into the units for transport. A crane, for example, that is normally at the railroad siding is used to lift the lift-liner into the gondola car. In this context, such efficient transport means that it takes a minimum number crane operations to fill the gondola car with the lift-liners. For example, efficient transport would not use the valve-type bag or the Love Canal bag having the small volume and low weight carrying capacity. Considering the larger of the two bags, the Love Canal bag, twenty-two of such bags (based on two rows, with eleven bags in each row) can fit into a gondola car. Therefore, it would require twenty-two operations of a crane to fill the volume of the gondola car. With the apparent three ton load limit of each such bag, the twenty-two bags could carry about sixty-six tons, which is only about sixty-six percent of the weight-carrying capacity of the gondola car.

In contrast, a twelve ton capacity lift-liner may have a footprint of eight feet by seven feet, and may be designed to be filled to a level of four-and-one-half feet. The seven foot dimension fits across the width of a truck bed, which is about seven and one-half feet wide. The eight foot dimension allows two lift-liners to fit into the eighteen foot length of the bed of a tandem dump truck, or three lift-liners to fit into the thirty-two foot length of a semi-trailer truck. As to fitting the lift-liner in a gondola car, the eight foot dimension fits across the nine and one-half foot width of the gondola car, and seven of the seven foot dimensions of the lift-liner fit in the fifty-two and one-half length of the gondola car. Thus, seven of the twelve ton capacity lift-liners can easily fit in the gondola car and result in use of eighty-four percent of the weight-carrying capacity of the gondola car, a twenty-five percent increase over the ten ton lift-liner. Further, as compared to the twenty-two crane operations to load the Love Canal bags in the gondola car, fifteen crane operations are saved in only loading seven, twelve ton lift-liners to fill the volume of the gondola car.

In further contrast, a demolition debris lift-liner may have a footprint of four feet by seventeen feet. The four foot dimension fits across the width of a truck bed, which is about seven and one-half feet wide. The seventeen foot dimension allows one of the demolition debris lift-liners to fit into the eighteen foot length of the bed of the tandem dump truck, for example. As to fitting the lift-liner in a gondola car, the four foot dimension allows two lift-liners to fit across the nine and one-half foot width of the gondola car, three of the seventeen foot dimensions of the lift-liner fit in the fifty-two and one-half length of the gondola car, and two layers of lift-liners will fit in the sixty inch height of the gondola car. Thus, twelve demolition debris lift-liners can easily fit in the gondola car and result in use of about sixty-five percent of the weight-carrying capacity of the gondola car, which is less than the ten ton lift-liner because the demolition debris is less dense than other radioactive hazardous material waste. As compared to the twenty-two Love Canal bags that fit into the volume of the gondola car, ten crane operations are saved in only loading the twelve demolition debris lift-liners to fill the volume of the gondola car.

Related to the number of lift-liners that can be placed into a gondola car, Applicant's studies also indicate that the lift-liner should not require that it be engaged by lift equipment at the bottom, as with the North Sea wrap which requires lifting by a crane having a clam-shell bucket. Rather, efficient transport should be provided by having the lift-liner be designed to be lifted by forces applied to the lift-liner from above, so that for lifting the lift-liner no equipment need extend down the sides of the lift-liner as with the North Sea wrap. Any such equipment extending down the sides of the lift-liner would reduce the number of lift-liners which can be placed into a gondola car, for example.

Efficient transport is additionally provided when one needs only a minimum of cutting of elongated bulk materials (e.g., demolition debris) into lengths for transport. Thus, if the hazardous material waste is long pieces of scrap metal, concrete pillars and beams, the pieces should be acceptable for transport if they are no longer than seventeen feet, which will fit into the demolition debris lift-liner.

Efficient transport is further provided when the bulk cargo is divided into units for transport and the units are capable of being stacked at the destination point in a stable condition. This means that the at-rest footprint of a lift-liner is large relative to that of such described bags, for example. Further, uniform settling of the bulk cargo within the lift-liner is facilitated by a smooth inner surface of the lift-liner. The "stackability" of the lift-liners is said to be stable because one lift-liner may be placed (or stacked) on another lift-liner and the process repeated to form up to six stable layers of lift-liners. In particular, to be avoided is a characteristic in which the load tends to sag significantly to the bottom of the container when the container is at-rest and assume somewhat of the natural pyramidal shape of a pile of bulk cargo. There is low stackability when containers having such shape are piled on top of each other.

Efficient transport is further provided when the lift-liner that forms or defines the unit of the bulk cargo has a minimum empty volume and weight prior to being loaded with the bulk cargo. Thus, the lift-liner should collapse (or fold) for transport to the point of origin, be readily openable for loading, and itself be light-weight. As an example, sixty two of the ten ton rated capacity lift-liners contemplated by the present invention can fit in one IMC.

Efficient transport may be further provided when a lift-liner system both defines the unit of the bulk cargo and efficiently couples the vertical lifting force provided by a crane, for example, to the structure of the lift-liner. In this sense, the system distributes portions of such vertical lifting forces to the lift-liner as secondary vertical forces applied vertically and uniformly to the bulk cargo within the lift-liner. In contrast, based on Applicant's analysis of the valve-type bag and the Love Canal bag, it appears that via such sewing of such corner straps only to the respective corners of the bags, the corner straps transfer lifting forces to the portions of the fabric of the sides of the bag that are below the lower ends of the corner straps. These forces are primarily in a diagonal direction extending away from the corner straps across the sides to the bottom of the bag. Also, there is about four feet (measured circumferentially around the bag) between adjacent pairs of such corner straps. Therefore, Applicant's analysis indicates that the upward forces applied to the corners of such bags are not only concentrated at the corners, but are applied where a minimum amount of the load is carried. In Applicant's analysis, such location of the corner straps at the corners, therefore, does not result in the application to the load of enough vertical components of force to enable lifting of loads that are substantially greater than three tons (e.g., ten tons). Since the low weight-carrying capacity and low volume Love Canal bags are made with four side panels, and the panels of each adjacent pair of panels are joined only at the corners by being overlapped and sewn together to form a seam, it appears to Applicant that the design of these bags requires that the corner straps be sewn to the bags only at the overlapping, or reinforced, corner seams, and only partially along the length of the corner. In view of these limitations of the valve-type and the Love Canal bags, Applicant has concluded that such bags are not practical or suitable for the efficient transport of hazardous material waste nor radioactive hazardous material waste.

Efficient transport may be further provided when the lift-liner that forms or defines the unit of the bulk cargo need not be used with a dedicated transport vehicle, such as a dedicated IMC. Rather, the lift-liner itself lines the inside of a roll off container or gondola car and has integrity so as to prevent bulk cargo leakage or seepage from the lift-liner. The lift-liner will be strong enough to be able to keep at least ten tons of bulk cargo safely together as a unit despite dropping the lift-liner from heights such as two feet above the ground.

Applicant's studies also indicate that efficient transport is promoted by having lift-liner straps connected to the load-carrying container in a manner that assures an even, or uniform, distribution of lifting forces to the bottom of the container. In comparison, Applicant's studies also considered slings, such as the sling described in the Department of Energy Hoisting and Rigging Manual, Apr., 1993, Section 8.3.9. There, a Synthetic-Web Sling is described as including straight-pull configurations. Maximum safe working loads (capacities) of single basket hitch (vertical leg) configurations are given for Nylon web slings, including a 3,200 pound capacity for each one inch of width of such slings. Up to twelve inch wide slings having a capacity of 38,400 pounds are shown. Such Section of the Manual does not, however, describe or suggest joining such slings with containers or lift-liners, or other structures for lifting bulk materials. Also, such Section of the Manual does not appreciate the importance Applicant places on such joining of straps to the container to assure application of the vertical lifting forces uniformly across the entire area of the bottom of the container, and thus uniformly to the load resting on the bottom of the container, nor the ease of use of the lift-liner resulting from the joining of the straps to the container to assure such uniform application of the vertical lifting forces. Further, the slings described in the Manual are designed for reuse, and as such, are very expensive and subject to rigorous regulations.

Efficient transfer is also promoted when the lift-liner is used with a lifting grid (or force distributor) designed to apply lifting forces to the straps of the lift-liner. For the ten ton and twelve ton lift-liners noted above, the bottom of the lift-liner has an enclosed perimeter, and the straps are in a definite (or grid) pattern within that perimeter. The lifting grid distributes the single vertical lifting force from the one cable of a crane to a coupling for each of the sixteen strap ends of the ten ton lift-liner, and for each of the eighteen strap ends of the twelve ton lift-liner. This coupling is by providing a hook substantially vertically above every one of the strap ends so that as the crane lifts, each strap end is pulled substantially vertically upward to apply vertical forces to the respective walls and bottom of the container of the lift-liner. For the demolition debris lift-liner, a lifting grid having hooks positioned to match the perimeter of the seventeen foot by four foot lift-liner is provided. Such lifting grid distributes the single vertical lifting force from the one cable of the crane to the hooks. These lifting grids assure that the proper operation and use of the lift-liners does not become dependent on the type of equipment which happens to be available at the remediation site or the storage site. Rather, since cranes are generally always at such sites, the availability of the lifting grid assures ease and proper use of the lift-liner.

Efficient transport is also provided by a characteristic which reduces the occurrence of subsidence of the stored bulk material and the lift-liners after time in storage. Subsidence is a special problem when, for example, wooden boxes are used to contain and permit lifting of radioactive hazardous material waste into position in cells of a radioactive hazardous material waste storage site. As the waste settles in such boxes, air spaces form within such boxes. Such boxes tend to rot and decompose over time. The waste from above settles into the lower air spaces, and all of the units move lower in the stack. As a result, the surface material that has been used to cover the stacked boxed units of radioactive hazardous material waste also settles and requires addition of fill and additional material handling to remedy the problem.

Efficient transport is also provided by a characteristic of the lift-liner which provides secure tucking of the corners of the container and the lifter, and enables those loading the lift-liner to easily and quickly form the tucks and close top flaps of the lifter over the container.

With these and other aspects of efficient transport in mind, the present invention contemplates providing transport for bulk cargo using a gondola car during the longest portion of transport, and in such a manner that when the bulk cargo is hazardous waste material, neither the gondola car nor any other car of the railroad, is permitted to become contaminated during the transport.

Efficient transport is also provided by the system of the present invention in that the system is economically feasible, and the lift-liner is economically disposable. Such feasibility is indicated by the use of readily available transport equipment, e.g., tandem dump trucks, gondola cars, roll off containers, cranes, and fork lift trucks. Also, such economic disposability is indicated by the lift-liner which may be fabricated for a small fraction of the cost of a used S/L IMC, for example.

The present invention also contemplates a bulk cargo unit container-lifter that features ease of filling in that the bulk cargo may be transferred into the bulk cargo unit container-lifter using standard, large size, material handling equipment, such as front loaders having buckets that have an opening six feet long by four feet wide, so as to readily load hazardous material waste directly into the bulk cargo unit container-lifter without spilling the bulk hazardous material waste.

The present invention further contemplates more efficient transport by using increased amounts of the one hundred ton net weight-carrying capacity of a gondola car, whereby seven bulk cargo unit container-lifters having substantially greater weight-carrying capacities (e.g., twelve tons) according to the present invention may be used to fill the volume of one gondola car with eighty four tons of bulk cargo, which is a higher percent of the weight-carrying capacity of the car than previously possible.

The present invention further contemplates a bulk cargo unit container-lifter designed for efficient transport via efficient loading into the gondola car, wherein a minimum number crane operations are required to fill the volume of the gondola car with bulk cargo unit container-lifters.

The present invention further contemplates a bulk cargo unit container-lifter designed for efficient transport with both gondola cars and trucks in that the length of the container-lifter corresponds to the width of a standard gondola car and the width of such container-lifters is a whole number multiple of the length of one such gondola car; and where the width of one such container-lifter corresponds to about the width of such truck and the length of such container-lifter is a whole number multiple of the length of such trucks.

The present invention further contemplates a bulk cargo unit container-lifter that does not require that it be engaged at its bottom by lifting equipment, and which permits the container-lifter to be lifted by forces applied to the walls of the container-lifter from above and away from the corners of the container-lifter.

The present invention additionally contemplates more efficient transport requiring only a minimum of cutting of elongated bulk cargo materials (such as demolition debris) into lengths for transport, by using an elongated bulk cargo unit container-lifter having both a substantially greater weight-carrying capacity and an open top of up to seventeen feet by four feet to accept the elongated bulk cargo materials.

The present invention additionally contemplates more efficient transport by dividing the bulk cargo into units for transport, wherein the units are defined by bulk cargo unit container-lifters capable of being stacked at the destination point in a stable condition and having an at-rest footprint that is large relative to that of prior bags, for example.

The present invention additionally contemplates more efficient transport by a bulk cargo unit container-lifter designed so that when the container is at rest, settling of the bulk cargo occurs uniformly, where the uniform settling is facilitated by a smooth inner surface of the lift-liner.

Additionally, more efficient transport is further provided by a container-lifter that defines a unit of the bulk cargo having a significantly reduced empty volume and weight prior to being loaded with the bulk cargo, wherein the unit container-lifter is foldable for transport to the point of origin, is readily openable for easy loading, and itself is relatively light-weight.

The container-lifter system of the present invention provides more efficient transport by efficiently coupling the vertical lifting force provided by a crane, for example, to the structure of the container-lifter, so that the container-lifter receives many vertical forces and distributes such vertical forces uniformly and vertically throughout the walls and across the bottom of the container-lifter.

The bulk cargo container-lifter contemplated by the present invention forms a unit of the bulk cargo that may be carried by general-use vehicles, not dedicated transport vehicles, such that the bulk cargo unit container-lifter itself lines the inside of a gondola car, for example, and has integrity to minimize leakage of the bulk cargo from the container-lifter, and is strong enough to be able to hold up to ten tons of bulk cargo safely together as a unit despite dropping the container-lifter from heights such as two feet above the ground.

The container-lifter of the present invention provides more efficient transport when used in conjunction with a lifting grid designed to horizontally distribute portions of a substantially vertical lifting force to horizontally spaced strap ends of the container-lifter.

The container-lifter of the present invention provides a collapsible container within which bulk cargo readily and uniformly compacts upon placement with other container-lifters in a stack so as to avoid forming air pockets within the container, thus avoiding subsidance due to collapse after stacking.

The container-lifter of the present invention promotes efficient transport in that such lifter is provided with secure tucking of the corners of the container and the lifter via webs and cooperating loops, which enable those loading the lift-liner to easily and quickly form the tucks and securely close the top flaps of the lifter over the container.

A method contemplated by the present invention loads a gondola car with bulk cargo, the gondola car having a given length in a direction of travel, a given width transverse to the direction of travel, and a given height; wherein the gondola car has a load capacity of about 100 tons. The method includes a step of dividing the bulk cargo into many units, each having a unit width dimension, a unit length dimension which is a whole number multiple of the given length, wherein each of the units has a weight of at least ten tons. Another step provides lifting of a first of the units, and placing of the lifted unit in the gondola car with the unit width transverse to the direction of travel. Then, the lifting and placing steps are repeated in succession with respect to all of the other units of the many units to place successive next units adjacent to and touching the next previous unit that was placed into the gondola car until the volume of the gondola car is filled with the units.

Another method contemplated by the present invention defines a unit of bulk cargo having a weight in excess of three tons, and lifts the unit of bulk cargo. In one example the bulk cargo is radioactive demolition debris. The method includes providing a bulk cargo unit container-lifter as a flexible container made from sheet-like material that defines a three dimensional enclosure having an open top, a plurality of opposite sides, and a bottom; the container-lifter defining a volume sufficient to contain in excess of three tons of the bulk cargo. The container-lifter is provided with a lifter feature by a plurality of straps, each of the straps extending in a continuous path along and being secured to one of the opposite sides and extending in the continuous path along and being secured to the bottom and extending in the continuous path along and being secured to another of the opposite sides. The straps are in such number and are made from such material that the straps are capable of collectively applying to the container of the container-lifter more than six thousand pounds of force vertically.

In another aspect of the method, the bottom of such container is placed on a support surface. Through the open top the unit of bulk cargo having the weight in excess of three tons is loaded into such container. Each of the straps has one free end extending past the one side and a second free end extending past the other side. Forces are applied to the one free end and to the second free end of each of the straps, the forces being substantially in a vertical direction and collectively being sufficient to lift off the surface the container-lifter and the bulk cargo having a weight in excess of three tons.

A further method contemplated by the present invention relates to lifting a unit of bulk cargo having a weight in excess of three tons. A vertical lifting force is applied to a central lift point. The bulk cargo unit is defined by a flexible container made from sheet-like material that defines a three dimensional enclosure having an open top, a plurality of the opposite sides, and a bottom. The container defines a volume sufficient to contain in excess of three tons of the bulk cargo. A plurality of straps are secured to the container. Each of the straps extends in a continuous path along and is secured to one of such opposite sides and extending in the continuous path along and is secured to the bottom and extending in the continuous path along and being secured to other side of the opposite sides, each of the straps having one free end extending past the one side and having a second free end extending past the other side. The straps are in such number and are made from such material that the straps are capable of collectively applying to the container more than six thousand pounds of force. The container is placed with the straps on a support surface, then the bulk cargo having a weight in excess of three tons is placed in the container through the open top. The vertical lifting force is divided into a plurality of substantially vertical upward forces. Simultaneously, one of the plurality of substantially vertical upward forces is applied to each of the one free end and the second free end of each of the straps to cause the straps to apply the substantially vertical upward forces to the container and lift the container off the support surface.

Another method contemplated by the present invention is fabricating a container-lifter for lifting a unit of bulk cargo having a weight in excess of three tons. The method includes defining a hollow rectangular parallelepiped-shaped enclosure having an open top, a plurality of walls, and a bottom. The enclosure defines a volume sufficient to contain in excess of eight tons of the bulk cargo, and depending on the density of the bulk cargo, to contain in excess of twelve tons of the bulk cargo. The enclosure has outside surfaces. On the outside surfaces of the enclosure there is secured a first group of straps each having a first end and a second end. Each of the straps of the first group extends parallel to each other and along and is connected to the outside surface of a first of the walls and of the bottom and of a second wall opposite to the first wall. Also, on the outside surface of the enclosure there is secured a second group of straps each having a third end and a fourth end. Each of the straps of the second group extends parallel to each other and along and is connected to the outside surface of a third of the walls and of the bottom and of a fourth of the walls. The straps of the first group and of the second group cross the bottom and at the bottom the straps are at right angles with respect to each other to form a grid of straps. The respective first, second, third and fourth ends are unconnected to the outside surface.

In another aspect of the method, simultaneously, a substantially-vertical upward force is applied to each of the ends of the straps to cause the straps to apply substantially-vertical upward forces directly to the bottom of the container and lift the container off the support surface.

With these and other features of a bulk cargo unit container-lifter in mind, the present invention provides one twelve ton-capacity embodiment of such container-lifter in the form of at least one sheet which defines a three dimensional volume of at least two hundred-fifty cubic feet, wherein the at least one sheet has a bottom (having a perimeter) and four walls. The embodiment includes a series of spaced, continuous straps that are connected to and extend along one such wall and are connected to and extend under the bottom, and are connected to and extend along the opposite wall. Such straps form a grid of overlapping straps on the bottom, with each strap overlap being inside and spaced from the perimeter of the bottom. In use for lifting the bulk cargo unit within the container-lifter, forces are applied vertically to opposite ends of each of the straps, and from the straps vertically to the bottom within the perimeter.

The present invention also provides another embodiment of such container-lifter in the form of such at least one sheet having the bottom and four walls, wherein a first series of spaced, continuous straps extend in parallel arrangement from the height above the container along one such wall, under the bottom, and along the opposite wall and upward past such wall to the height above the container. A second series of spaced, continuous straps extend in parallel arrangement from the height above the container along a third side that is between such one wall and such opposite wall, under the bottom, and along a fourth wall opposite to such third wall and upward past such fourth wall to the height above the container. In use for lifting the bulk cargo unit within the container, forces are applied vertically to each of the straps.

The present invention also provides another embodiment of such container in the form of a series of such sheets having the bottom (which defines a perimeter) and four sides, and having such first series of spaced, continuous straps extending in such parallel arrangement, and having such second series of spaced, continuous straps extending in such parallel arrangement. As such first and second series of straps extend across the bottom they cross each other to define within such perimeter a rectangular grid of uniformly intersecting straps completely within the bottom. The grid defines uniform size areas of the bottom, and the straps support such uniform size areas of the bottom by applying vertical forces thereto to lift the bulk cargo that is inside the container-lifter.

The present invention also provides a further embodiment of such bulk cargo unit container-lifter having a perimeter defined by such four walls and the straps extending from such perimeter up to such height. The container-lifter is used in combination with a lifting force distributor lifted by a crane, for example. Such distributor is provided with a hook arranged to be generally vertically above each of the ends of the straps. In use for lifting the bulk cargo unit within the container-lifter, the hooks apply the vertical forces to each of the ends of the straps.

The present invention contemplates a further combination of such bulk cargo unit container-lifter and such force distributor, wherein such container-lifter has a first such perimeter defined by such four walls and the straps extending from such perimeter up to such height when such container-lifter is at-rest. Such container-lifter has a second such perimeter defined by such four walls and the straps extending from such perimeter up to such height when such container-lifter is being lifted by such force spreader frame. Such first (at-rest) perimeter is greater than such second (lifted) perimeter. Such distributor defines a lifting perimeter vertically aligned with such second perimeter so that the hooks apply the vertical forces to each of the ends of the straps as they are lifted and coincides with such second perimeter.

The present invention contemplates a further combination of such bulk cargo unit container-lifter, which includes a container, and a container liner (which may be integral with the container or received within such container prior to placing the bulk cargo in the container). The material from which such liner is made has a smooth inner surface facing into the center of the container to promote vertical sliding of the bulk cargo toward the bottom as such cargo is loaded into the liner.

BRIEF DESCRIPTION OF THE DRAWINGS

Other features and advantages of the present invention will be apparent from an examination of the following detailed descriptions, which include the attached drawings in which:

FIGS. 12A through 12E are views of one corner of the container defined by walls, showing a transition containment section secured to the walls, and the flaps secured to the transition containment section, wherein the transition containment section is folded to form a tuck to securely close the top of the container;

FIGS. 13A through 13C are perspective views of the container being lifted, showing lift grid connectors applying substantially vertical forces to the straps and walls being substantially vertical;

FIGS. 20 through 23 are plan views of the container during the folding of the flaps to close the top of the container;

FIGS. 24A and 24B are views of a roll off container which may be used to transport the container-lifter of the present invention from a remediation site to a railroad siding;

FIGS. 25A and 25B are plan views of respective first and second embodiments of the container-lifter, showing how the container-lifter makes efficient use of the space and load-carrying capacity of a gondola car;

FIG. 26 is an elevational view of the gondola car;

FIG. 27 is a side elevational view of the first embodiment of the container-lifter of the present invention showing the first wall having one set of the straps secured to such wall and extending in a continuous path to the bottom;

FIG. 28 is an end elevational view of the first embodiment of the container-lifter shown in FIG. 27, showing an opposite wall having the set of the straps secured to the wall and extending in a continuous path to the bottom;

FIG. 30 is a cross-sectional view of one of the walls taken along lines 30—30 in FIG. 18, showing a laminated sheet and a strap sewn to the sheet;

FIGS. 33A, 33B, and 34 through 36 are diagrams of the steps of methods of the present invention;

FIG. 39 is a cross-sectional view of one of the walls formed by multiple sheets, showing an inner sheet having a smooth surface, and an outer sheet connected to one of the straps;

DETAILED DESCRIPTION OF THE PRESENT INVENTION

General System Description

First and Second Embodiments

Figure 1A:
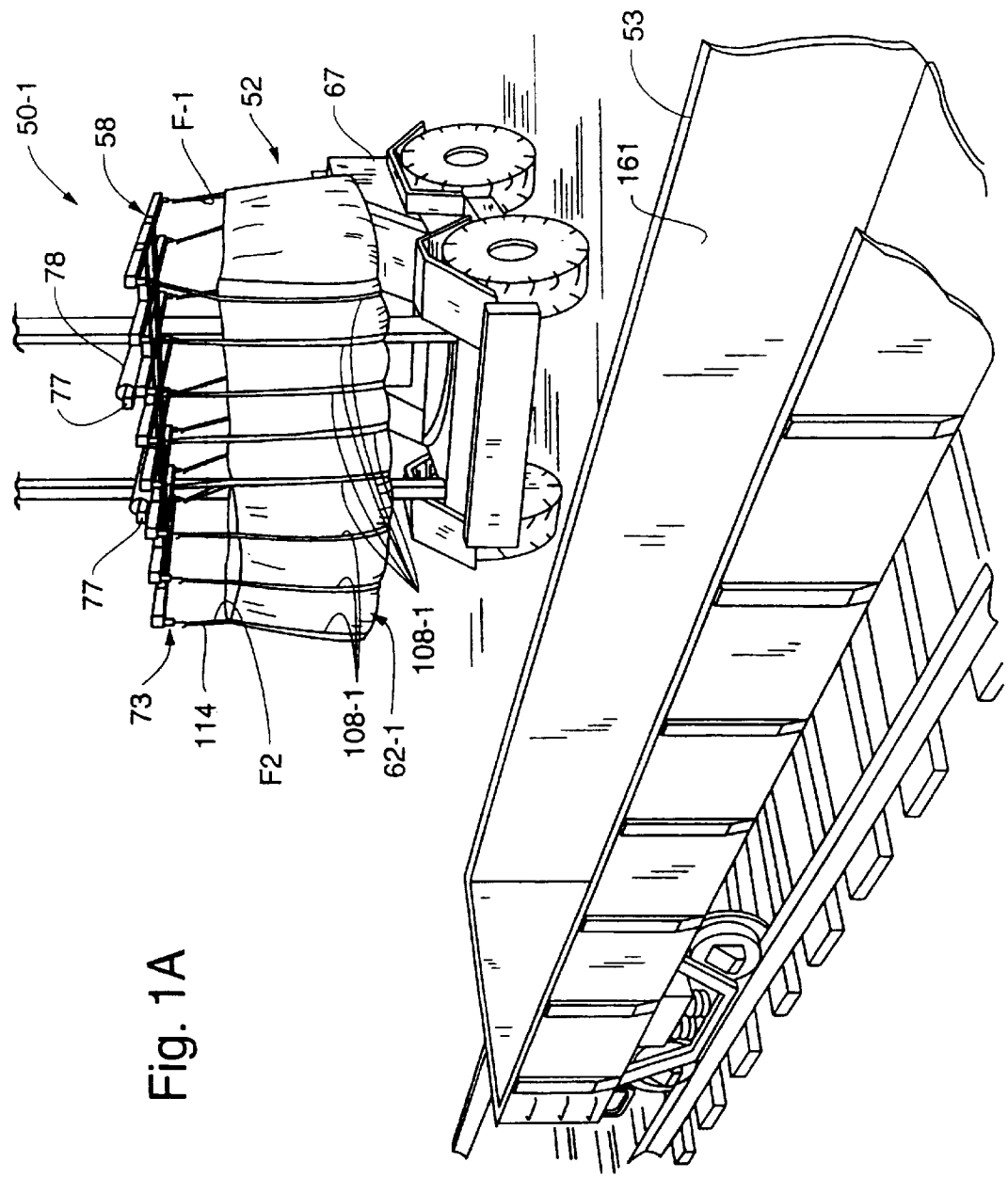
FIG. 1A is a perspective view of a first embodiment of a system of the present invention for transporting bulk cargo in a unit, showing a unit of demolition debris.
Figure 1B:
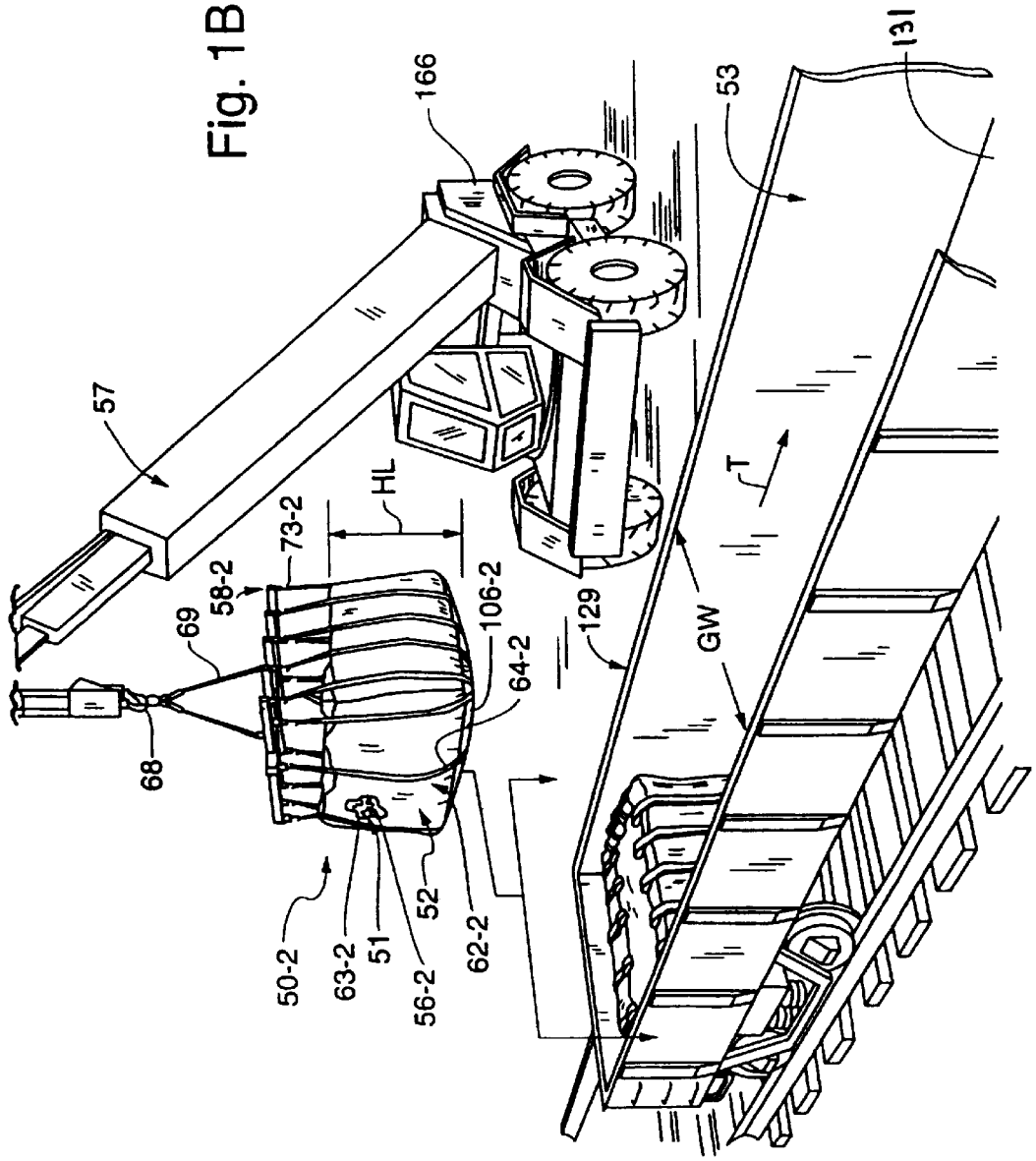
FIG. 1B is a perspective view of a second embodiment of the system of the present invention, showing a unit of hazardous material waste.
Figure 40:
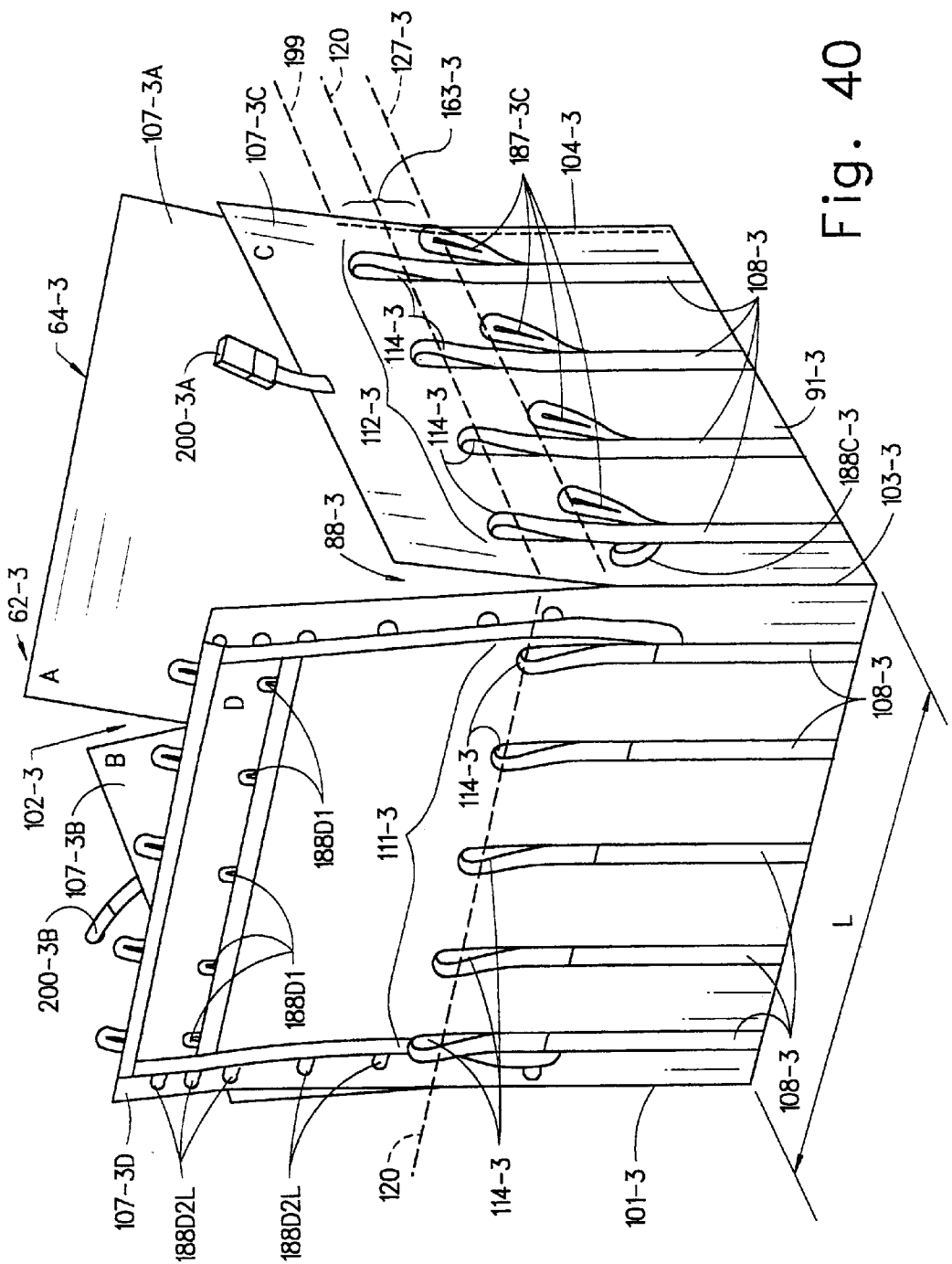
FIG. 40 is a perspective view of a third embodiment of the present invention illustrating an arrangement of straps on opposite sides of a lifter of a lift-liner having an increased lifting capacity, illustrating flaps and ties for securing the flaps in closed positions.

Referring now to the drawings, FIGS. 1A, 1B and 40 show respective first, second, and third embodiments of a system 50-1, 50-2, and 50-3 of the present invention for lifting a substantial volume and weight of bulk cargo 51 in a unit 52. For ease of description, elements of the system 50 described with respect to the first embodiment have a "dash 1" (i.e., "–1") after the reference number, elements of the system described with respect to the second embodiment have a "dash 2" (i.e., "–2") after the reference number, elements of the system described with respect to the third embodiment have a "dash 3" (i.e., "–3") after the reference number, and general descriptions of the system elements without regard to a particular embodiment have no dash number.

The volume (see FIG. 2, measured by a length L, a width W, and a height H) of each unit 52 of the first embodiment of the system 50-1 and of the second embodiment of the system 50-2 is less than the about 2,500 cubic foot volume of the interior of a gondola car 53 described above and shown in FIGS. 1A and 1B, but is substantially more than that of typical prior one and one tenth ton and three ton bags described above. The bulk cargo 51 in the units 52 of the first embodiment 50-1 is shown, for example, as demolition debris 54 (FIG. 1A), whereas the bulk cargo 51 in the units 52 of the second embodiment 50-2 is shown, for example, as dirt, gravel and other natural materials 56-2 (FIG. 1B). The bulk cargo 51 in the units 52 of the third embodiment 50-3 may also be, for example, dirt, gravel and other natural materials 56-2 . In each case, while the bulk cargo 51 need not necessarily be hazardous material waste, the advantages of the present invention are especially applicable to bulk cargo 51 that is contaminated, as is hazardous material waste, and in particular to hazardous material waste that is contaminated by being radioactive, or by being covered with radioactive material.

The system 50 includes a lift device 57, a lift grid 58, a loading frame 59 (FIG. 2), and a container-lifter 62, which includes a flexible container 63 and a lifter 64. Each of the lift device 57, the lift grid 58, and the container-lifter 62 (with the container 63 and the lifter 64) have some features unique to the first embodiment 50-1, to the second embodiment 50-2, and to the third embodiment 50-3. The lift device 57 may be a hoist (not shown) or a crane 66 (FIG. 1B) or a fork lift truck 67 (FIG. 1A). The lift device 57 is capable of lifting the units 52 of the bulk cargo 51 weighing as much as fifteen tons to heights of twenty feet, for example. A unit 52 of the bulk cargo 51 is contained within the container 63.

Figure 32A:
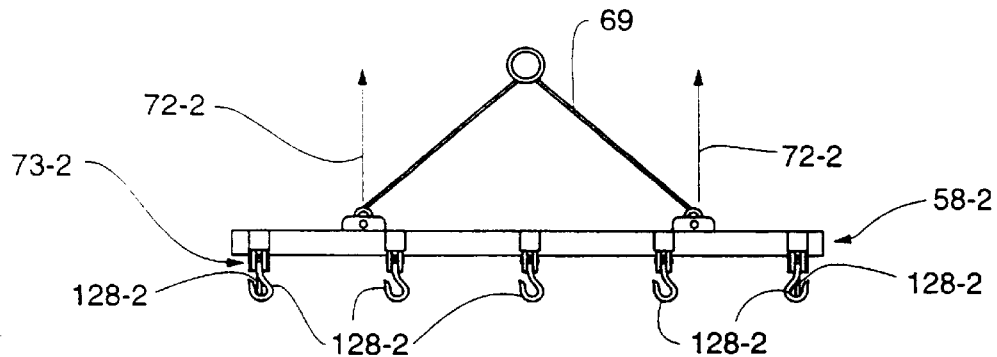
FIG. 32A is an elevational view of a second embodiment of the lift grid shown in FIG. 1B.
Figure 32B:
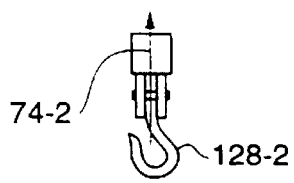
FIG. 32B is an enlarged view of a portion of FIG. 32A showing the hook.
Figure 41A:
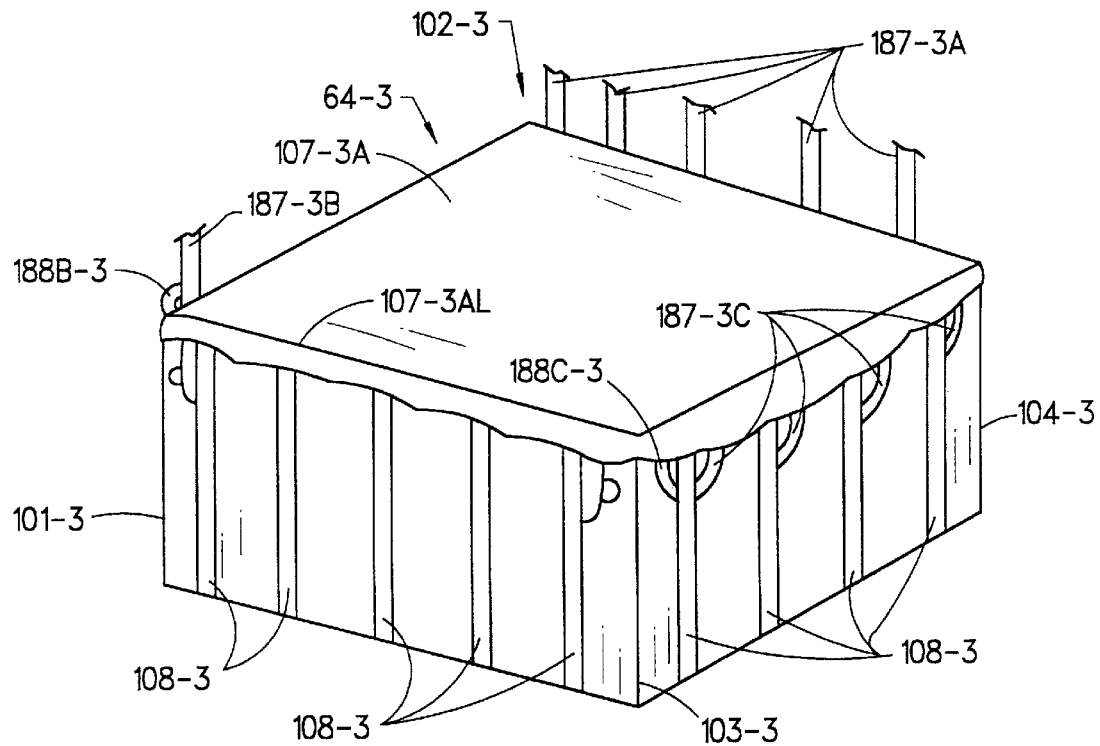
FIG. 41A is a perspective view of the lifter shown in FIG. 40, illustrating one flap of one side of the lifter extending over a container that is within the lifter.
Figure 41B:
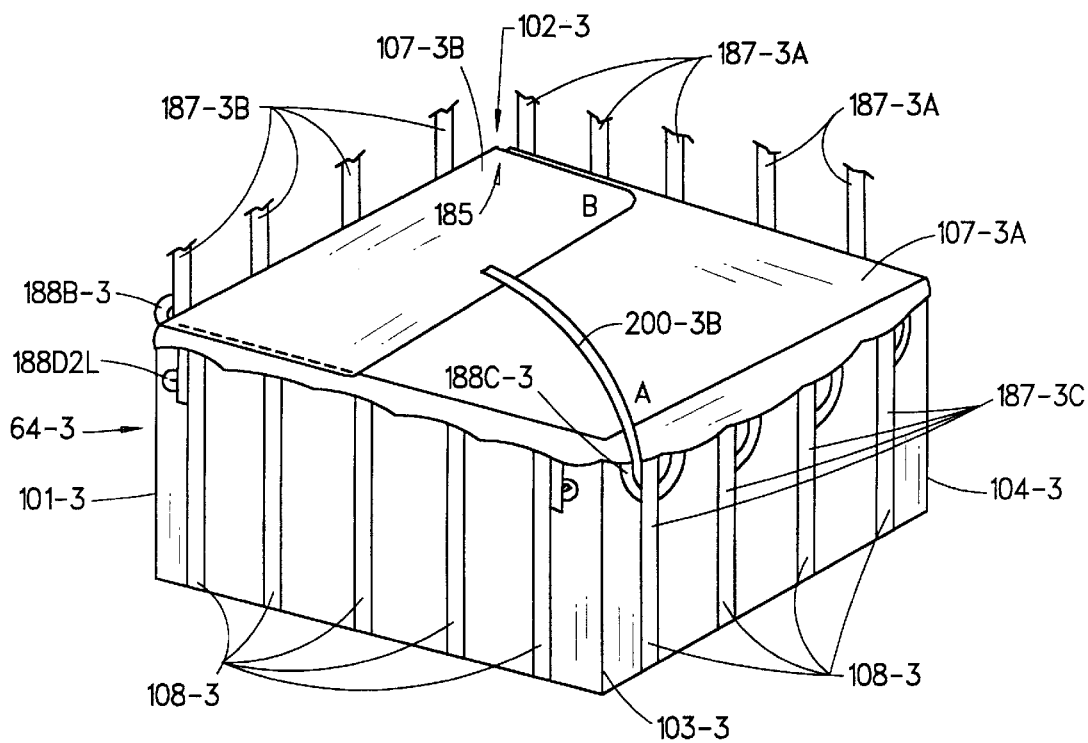
FIG. 41B is a perspective view of the lifter shown in FIGS. 40 and 41A, illustrating a second flap of a second side of the lifter extending over the first flap and tied by a first tie web to tightly hold a tuck at a corner of the lifter.
Figure 41C:
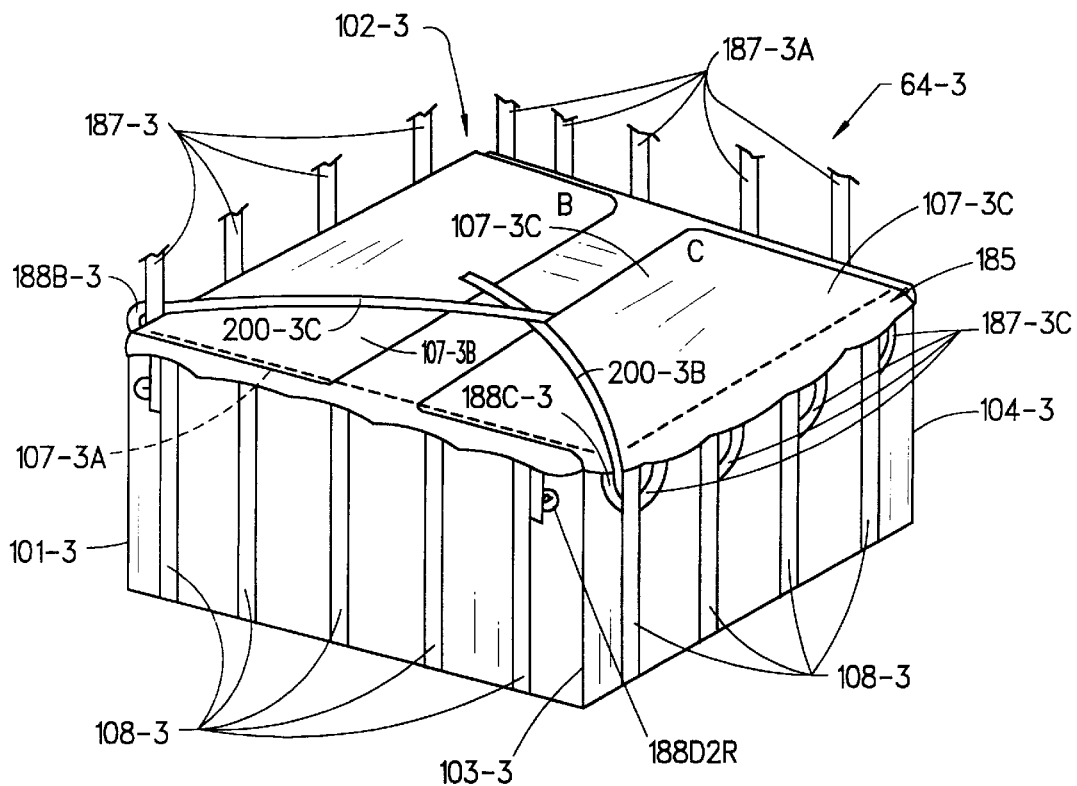
FIG. 41C is a perspective view of the lifter shown in FIGS. 40, 41A, and 41B, illustrating a third flap of a third side of the lifter extending over the first and second flaps and tied by a second web to tightly hold a tuck at another corner of the lifter.
Figure 41D:
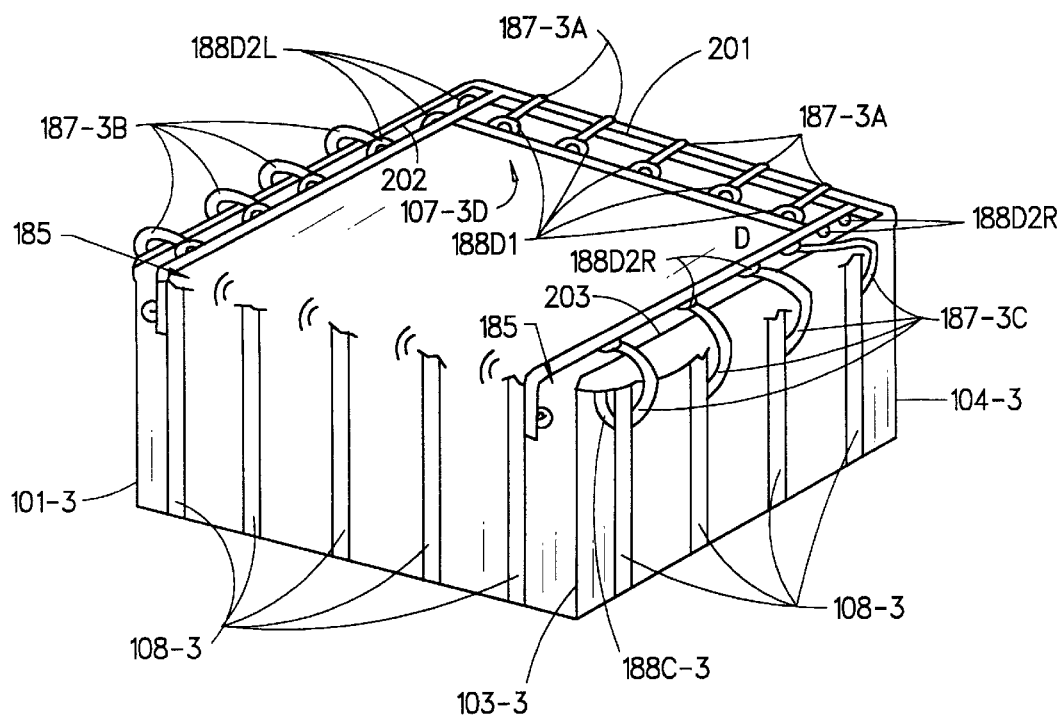
FIG. 41D is a perspective view of the lifter shown in FIGS. 40, 41A, 41B and 41C, illustrating a forth flap of a forth side of the lifter extending over the first, second, and third flaps and tied by other tie webs to loops which tightly hold the fourth flap secure and hold the tucks at the corners of the lifter.
Figure 42:
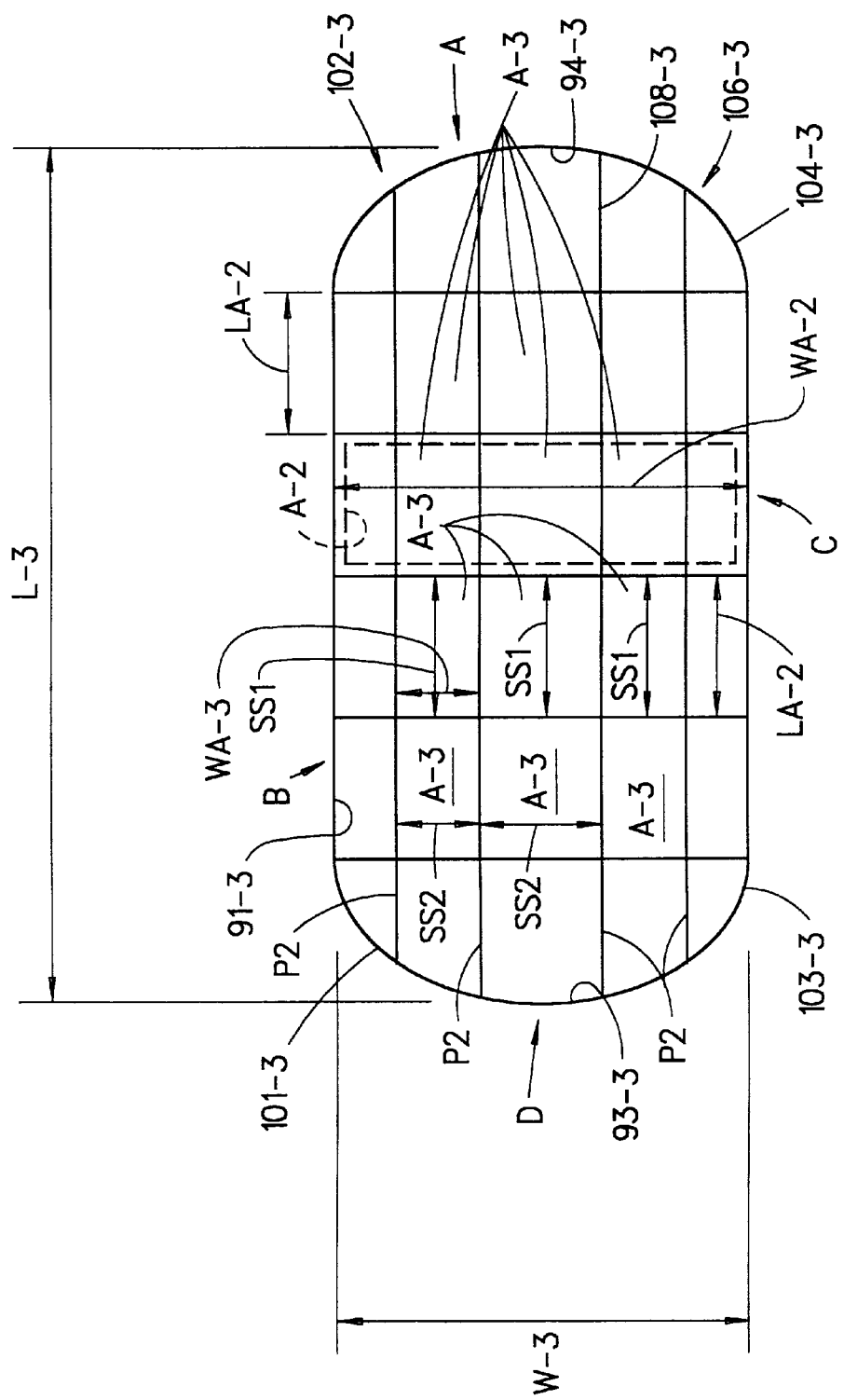
FIG. 42 is a schematic view looking up at the bottom of the third embodiment of the container, showing details of the straps crossing the bottom to divide the bottom into areas.

Considering the respective second and third embodiments 50-2 (FIG. 1B) and 50-3 FIGS. 40, 41 and 42), the crane 66 has a hook 68 connected to a bridle 69 and the bridle 69 is connected to the lift grid 58-2. The lift grid 58-2 distributes two vertical force components (see arrows 72-2 in FIG. 32A) to each of a plurality of connectors 73-2, which in turn provide vertical forces (see arrows 74-2 in FIGS. 32A and 32B).

Figure 31A:
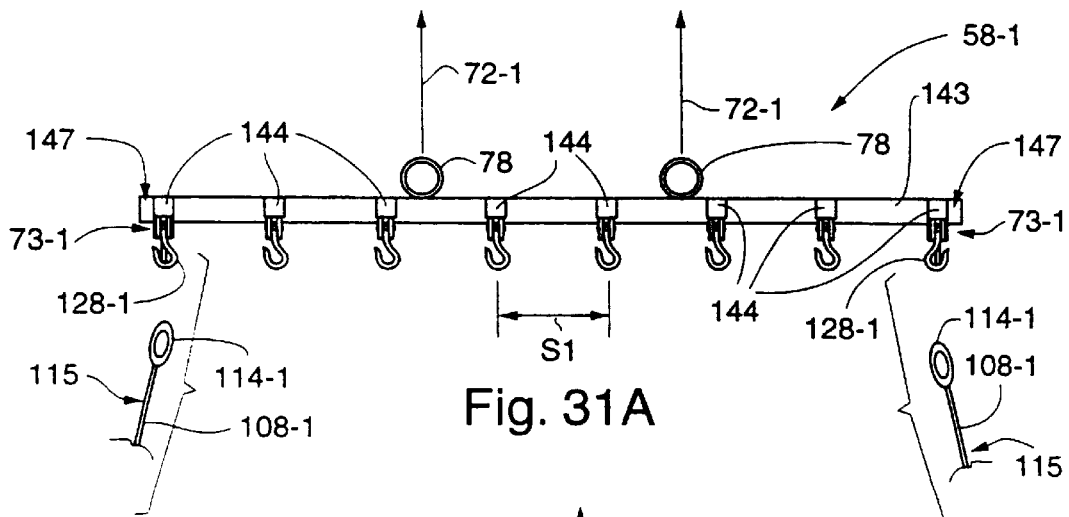
FIG. 31A is an elevational view of one embodiment of the lift grid shown in FIG. 1A.
Figure 31B:
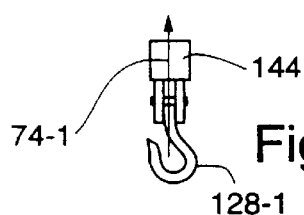
FIG. 31B is an enlarged view of a portion of FIG. 31A showing the hook.

Considering the first embodiment 50-1 (FIG. 1A), the fork lift truck 67 has two forks 77, each designed to enter one of two pipes 78 connected to a similar lift grid 58-1, which also distribute two vertical force components (see arrows 72-1 in FIG. 31A) among a plurality of similar connectors 73-1, which in turn provide vertical forces (see arrows 74-1 in FIG. 31A and 31B). Although the crane 66 is shown used with the second embodiment 50-2 and the fork lift truck 67 is shown used with the first embodiment 50-1, the crane 66 and the fork lift truck 67, and the respective lift grids 58-1 and 58-2, may be used with the opposite embodiments 50-1 and 50-2, respectively.

Figure 11:
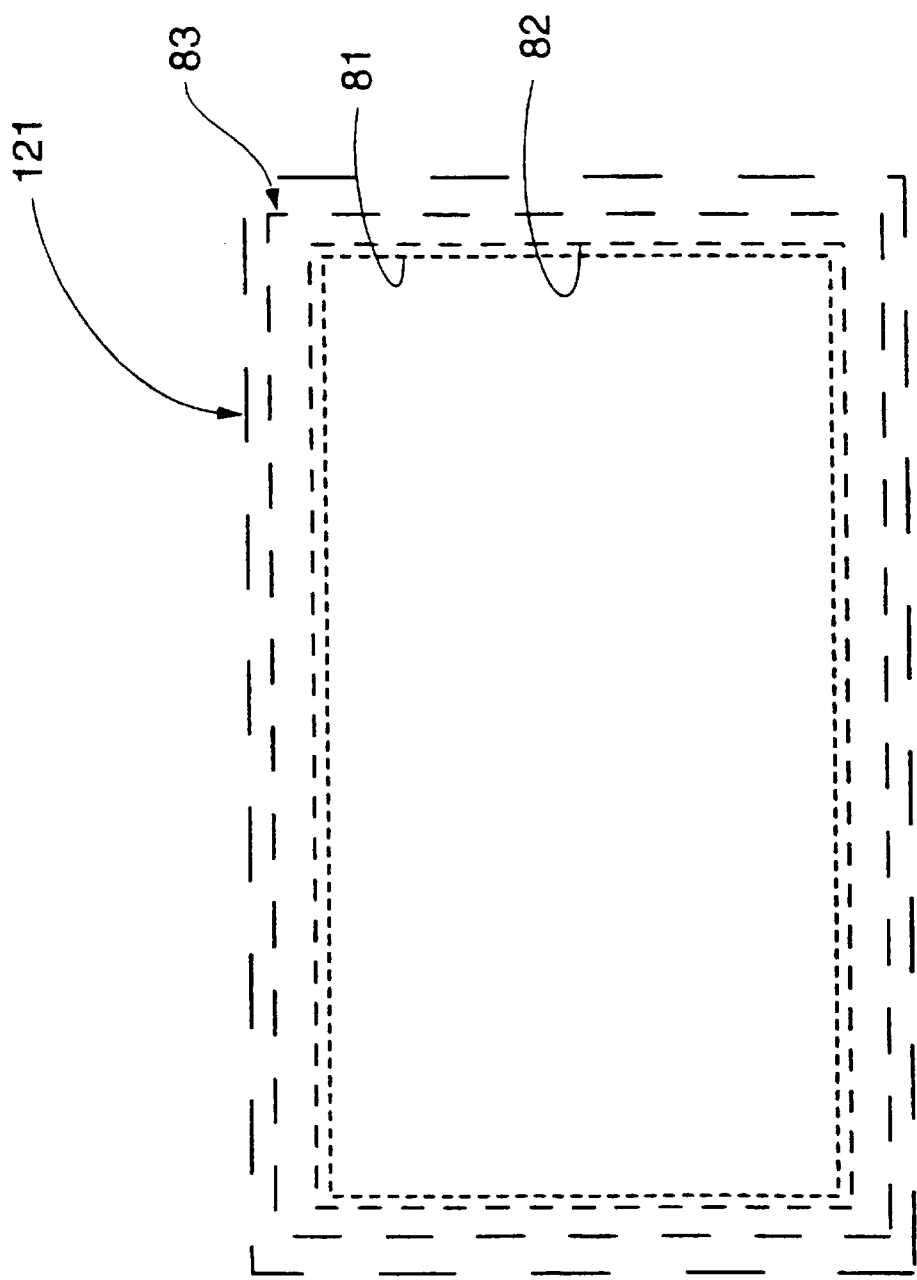
FIG. 11 is a schematic plan view of the system showing various perimeters, including a perimeter of the loading frame, a vertical lift perimeter, an at-rest container perimeter, and a lifted-container perimeter.

In FIGS. 1A and 1B, the lift grid 58 is shown mounting the connectors 73 in spaced relationship around a vertical-lift perimeter 81 that is shown in dash-dash lines in FIG. 11. With the connectors 73 spaced along such vertical lift perimeter 81, each connector 73 is shown in FIGS. 11 and 13 vertically (or very close to vertically) aligned with a lifted-container perimeter 82 (shown by dash, dot, dash lines) of a container-lifter 62 of the system 50. Such lifted-container perimeter 82 is inside, or smaller than, an at-rest-container perimeter 83 (shown by dash, dot, dot, dash lines) of the container-lifter 62.

Figure 23:
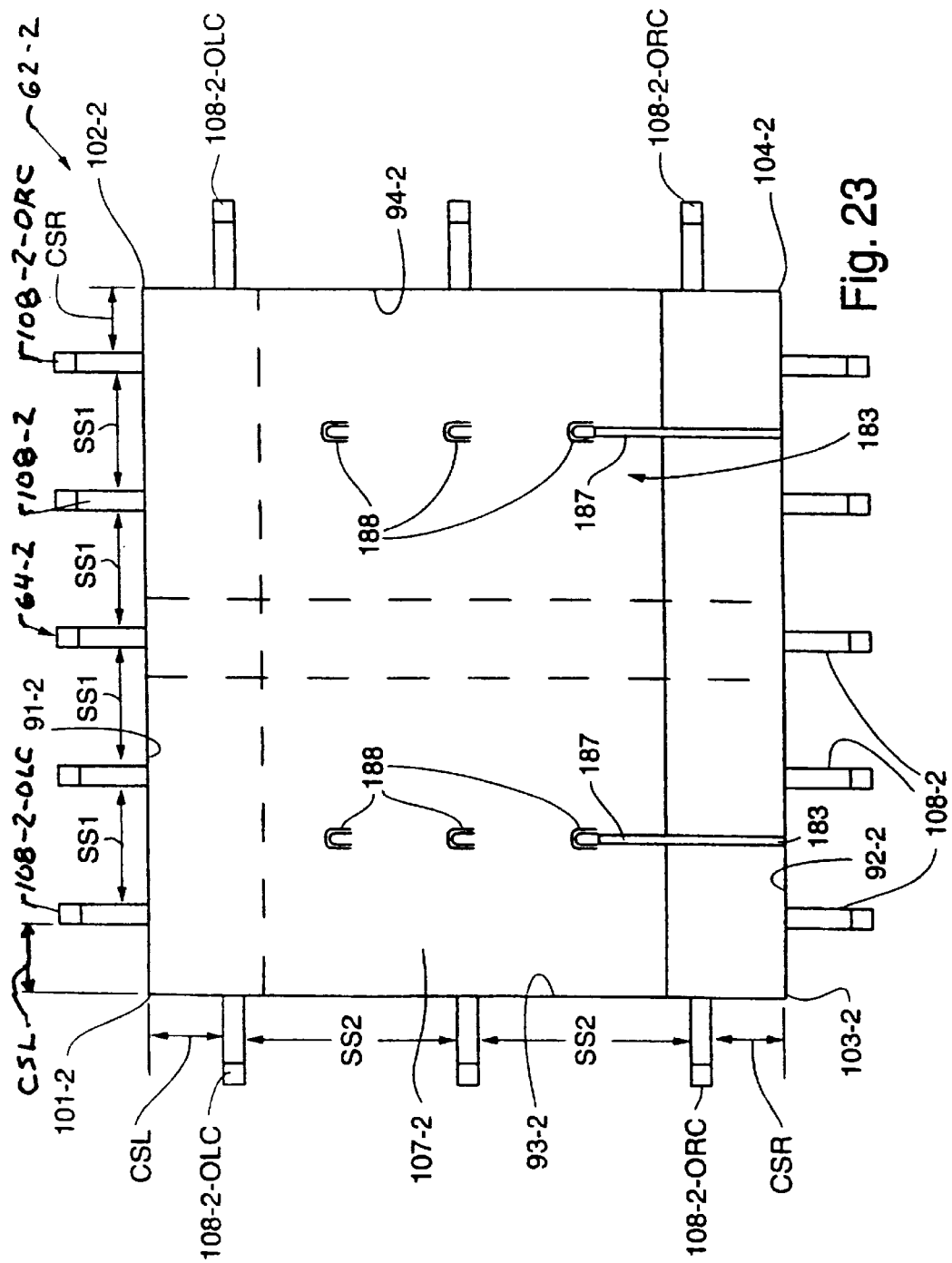
Figure 29:
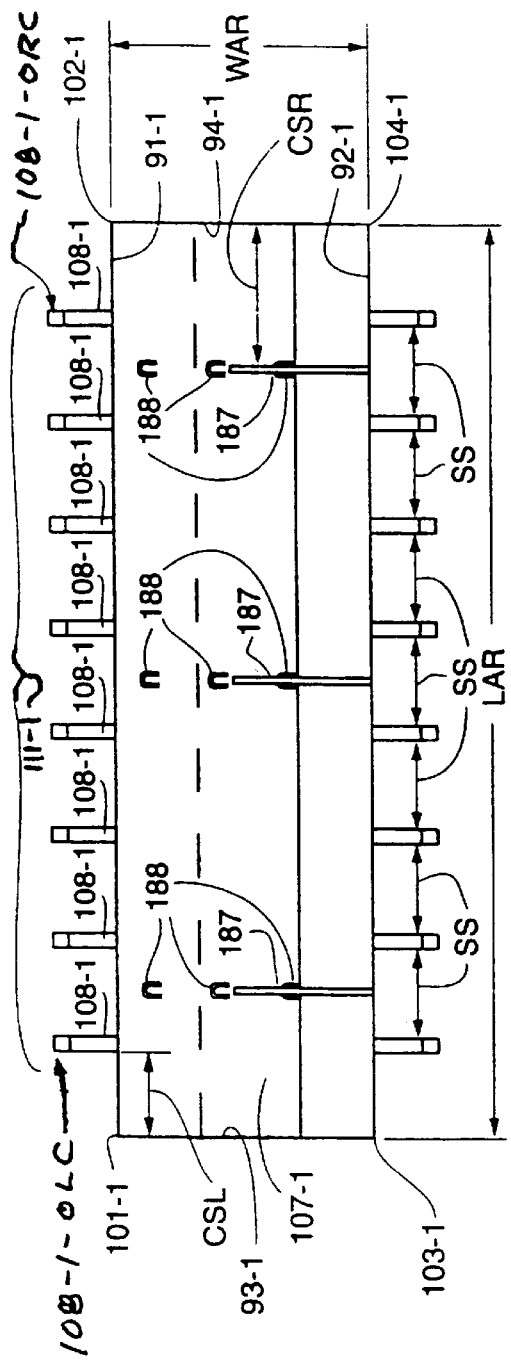
FIG. 29 is a plan view of the first embodiment of the container-lifter shown in FIGS. 27 and 28, showing the opposite walls with the set of the straps secured thereto parallel to each other and the flaps tied to close the top of the container-lifter.

Each container-lifter 62-1, 62-2, and 62-3 includes one of the flexible containers 63 made from sheet-like material 84 (as shown, e.g., in FIG. 30) that defines a three dimensional enclosure 87-2 (FIG. 2) having an open top 88-2, a length L-1 or L-2, a width W-1 or W-2, and a height H-1 or H-2. In each case, the width W is defined by respective first and second opposite walls 91 and 92; and the length L is defined by third and fourth opposite walls 93 and 94, respectively. With the first and second walls 91 and 92, respectively, being opposite to each other, and the third and fourth respective walls 93 and 94 being opposite to each other, FIGS. 23 and 29 show that there is a corner between each adjacent first wall and third wall 91 and 93, respectively, (a corner 101), and between each adjacent first wall and fourth wall 91 and 94, respectively, (a corner 102), and between each adjacent second wall and third wall, 92 and 93, respectively (a corner 103), and between each adjacent second wall and fourth wall, respectively (a corner 104). Each container 63 has a bottom 106 between the first, second, third and fourth walls 91, 92, 93, and 94, respectively. Flaps 107 are provided to close the top 88.

The lifter 64 of the container-lifter 62 is secured to the container 63. For the first embodiment 50-1 (FIGS. 1A, 27 and 28), the lifter 64-1 includes at least two straps 108-1, each having a length (see dimension line LS1 in FIG. 28) greater than twice the height H-1 plus the length L-1 (FIG. 27). The at least two straps 108-1 are referred to as a first set 111-1 (FIG. 29) of straps 108-1, and in the specific example shown in FIGS. 1A, and 27 through 29, the first 111-1 set of straps 108-1 includes eight straps 108-1.

Figure 18:
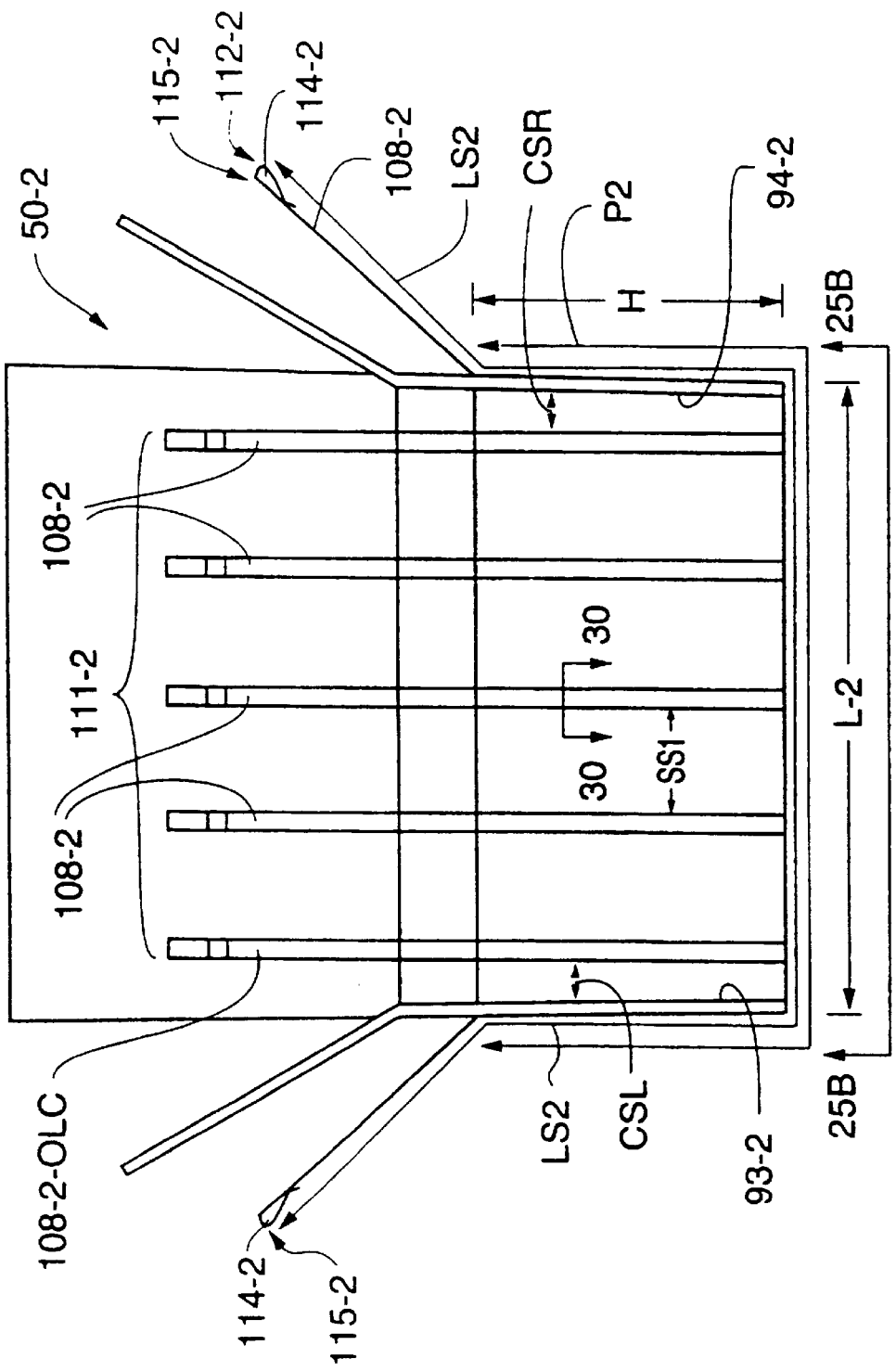
FIG. 18 is a side elevational view of the container-lifter of the present invention showing a wall having one set of the straps secured thereto parallel to each other and extending in a continuous path to the bottom.
Figure 19:
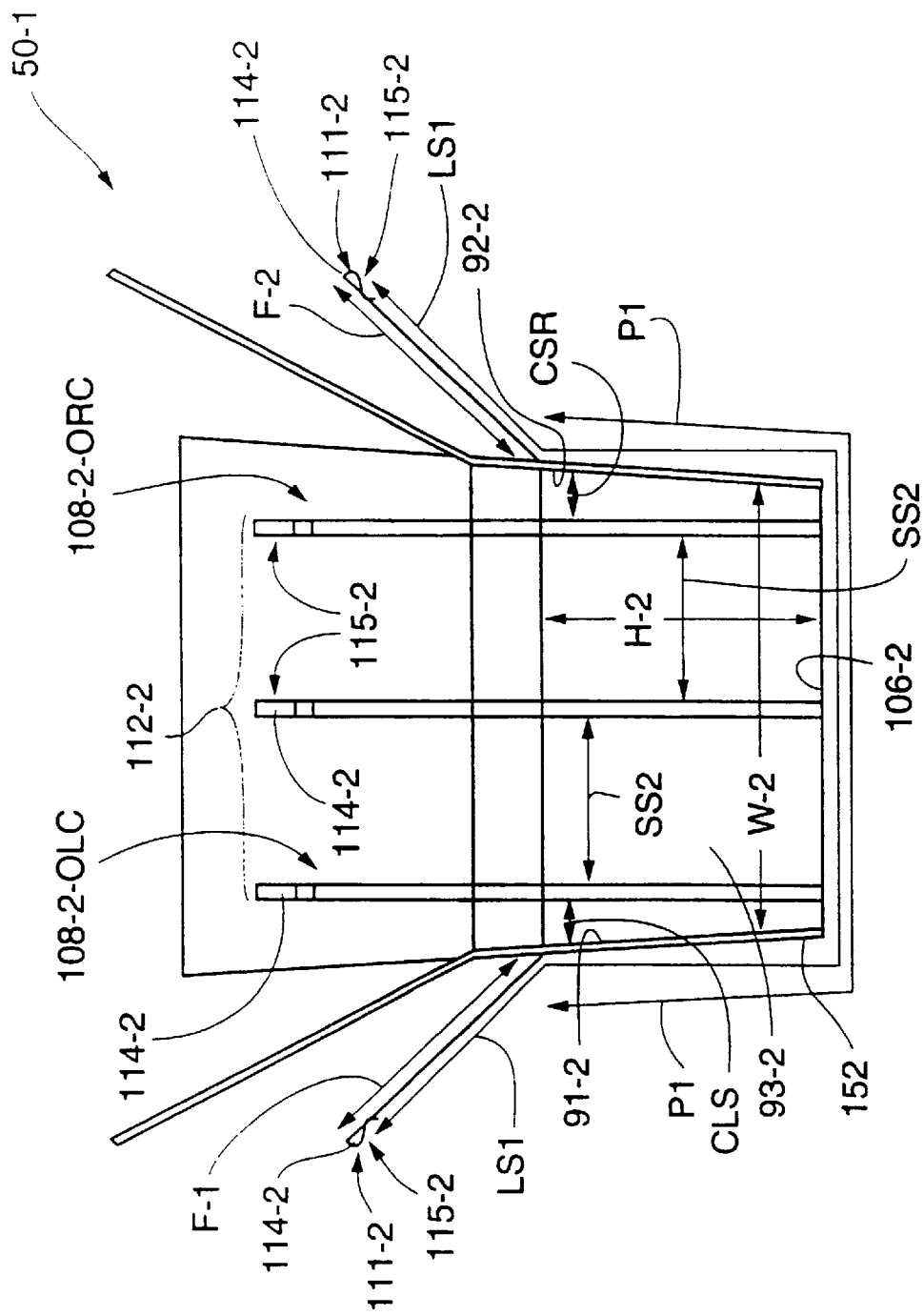
FIG. 19 is an end elevational view of the container-lifter shown in FIG. 18 illustrating another wall having another set of the straps secured thereto parallel to each other and extending in a continuous path to the bottom.

For the second embodiment 50-2 and the third embodiment 50-3 shown in FIGS. 1B, 18, 19, 23, and 40–43, the lifter 64-2 includes at least four straps 108-2. The at least four straps 108-2 include both a first set 111-2 (FIG. 18) of straps 108 and a second set 112 (FIG. 19) of straps 108-2. In the specific example shown in FIGS. 18 and 19, the first set 111-2 of straps 108-2 includes five straps 108-2 and the second set 112-2 of straps 108-2 includes three straps 108-2. In the specific example shown in FIGS. 40 through 42, the first set 111-2 of straps 108-3 includes five straps 108-3 and the second set 112-3 of straps 108-3 includes four straps 108-3. The straps 108-2 of the first set 111-2 have a length LS1 (see dimension line LS1 in FIG. 18) greater than twice the height H-2 (FIG. 19) plus the length L-2 (FIG. 20). The straps 108-2 of the second set 112-2 have a length LS2 (FIG. 18) greater than twice the height H-2 plus the width W-2 (FIG. 19). To avoid duplicate description, in describing the third embodiment 50-3, reference is made to the description of the second embodiment. The straps 108-3 of the first set 111-3 have a length LS1 (corresponding to dimension line LS1 in FIG. 18) greater than twice the height H-2 (FIG. 19) plus the length L-2 (FIG. 20). The straps 108-3 of the second set 112-3 have a length LS2 (FIG. 18) greater than twice the height H-2 plus the width W-2 (FIG. 19).

In each embodiment, the straps 108 of the first set 111 of straps 108 (i.e., at least two straps) extend in a continuous path P1 (first set 111) or P2 (second set 112) or P3 (third set 112). Referring to FIGS. 28 and 19 for the respective first and second embodiments of the container-lifter 62-1 and 62-2, each strap 108 in the first set 111 in the continuous path P extends along and is secured to the first wall 91, with each such strap 108 in the continuous path P1 extending along and being secured to the bottom 106, and each such strap 108 in the continuous path P1 further extending along and being secured to the second wall 92 opposite to the first wall 91. The straps 108-3 of the third embodiment 50-3 have similar structure.

Referring to FIG. 18 for the second embodiment of the container-lifter 62-2, which is applicable to the structure of the third embodiment, each strap 108-2 of the second set 112-2 in the continuous path P2 extends along and is secured to the third wall 93-2, with each such strap 108-2 in the continuous path P2 extending along and being secured to the bottom 106-2, and each such strap 108-2 in the continuous path P2 further extending along and being secured to the fourth wall 94-2 opposite to the third wall 93-2. The continuous paths P1 and P2 of such straps 108-2 in each respective set of straps 111-1 and 112-2 are parallel to each other as shown in FIG. 27 (first embodiment 50-1) and in FIGS. 18 and 19 (second embodiment 50-2).

Also, the continuous path P of each of the straps 108 extends spaced from all of the corners 101 through 104. In particular, as shown in FIGS. 27, 18, and 40 for the respective first embodiment 50-1, second embodiment 50-2, and third embodiment, there is an outer left strap 108-1-OLC or 108-2-OLC of the respective straps 108-1, 108-2, or 108-3. These outer left straps 108 extend in the respective continuous paths P1 (FIGS. 28 and 19) along the first wall 91 nearest to the upper left corner 101 (formed by the first wall 91 and the third wall 93, FIGS. 23 and 29) and are horizontally spaced by a distance CSL (FIGS. 29 and 23) from that corner 101. Similarly, right outer straps 108-1-ORC and 108-2-ORC extend in the continuous path P1 along the first wall 91 nearest to the other (upper right) corner 102 (formed by the first wall 91 and the fourth wall 94) and are horizontally spaced by a distance CSR (FIGS. 27 and 19) from that corner 102.

Reference is made to the second set 112-2 of straps 108-2 shown in FIG. 19, which is also applicable to the third embodiment. As shown in FIG. 23, a right outer strap 108-2-ORC extends in the continuous path P2 (FIG. 18) along the third wall 93-2 nearest to the other corner 103-2 (formed by the third wall 93-2 and the second wall 92-2). Such right outer strap 108-2-ORC is horizontally spaced by a distance CSR from that corner 103-2. Similarly, a left outer strap 108-2-OLC extends in the continuous path P2 (FIG.

18) along the third wall 93-2 nearest to the other corner 101-2 formed by the first wall 91-2 and the third wall 93-2. Such left outer strap 108-2-OLC is horizontally spaced by a distance CSL (FIGS. 19 and 23) from that corner 103-2.

Each of the outer straps 108-1-ORC and 108-1-OLC, and 108-2-ORC and 108-2-OLC, is spaced from the respective corner 101, 102, 103, or 104.

Each such strap 108 of the first set 111 of straps 108 has a first free length F1 (see e.g., FIGS. 28 and 19) extending past such first wall 91 and has a second free length F2 extending past such second opposite wall 92. Each such strap 108-2 of the second set 112-2 of straps 108-2 has a first free length F3 (FIG. 18) extending past the third wall 93 and has a second free length F2 extending past the fourth opposite wall 94.

Each such strap 108 is provided with a coupling 114 at a free end 115 of the respective free length F1, F2, F3, and F4 to facilitate connection of each strap 108 to one of the connectors 73 of the lift grid 58. Such straps 108 and couplings 114 are made from strong material, so that such straps 108 and couplings 114 are capable of collectively applying to such container 63 more than a minimum total of six thousand pounds of force vertically, such as a total of in excess of twenty-thousand pounds in the second embodiment 50-2 of the container-lifter 62-2 (FIG. 1B), and such as a total of in excess of twenty four thousand pounds in the third embodiment 50-3 of the container-lifter 62-3 (FIG. 40). Such container 63 is made from such material as is capable of containing bulk cargo 51 weighing more than six thousand pounds, such as twenty thousand pounds in the second embodiment of the container-lifter 62-2 when such straps 108-2 apply such force to such container 63-2, and such as twenty four thousand pounds in the third embodiment of the container-lifter 62-3 when such straps 108-3 apply such force to such container 63-3.

Figure 13A:
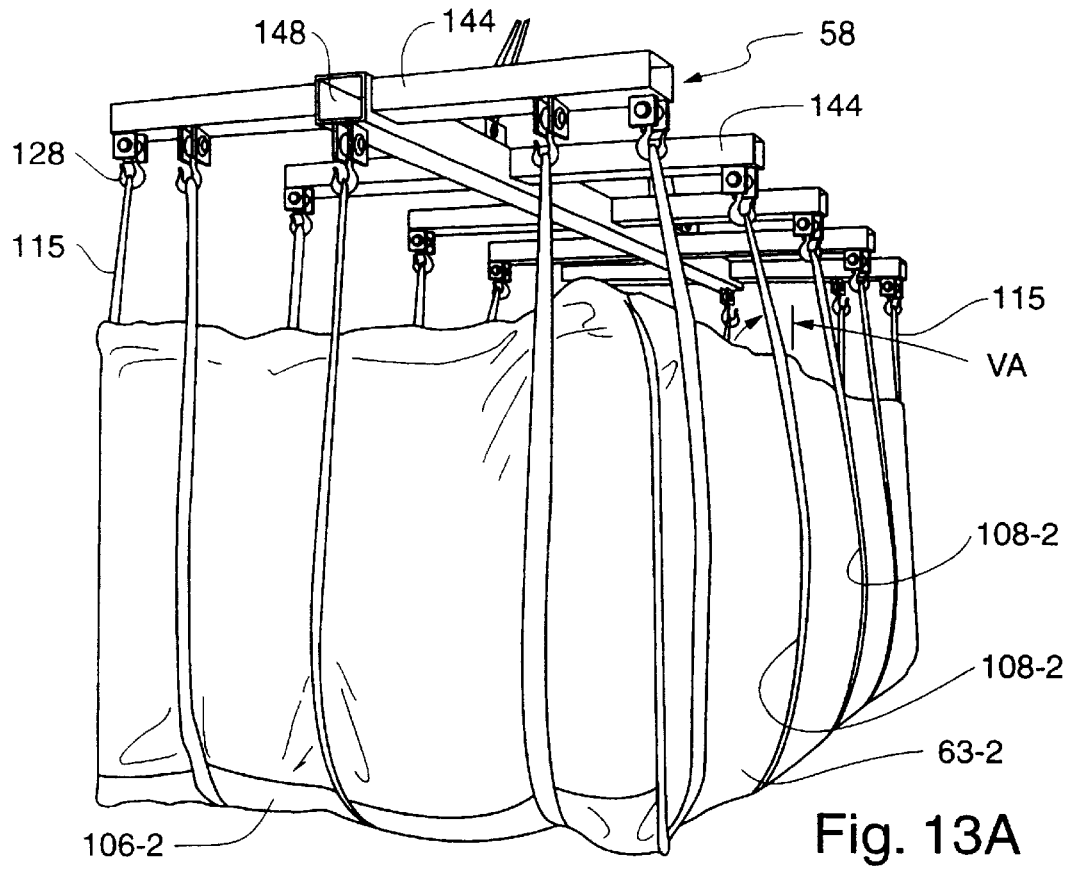
Figure 13B:
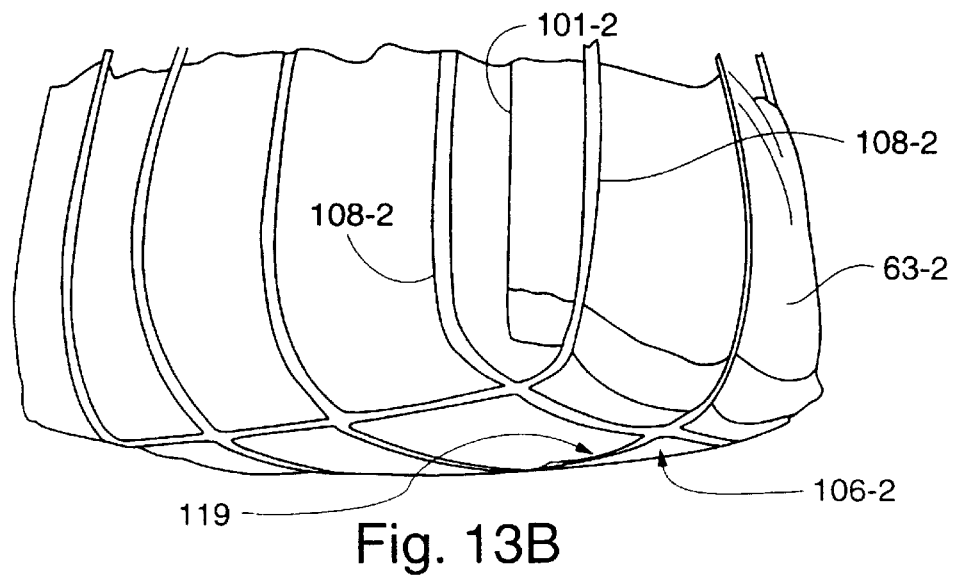

In FIGS. 13A through 13C, where the second embodiment of the container-lifter 62-2 is shown lifted from a support surface 116, a small acute angle (shown by arrow VA) indicates that the free lengths F1, F2, F3, and F4 of the straps 108 may be off exact vertical as they hang from the connectors 73. If not zero, the value of the acute angle VA depends on the type of the bulk cargo 51, the weight of such cargo 51 in the container 63, and the smoothness of the inner wall 117. In the second embodiment of the container-lifter 62-2, which is shown in FIGS. 13A through 13C carrying 25,560 pounds of bulk cargo 51 (four inch gravel), the acute angle VA was a maximum of ten degrees, for example. In the third embodiment of the container-lifter 62-3, which is shown in FIGS. 40 through 43 carrying twenty-four thousand pounds of bulk cargo 51 (four inch gravel), the acute angle VA was a maximum of ten degrees, for example, The first embodiment of the container-lifter 62-1 is specially applicable to contain and lift bulk cargo 51 of the type described above as resulting from demolition of hazardous material waste sites commonly found at remediation sites such as those described above, e.g., demolition debris 54 in the form of concrete pillars and beams, and scrap steel. While such bulk cargo 51 need not necessarily be radioactive hazardous material waste, the advantages of the system 50-1 are especially applicable to such bulk cargo 51 as is described above as being contaminated by being radioactive, or by being covered with radioactive material. The demolition debris 54 (shown hidden in FIG. 27) have lengths DL which may correspond to the length L-1 of the first embodiment of the container 63-1, for example. The container 63-1 of the first embodiment 50-1 of the system 50 is shown (FIGS. 1A, 27 and 29) having eight straps 108-1 spaced evenly (see equal dimensional arrows SS in FIG. 29) across the respective first wall 91-1 and second wall 92-1 and across the bottom 106-1 (FIG. 14A) from the third wall 93-1 to the fourth wall 94-1. The first embodiment 50-1 is referred to as the demolition debris embodiment and may have the length L-1 of seventeen feet, for example, and the width W-1 (FIG. 28) of four feet, for example, and the height H-1 of two feet, for example. The corners 101-1, 102-1, 103-1 and 104-1 are at the junctions of adjacent ones of the respective walls 91-1 and 93-1, 91-1 and 94-1, 93-1 and 92-1, and 94-1 and 92-1.

As shown in FIG. 29, with respect to the first wall 91-1, each of the straps 108-1 of the first set 111-1 of straps 108-1 is evenly spaced by the distance SS from the next adjacent strap 108-1 along the respective first wall 91-1 and the second wall 92-1. The term "evenly spaced" means that each strap 108-1 is spaced by the same distance SS from the next adjacent strap 108-1. In FIG. 29, all of the straps 108-1 of the first set 111-1 are spaced from all of the corners 101-1, 102-1, 103-1, and 104-1.

As shown in FIG. 30 applicable to the respective first, second, and third embodiments of the container-lifter 62-1, 62-2, and 62-3, as the evenly spaced straps 108-1 of the first set 111-1 extend in the continuous paths P1 across the first wall 91-1 and the bottom 106, the straps 108-1 are secured to such wall 91-1 and bottom 106-1 (as by sewn threads 118) and thus are held having the even spacing SS.

Figure 14A:
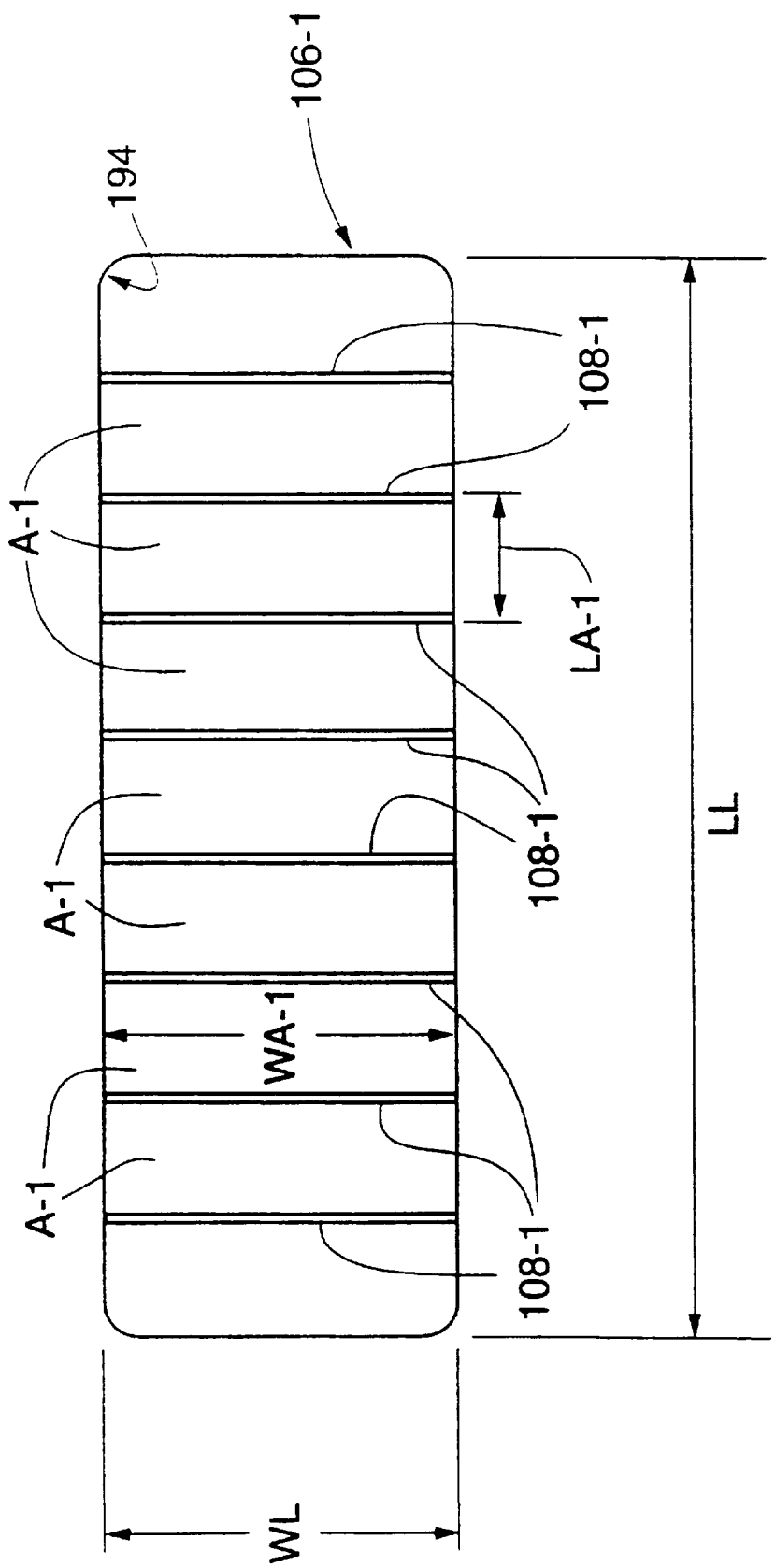
FIGS. 14A and 14B are schematic views looking up at the bottom of two embodiments of the container, showing details of the straps crossing the bottom to divide the bottom into areas.

Referring to FIG. 14A, with respect to the first embodiment 50-1, as the straps 108-1 cross the bottom 106-1, the straps 108-1 define a series of uniformly shaped first areas A-1 of the bottom 106-1. Each of such areas A-1 is bounded by at least two adjacent ones of the straps 108-1 (shown in FIG. 14A as two), and the areas A-1 have a width WA-1 and a length LA-1. The widths WA-1 extend completely across the width W (or WL) of the bottom 106-1. The lengths LA-1 are a fraction of the length L (or LL) of the container 63-1, and correspond to the spacing SS1 of the straps 108-1 relative to each other. Thus, the lengths LA-1 are short relative to the value of the entire length LL of the bottom 106-1.

As shown in FIGS. 1A and 14A, the even spacing SS1 of the straps 108-1 across the first wall 91-1 and the second wall 92-1 and the bottom 106-1 enables the straps 108-1 to apply the vertical forces 74-1 from the connectors 73-1 to the bottom 106-1 uniformly across the bottom 106-1 so that each of the areas A-1 receives generally the same amount of vertical force 74-1. Those generally equal amounts of vertical forces 74-1 applied to the first areas A-1 are spaced from the corners 101-1, 102-1, 103-1, and 104-1 by the respective distances CSL and CSR (FIG. 27). In this manner, the first areas A-1, on which most of the total weight of the bulk cargo 51 acts on the bottom 106-1, directly receive the lifting forces in the form of the vertical forces 74-1.

The respective second and third embodiments of the container-lifter 62-2 and 62-3 are generally applicable to bulk cargo 51 in the form of natural materials resulting from clean up of industrial sites, such as hazardous material waste sites (e.g., the remediation sites such as those described above). The natural materials include dirt, gravel, and other natural materials, for example. These materials are bulk materials as described above. While such bulk cargo 51 need not necessarily be radioactive hazardous material waste, the advantages of the systems 50-2 and 50-3 are especially applicable to such bulk cargo 51 as is described above as being contaminated by being radioactive, or by being covered with radioactive material. The container 63-2 of the second embodiment 50-2 (FIGS. 1B and 10) is shown having the first set 111-1 of straps 108-2 including five straps 108-2 spaced evenly across the respective first wall 92-2, the second wall 92-2, and the bottom 106-2.

Figure 2:
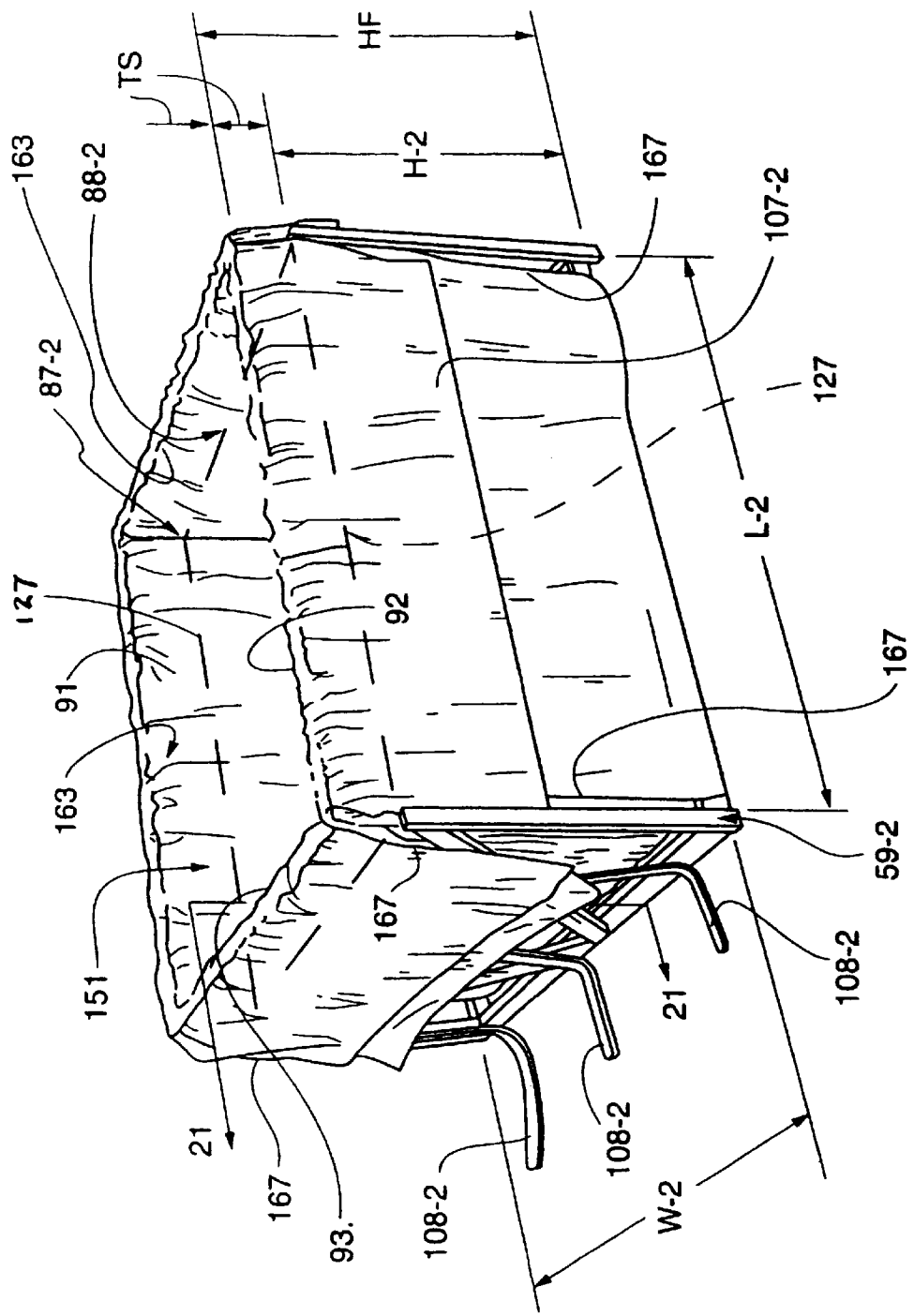
FIG. 2 is a perspective view of the second embodiment of the system of the present invention showing a loading frame for supporting a container-lifter for loading the bulk cargo into a container.
Figure 14B:
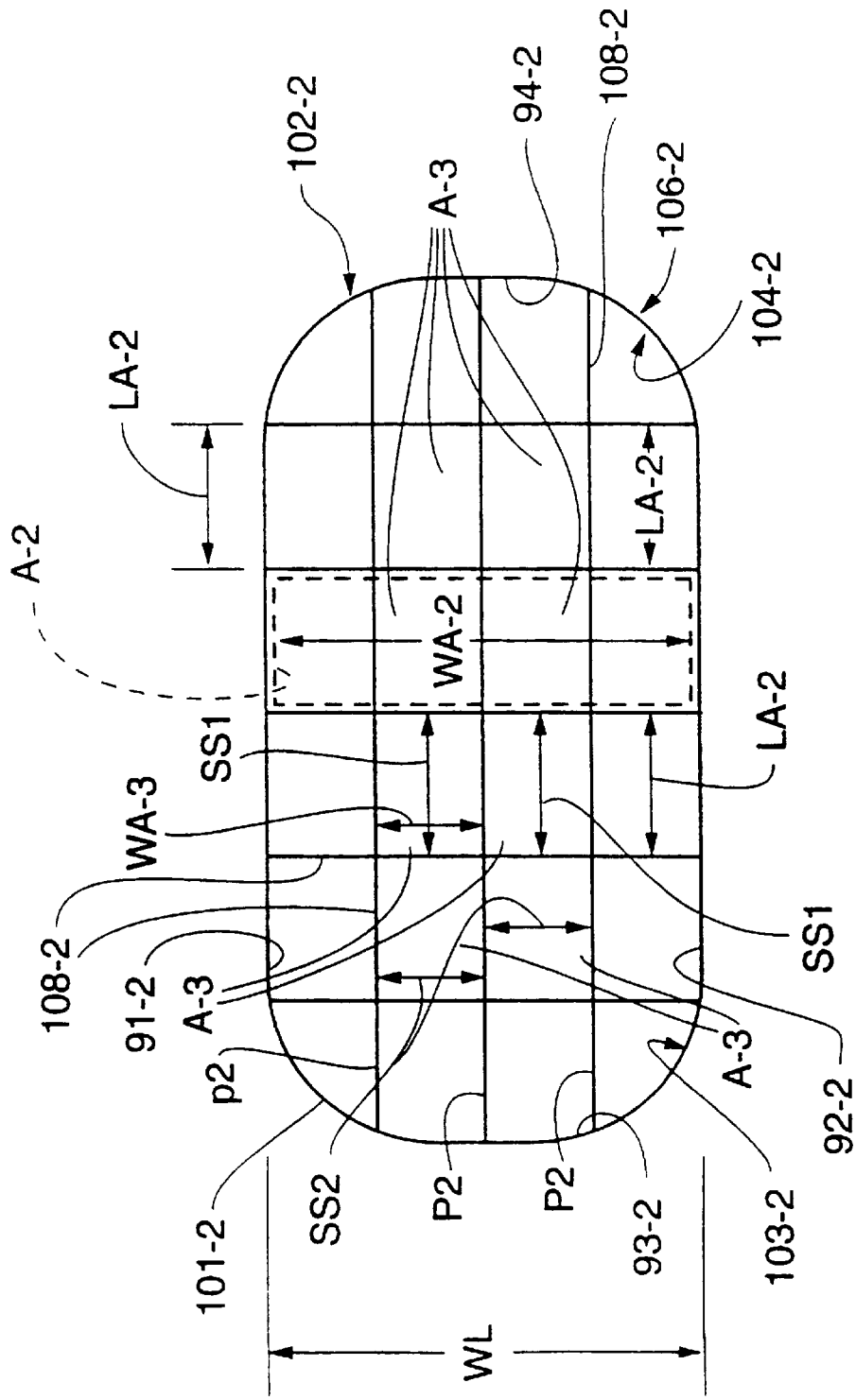
Figure 16:
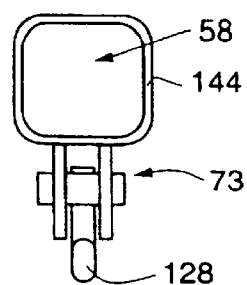
FIG. 16 is a cross sectional view taken along line 16—16 in FIG. 15, showing one lateral beam of the lift grid and a hook of the connector.
Figure 17:
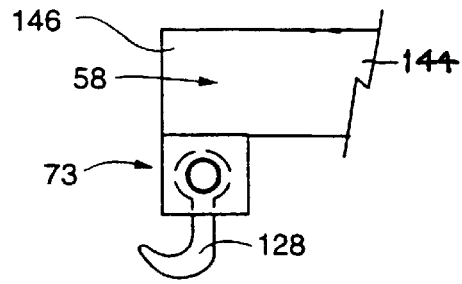
FIG. 17 is an elevational view taken along line 17—17 in FIG. 15, showing the hook of the connector.
Figure 15:
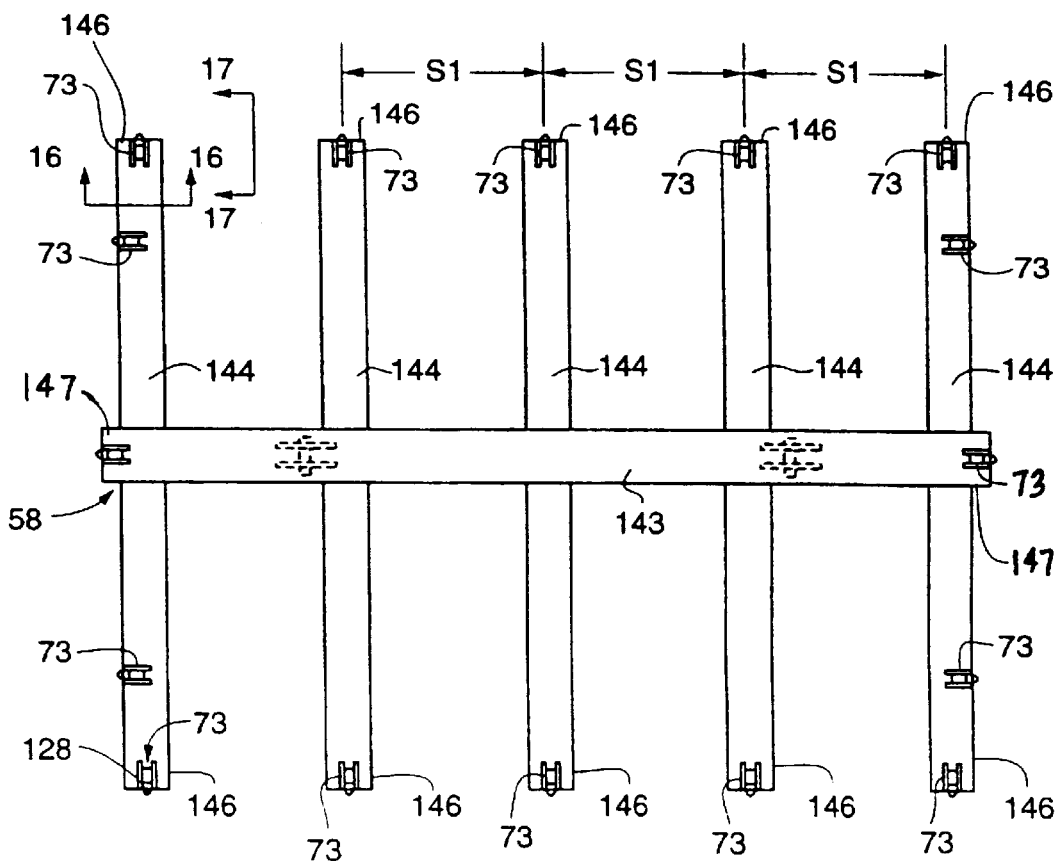
FIG. 15 is a plan view of the lift grid.

Further, the container 63-2 of the second embodiment 50-2 is shown in FIGS. 14B and 19 having the second set 112-2 of straps 108-2, including the three straps 108-2, spaced evenly across the third wall 93-2, the fourth wall 94-2, and the bottom 106-2. The second embodiment of the container-lifter 62-2 is referred to as a "ten ton" container-lifter 62-2, which means that the container-lifter 62-2 has a rated capacity of carrying ten tons of bulk cargo 51. For example, a prototype of the container-lifter 62-2 has been successfully tested carrying and lifting 25,560 pounds, and has a rated lift and containment capacity of ten tons. Referring to FIG. 2, the ten ton container-lifter 62-2 has a length dimension L-2 of nine feet, a width dimension W-2 of seven feet and a working, or loaded, height dimension H-2 of four feet.

Figure 43:
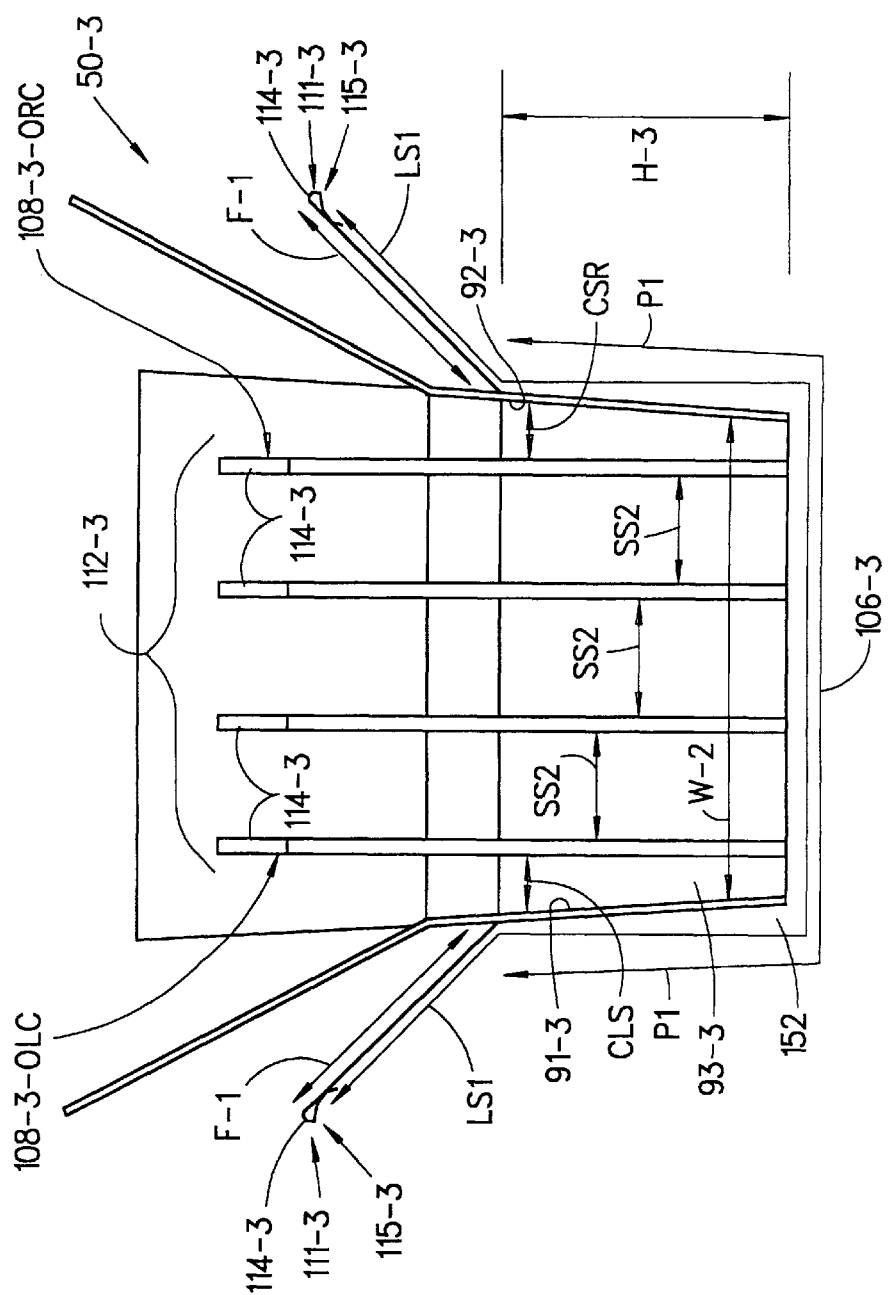
FIG. 43 is an end elevational view of the third embodiment of the lifter, illustrating a wall having four straps secured thereto parallel to each other and extending in a continuous path to the bottom of the lifter.

The container 63-3 of the third embodiment 50-3 (FIGS. 40 through 43) is shown having the first set 111-3 of straps 108-3 including five straps 108-3 spaced evenly across the respective first wall 92-3, the second wall 92-3, and the bottom 106-3. Further, the container 63-3 of the third embodiment 50-3 is shown in FIGS. 40 and 43 having the second set 112-3 of straps 108-3, including the four straps 108-3, spaced evenly across the third wall 93-3, the fourth wall 94-3, and the bottom 106-3. The third embodiment of the container-lifter 62-3 is referred to as a "twelve ton" container-lifter 62-4, which means that the container-lifter 62-4 has a rated capacity of carrying twelve tons of bulk cargo 51. For example, a prototype of the container-lifter 62-3 has been successfully tested carrying and lifting thirty thousand pounds, and has a rated lift and containment capacity of twelve tons. Referring to FIGS. 40 through 43, the twelve ton container-lifter 62-3 has a length dimension L-3 of eight feet, a width dimension W-3 of seven feet and an intended working, or maximum useful loaded, height dimension H-3 of four and one half feet.

The corners 101-2, 102-2, 103-2 and 104-2 are provided in the container 63-2 of the second embodiment 50-2 in a manner similar to the first embodiment 50-1. Similarly, the corners 101-3, 102-3, 103-3 and 104-3 are provided in the container 63-3 of the third embodiment 50-3 in a manner similar to the first embodiment 50-1. Using the second embodiment as an example of the structure of the respective second and third embodiments 50-2 and 50-3, as shown in FIG. 14B, each of the straps 108-2 of the first set 111-2 of straps 108-2 is evenly spaced along the respective first and second walls 91-2 and 92-2 and is spaced from all of the corners 101-2, 102-2, 103-2 and 104-2 (FIGS. 14B and 23). As shown in FIG. 23, along the first wall 91-2, outer straps 108-2-OLC and 108-2-ORC of the first set 111-2 are spaced from the respective corners 101-2 and 102-2 of the first wall 91-2. Along the second wall 92-2, those same outer straps 108-2-OLC and 108-2-ORC of the first set 111-2 are spaced from the respective corners 103-2 and 104-2 of the second wall 92-2.

Continuing to use the second embodiment as an example of the structure of the respective second and third embodiments 50-2 and 50-3, similarly, each of the straps 108-2 of the second set 112-2 of straps 108-2 is evenly spaced along the third and fourth walls 93-2 and 94-2, respectively, and is spaced from all of the corners 101-2, 102-2, 103-2 and 104-2. Along the third wall 93-2, outer straps 108-2-OLC and 108-2-ORC of the second set 112-2 are spaced from the respective corners 101-2 and 103-2 of the third wall 93-2. Along the fourth wall 94-2, those same outer straps 108-2-ORC and 108-2-OLC of the second set 112-2 are spaced from the respective corners 102-2 and 104-2 of the fourth wall 94-2.

Continuing to use the second embodiment as an example of the structure of the respective second and third embodiments 50-2 and 50-3, as shown in FIG. 14B, as the evenly spaced straps 108-2 of the first set 111-2 of straps 108-2 extend in the continuous paths P1 and P2 from the respective first wall 91-2 and second wall 92-2 across the bottom 106-2, the straps 108-2 are secured to such walls 91-2 and 92-2, respectively, and bottom 106-2 and thus are held evenly spaced (see arrows SS1) and define a series of uniformly shaped first areas A-2 of the bottom 106-2 (see dashed lines in FIG. 14B showing one such first area A-2) of the container 63-2. Each of such first areas A-2 is bounded by at least two adjacent ones of the straps 108-2 of the first set 111-2 extending across the bottom 106-2 from the first wall 91-2 to the second wall 92-2. The first areas A-2 have a width WA-2 and a length LA-2. The widths WA-2 extend completely across the width W of the bottom 106-2 of the container 63-2, whereas the lengths LA-2 are a fraction of the length L (FIG. 18) of the container 63-2.

In the respective second and third embodiments 50-2 and 50-3, different from the first embodiment 50-1, the first areas A-2 defined between the respective straps 108-2 and 108-3 of the first set 111-2 are divided into smaller, second areas A-3 by the respective straps 108-2 and 108-3 of the respective seconds set 112-2 and 112-3. Thus, as also shown in FIG. 14B, as the evenly spaced straps 108-2 of the second set 112-2 of straps 108-2 extend in the continuous paths P2 (FIG. 18) across the bottom 106-2 from the third wall 93-2 to the fourth wall 94-2, these straps 108-2 are secured to such respective walls 93-2 and 94-2, and to the bottom 106-2, and thus are held evenly spaced (see arrows SS2) and divide the many uniformly shaped first areas A-2 of the bottom 106-2 into the smaller, second areas A-3 (see also FIG. 42). Each of such second areas A-3 is bounded by a strap grid 119 defined by four adjacent ones of the straps 108-2, two straps 108-2 of the first set 111-2 extending from the first wall 91-2 to the second wall 92-2, and two straps 108-2 of the second set 112-2 extending from the third wall 93-2 to the fourth wall 94-2. The second areas A-3 have a width WA-3 and the length LA-2. The widths WA-3 are a fraction of the width W of the container 63-2 and the lengths LA-2 are a fraction of the length L-2 of the container 63-2. Similar structure shown in FIG. 43 is provided in the third embodiment.

As shown in FIG. 18 with respect to the second embodiment 50-2, and as is also applicable to the third embodiment 50-3, there are the even spacings SS1 of the straps 108-2 of the first set 111-2 across the first wall 91-2. As shown in FIG. 14B, the even spacing SS1 of the straps 108-2 continues on the opposite second wall 92-2 and on the bottom 106-2. As shown in FIG. 19 with respect to the second embodiment 50-2 and in FIG. 43 with respect to the third embodiment 50-3, there are the even spacings SS2 of the straps 108-2 of the respective second sets 112-2 and 112-3 across the third wall 93-2. As shown in FIG. 14B, the even spacing SS2 of the straps 108-2 continues on the opposite fourth wall 94-2 and on the bottom 106-2. These even spacings SS1 and SS2 result in the lengths LA-2 being short relative to the value of the entire length L-2 of the bottom 106-2, and result in the widths WA-3 being short relative to the value of the entire width W-2 of the bottom 106-2. Such even spacings SS1 and SS2 enable the straps 108-2 of the first set 111-2 and of the second set 112-2, and enable the straps 108-3 of the first set 111-3 and of the second set 112-3, to apply the respective vertical forces 74-2 (FIGS. 32A and B) and 74-3 to the bottom 106-2 uniformly across both the length L-2 and the width W-2 of the respective bottom 106-2 and 106-3 so that each of the second areas A-3 receives generally the same amount of the respective vertical force 74-2 or 74-3 from the respective straps 108-2 or 108-3 of the respective first set 111-2 or 111-3 and of the respective second set 112-2 or 112-3. Those generally equal amounts of vertical forces 74-2 or 74-3 applied by the strap grids 119 to the second areas A-3 are spaced from the respective corners 101, 102, 103 and 104. As seen in FIG. 14B, the value of the areas bounded by the two outer straps 108-2-OCR and 108-2-OCL and the bottom 106-2 toward the respective corners 101-2, 102-2, 103-2, and 104-2, are less than the second areas A-3, such that the walls that form the corners, and such two outer straps 108-2-OCR and 108-2-OCL provide enough vertical force 74-2 to lift the corners of the bottom 106-2. The same analysis applies to the third embodiment 50-3.

Figure 3:
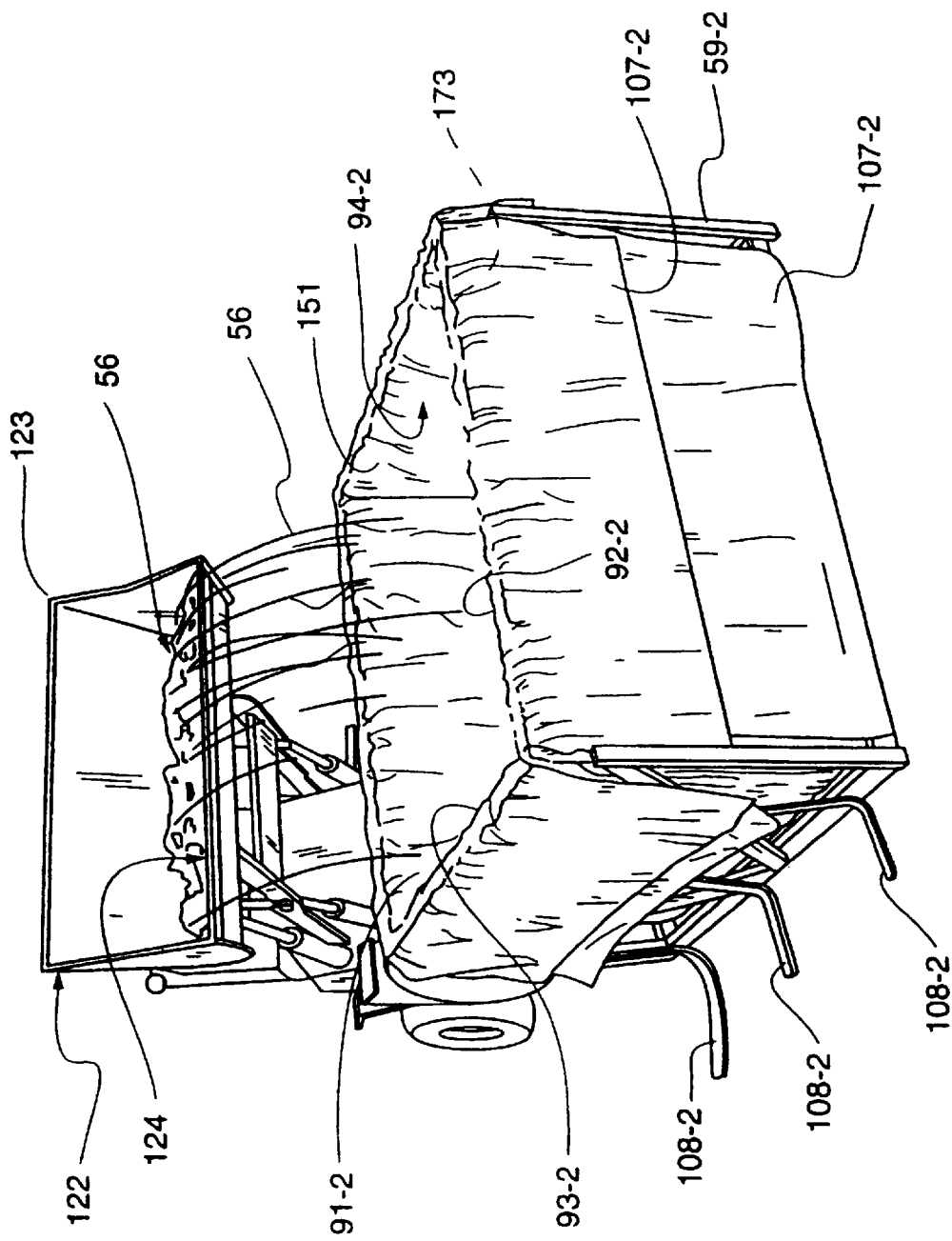
FIG. 3 is a perspective view of the second embodiment of the system of the present invention showing a front loader loading the bulk cargo into the container.
Figure 4:
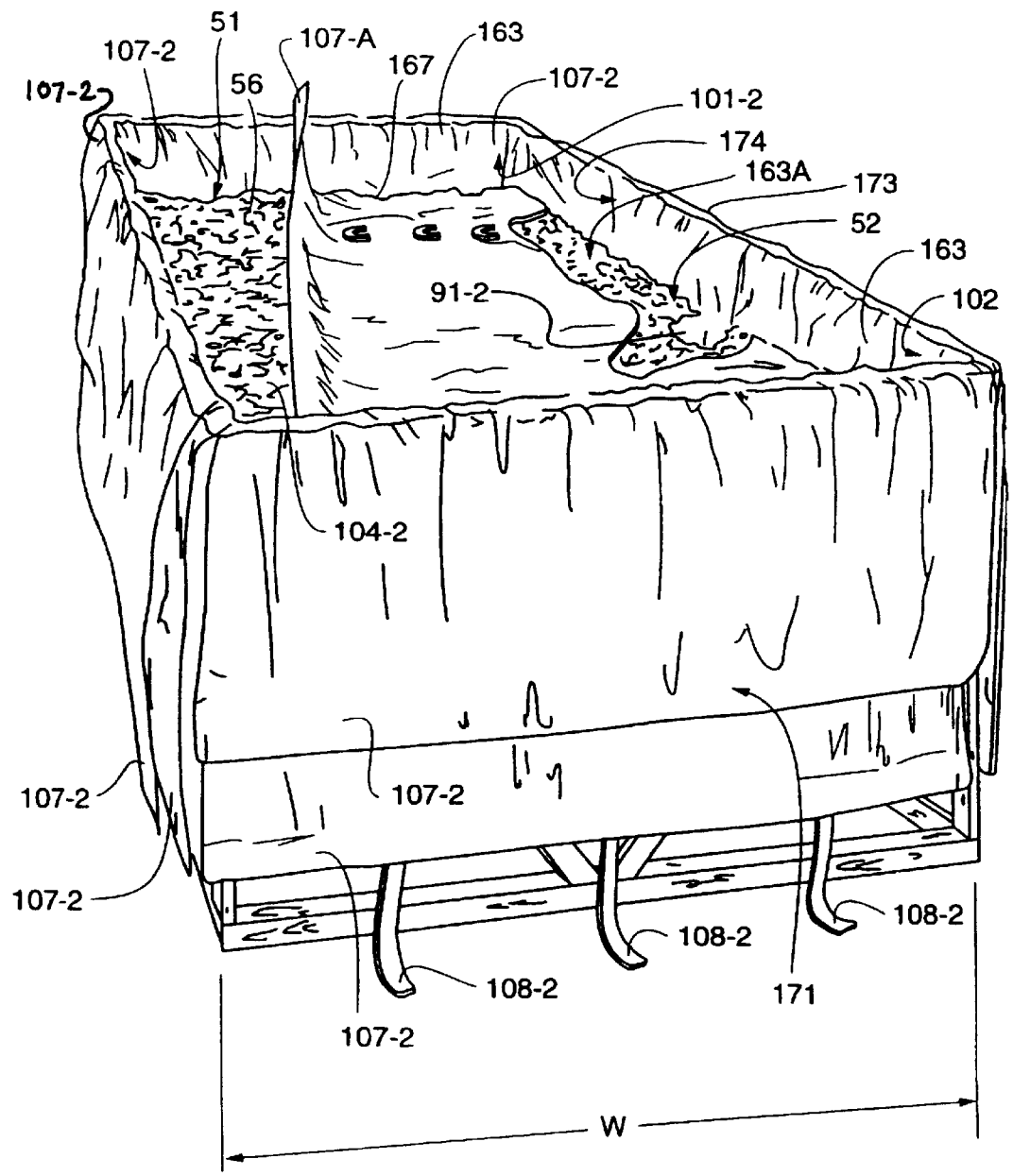
FIG. 4 is a perspective view of the second embodiment of the system of the present invention showing a flap of the container being folded over the loaded bulk cargo.
Figure 7:
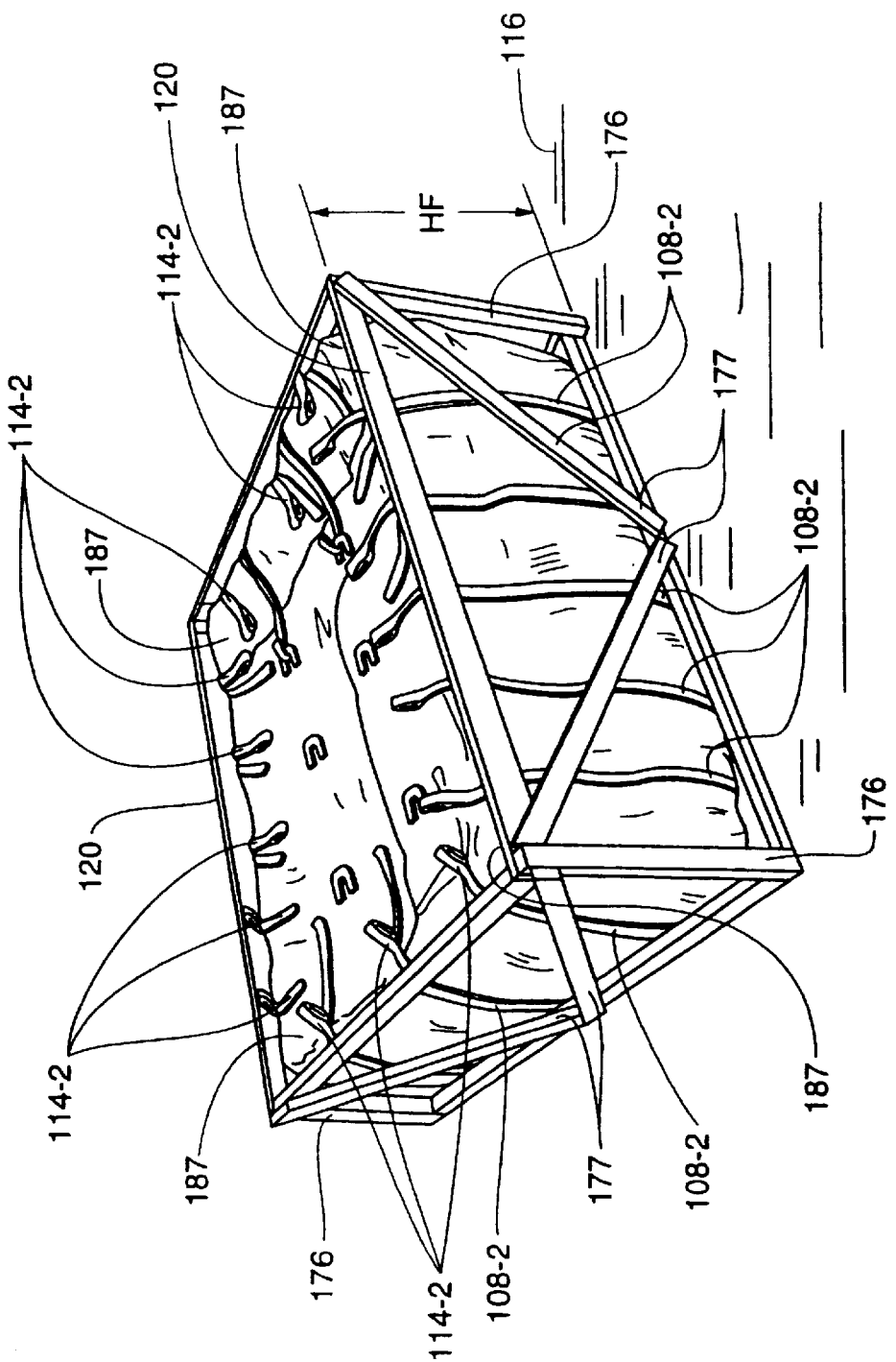
FIG. 7 is a perspective view of the second embodiment of the system of the present invention showing all of the flaps of the container folded over the loaded bulk cargo and closing the top of the container, with straps of a lifter ready to be used to lift the container.

The container-lifter 62 may be foldable for shipment to the remediation site, for example, for loading. By folding the seven foot width of the container-lifter 62-2 in half, and then folding the nine foot length in thirds, the entire container-lifter 62-2 will fit into a volume of fourteen cubic feet having a length of four feet and a width of three and one-half feet and a height of one foot. Each embodiment of the container-lifter 62-1,62-2, and 62-3 may be unfolded from such folded arrangement and held in an open, load-receiving position by the loading frame 59 as shown in FIGS. 2 through 7. As shown in FIG. 7, the loading frame 59 includes a continuous horizontal top frame 120 spaced from the ground 116 by a distance HF (FIG. 2). The top frame 120 defines a loading perimeter 121 (FIG. 11). With the loading frame 59 on the ground or other support surface 116, to define the three-dimensional enclosure 87 of the container 63, the walls 91 through 94 and the bottom 106 are placed in the loading frame 59 with the bottom 106 on the surface 116, and with the flaps 107 open and extending over the horizontal top frame 120 of the loading frame 59 (FIGS. 2 through 4). The straps 108 also drape over the top frame 120. The horizontal top frame 120 and the draping flaps 107 and straps 108 hold the walls 91 through 94 vertical, and the bottom 106 remains horizontal on the surface 118 ready to receive the bulk cargo 51.

A bulk material loader 122 (FIG. 3), such as a front loader having a bucket 123 dimensioned as described above, brings bucket loads 124 of the bulk material 51 to the open container 63. Because of the nine foot length L-2 and the seven foot width W-2 of the container-lifter 62-2, and because of the eight foot length L-2 and the seven foot width W-2 of the container-lifter 62-3, the front end loader 122 may easily be operated to drop the bucket loads 124 directly into the container 63 without spilling the bulk cargo 51. Loading continues until the level of the bulk cargo 51 in the container 63 reaches a load line 127 (FIG. 2) shown by generally horizontal, dash dot dash lines (which are shown as dash dash lines where the load line 127 is hidden in FIG. 2), which is shown by a dash dash line 127-3 in FIG. 40. The container 63 may be filled with the bulk cargo 51 to the load line 127, which is hidden in FIG. 4 by an upper surface 128 of the unit 52 of the bulk cargo 51.

Figure 10:
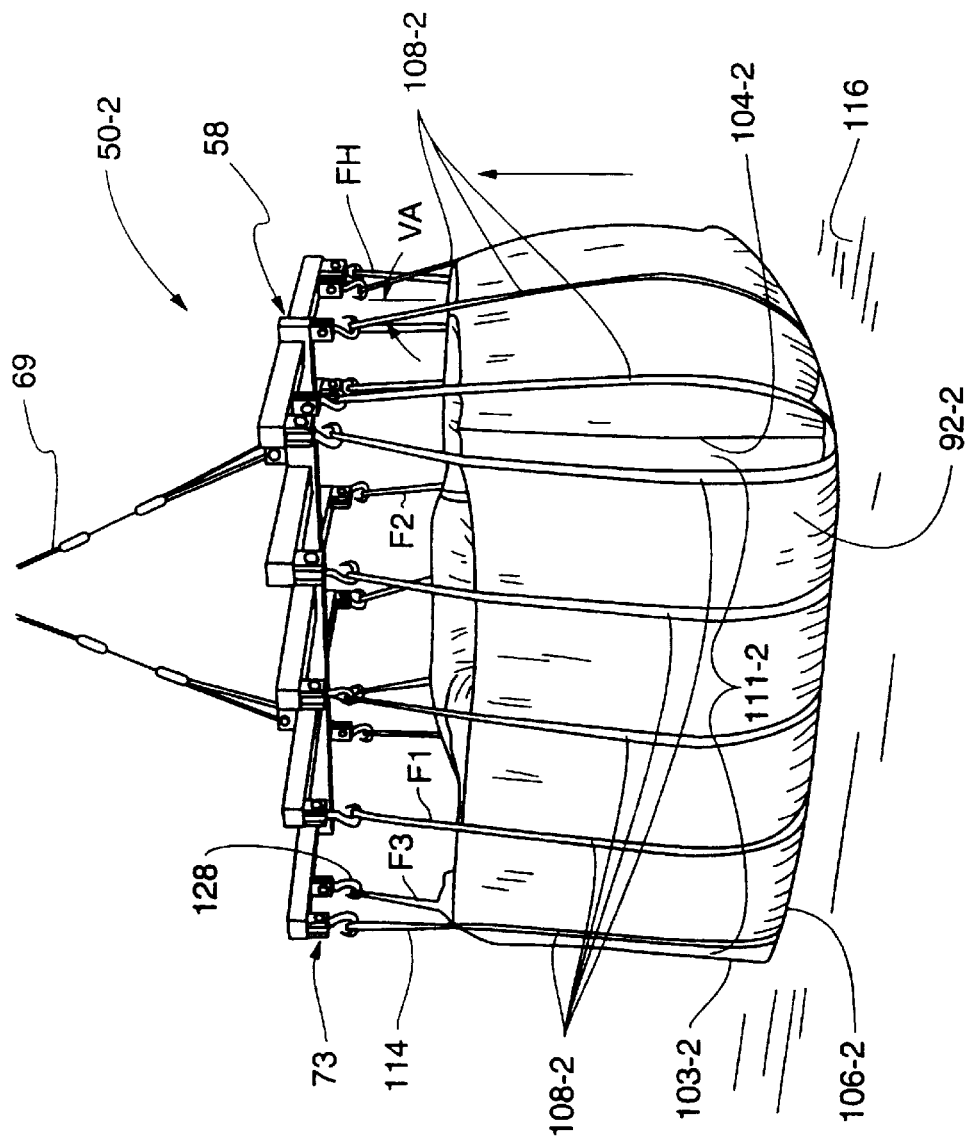
FIG. 10 is a perspective view of the second embodiment of the system of the present invention showing the closed container being lifted by the straps as the lift grid is raised by the crane.

Referring to FIG. 40, the corners 102-3 and 104-3 may be sewn to a height above the load line 127-3, such as to seventy two inches above the bottom of the liner 64-3. At this time, the loading of the unit 52 of the bulk cargo 51 is complete, and the flaps 107 are closed securely (FIG. 7). The loaded container 63 at rest on the ground 116 with the flaps 107 tied closed has the at-rest-container perimeter 83 (FIG. 11), which is larger than the lifted-container perimeter 82 (FIG. 11) of the container-lifter 62 as it is being lifted (FIGS. 10, 1A, and 1B).

Figure 8:
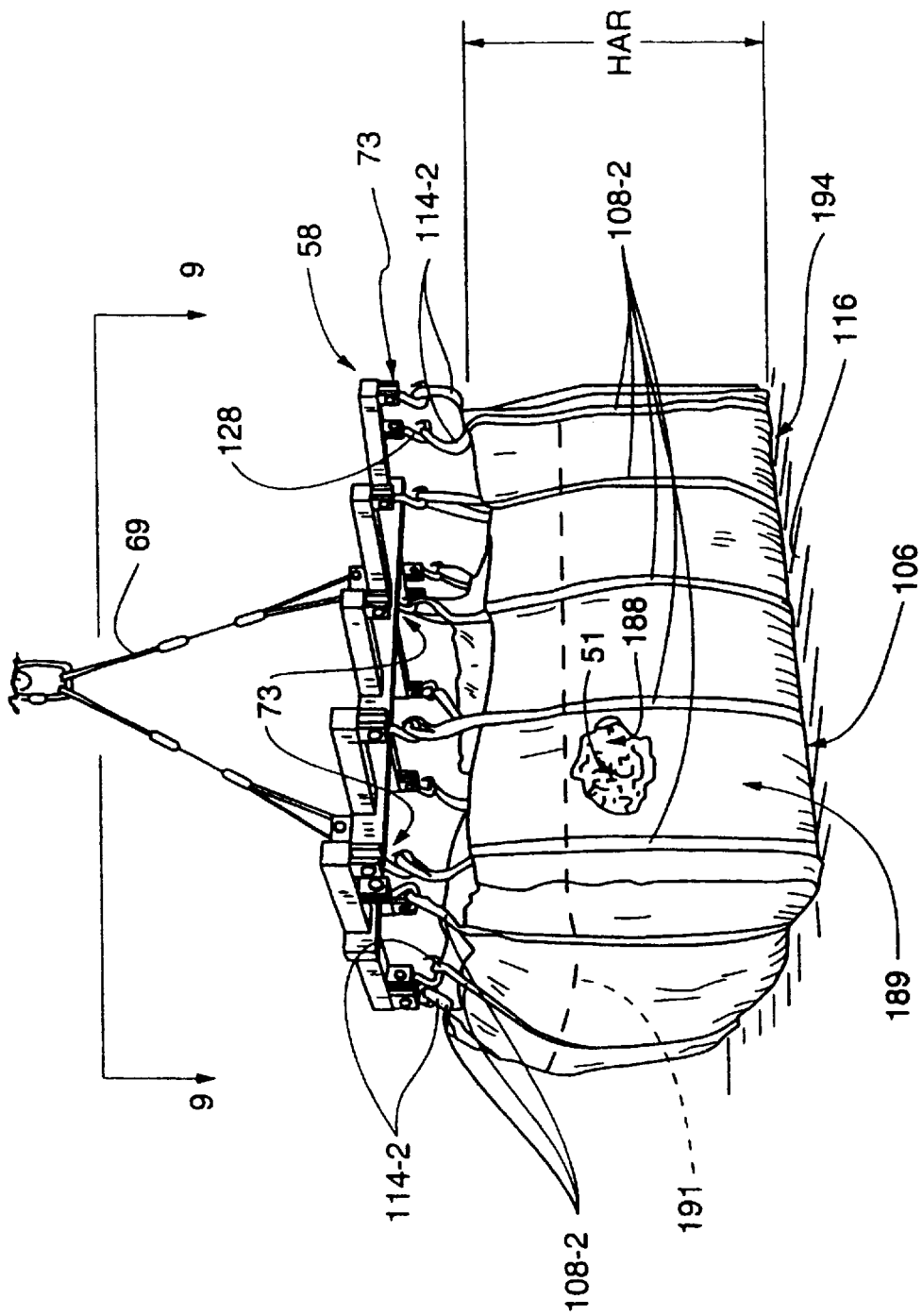
FIG. 8 is a perspective view of the second embodiment of the system of the present invention showing the closed container, with the straps connected to a lift grid, and a bridle of a crane ready to lift the container.

Referring to FIG. 8, as appropriate for the particular embodiment 50-1. 50-2, or 50-3, the lift grid 58 for that embodiment is moved by the crane 66 or fork lift truck 67 over the at-rest loaded container-lifter 62. With each connector 73 spaced around the vertical-lift perimeter 81 of the lift grid 58, the lift grid 58 is positioned to locate each connector 73 within the at-rest-container perimeter 83. Each connector 73 is connected to a respective coupling 114 of the lifter 64. Each coupling 114 may be a loop at the free end 115 of each strap 108. To connect, the loop 114 is draped over one of the hooks 128 of the connector 73. The crane 66 (or the forks 77 of the fork lift truck 67) is operated to slowly raise the lift grid 58 and place each strap 108 in tension under the action of the vertical force 74. Continued raising motion of the lift grid 58 is effective to apply to the straps 108 the vertical lifting forces 74, which collectively are enough to lift the loaded container 63 off the surface 116 as far as is necessary to allow the container-lifter 62 to be moved over a vehicle, such as the gondola car 53 shown in FIGS. 1A and 1B. With the container-lifer 62 lifted and vertically aligned with a top opening 129 of the gondola car 53, the crane 66 (or the fork lift truck 67) then lowers the lift grid 58, and hence the loaded container 63, until the bottom 106 of the container 63 rests on the floor 131 of the gondola car 53, for example.

Methods of the Present Invention

First Embodiment of The Methods

Referring to FIG. 33A, a first method of the present invention defines the unit 52 of the bulk cargo 51, as having a weight in excess of three tons, for example, and lifts the unit 52 of bulk cargo 51. The method includes a step 201 of providing the bulk cargo unit container 63 made from the sheet-like material 84 (FIG. 30) that defines the three dimensional enclosure 87 having the open top 88, the plurality of opposite walls 91 through 94, and the bottom 106. The container 63 defines a volume sufficient to contain in excess of three tons of the bulk cargo 51. A further step 202 provides the container with the lifter 64 in the form of the plurality of the straps 108. As shown in FIGS. 27, 14A, 28, and 43, each of the straps 108 extends in the continuous path P1 along and secured to one of the opposite walls (e.g., to wall 91) and extends in the continuous path P1 along and secured to the bottom 106 and extends in the continuous path P1 along and secured to another of the opposite walls (e.g., the second wall 93). Each of the straps 108 has one of the free lengths F2 extending past the one wall 91 and has one of the second free lengths extending past the other wall 92. The continuous paths P1 of each of the straps 108 are parallel to each other, and the straps 108 are in such number and are made from high tensile strength material 132 (FIG. 30) so that the straps 108 are capable of collectively applying to the container 63 more than six thousand pounds of the vertical forces 74.

In a further aspect of the method, as shown in FIG. 33B, another step 203 places the bottom 106 of the container 63 on the support surface 116. Then, through the open top 88, a loading step 204 loads into the open top 88 of the container 63 the unit 52 of bulk cargo 51 having the weight in excess of three tons, and closes the open top 88. In step 205, the forces 74 are applied to the free ends 115. The forces 74 are substantially in a vertical direction and collectively sufficient to lift the container 63 off the surface 116. The container 63, and the bulk cargo 51 having a contained weight in excess of three tons, are lifted off the surface 116.

Another aspect of the methods is a step 206 (FIG. 33B) of providing the two separate sets 111 and 112 of such straps 108, one set 111 on the first and second walls 91 and 92, respectively, and across the bottom 106; and the second set 112 on the third and fourth walls 93 and 94, respectively, and across the bottom 106. The straps 108 of the first set 111 and of the second set 112 each cross the bottom 106 and intersect at right angles with respect to each other to form the grid 119 and the uniform areas A-3 of the bottom 106.

Second Embodiment of The Methods

Another aspect of the methods of the present invention is shown in FIG. 34 by a second method embodiment in which the unit 52 of bulk cargo 51 having a weight in excess of three tons is both contained and lifted. The method includes the step 211 of providing at least one central lift point to which at least one lifting force 72 is applied (e.g., via the crane 66). In step 212, a bulk cargo unit container 63 is provided in the form of the flexible container 63 made from the sheet-like material 84 that defines the three dimensional enclosure 87 having the open top 88 (with the flaps 107), the plurality of opposite walls 91 through 94, and the bottom 106. Such container 63 defines a volume sufficient to contain in excess of three tons of the bulk cargo 51. The container 63 is provided with the straps 108, each of the straps 108 extending in the continuous path P1 along and secured to the opposite walls (e.g., 91 and 92) and extends in the continuous path P1 along and is secured to the bottom 106. Each of the straps 108 has one of the free ends 115 above the wall 91 or 92. The continuous paths P1 of each of the straps 108 are parallel to each other, and are in such number and are made from the material 132 capable of enabling the straps 108 to collectively apply to the container 63 more than six thousand pounds of the vertical forces 74. The vertical lifting force of the force components 72 is divided in step 214 into a plurality of the substantially vertical upward forces 74. The plurality of substantially vertical upward forces 74 are simultaneously applied in step 215 to each of the free ends 115 of each of the straps 108 to cause the straps 108 to apply the substantially vertical upward forces 74 to the container 63 and lift the container 63 off the support surface 116.

Third Embodiment of The Methods

Another aspect of the methods of the present invention is shown in FIG. 35 by a third method embodiment in which individual units 52 of the bulk cargo 51 formed by the first embodiment of the container-lifter 62 are both contained and lifted, and are efficiently loaded into the standard gondola car 53 described above. The gondola car 53 has a given length GL in a direction of transport (see arrow T, FIG. 13), a given width GW transverse to the direction of transport T, and a given height GH. The gondola car 53 has a net load weight capacity of about 100 tons. The method includes the step 221 of dividing the bulk cargo 51 into a plurality of the units 52 each having a unit width dimension. As the forces 74 are applied to the bulk cargo 51 during lifting, the unit width dimension varies from an "at-rest" width WAR (FIGS. 29 and 25A) having a value about equal to one-half of the given width GW, to a "lifted-width" WL having a value less than about one-half of the given width GW of the gondola car 53. The units also have a unit length dimension which is a fraction (such as one-third) of the given length GL and varies from an "at-rest" length LAR (FIGS. 25A and 29) having a value greater than the value of a "lifted" length LL (FIG. 14A) to a "lifted-length" LL having a value less than about one-half of the given length GL of the gondola car 53. The units 52 have an "at-rest" height HAR (similar to that shown in FIG. 8 with respect to the units 52 of the second embodiment 50-2 having a value less than a "lifted" height HL (FIG. 1A), wherein both the heights HAR and HL are less than the height GH (FIG. 26) of the gondola car 53.

Figure 37A:
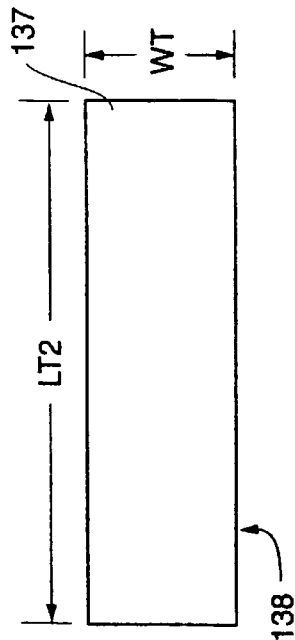
FIGS. 37A and 37B are plan views of the beds of trucks which may be used to carry the container-lifters.
Figure 37B:
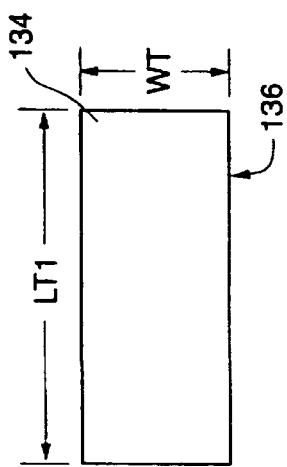

The at-rest width WAR may be four feet and fits into the seven and one-half foot width WT of the bed 134 of a standard tandem dump truck 136 (FIG. 37A) or the seven and one-half foot wide bed 137 of a semi-trailer truck 138 (FIG. 37B). The at-rest length LAR of about seventeen feet is just less than the eighteen foot length LT1 of the bed 134 of such standard tandem dump truck 136, such that one unit will fit into such bed 134.

The at-rest length LAR is a whole number multiple (e.g., 2) of the length LT1 of the bed 137 of the semi-trailer truck 138, such that two units 52 will fit end-to-end into the trailer bed 137. In the example shown for the third method embodiment, the weight of the bulk cargo 51 of each of the units 52 will vary according to the nature of the demolition debris 54, but will not exceed ten tons, so that the net weight capacity of such trucks is not exceeded.

A step 222 of the method also lifts a first of the units 52 to provide the unit 52 with the lifted width WL and lifted length LL dimensions. By a step 223, the lifted unit 52 is placed in the gondola car 53 with the lifted length LL parallel to the direction of travel T and the lifted width WL transverse to such direction T. Step 224 repeats the lifting step 222 and the placing step 223 in succession with respect to all of the other units 52 of the plurality of units, such that each next unit 52 is placed in the gondola car 53 adjacent to and touching the next previous unit 52 that was placed into the gondola car 53, first in a side-by-side relationship, and then in an end-to-end relationship. The step 224 of repeating the respective lifting and placing steps 222 and 223 is repeated until the gondola car 53 is filled with two six-unit layers of the units 52. As each of the units 62 is placed on the floor 131 of the gondola car 53, the unit 52 assumes the at-rest dimensions WAR and LAR. Since the gondola car 53 has the width GW of nine and one-half feet and the length GL of fifty-two and one-half feet, two rows of the units 52 with the at-rest widths WAR easily fit into the width GW. Also, three of the units 52 having an at-rest length LAR easily fit into each of the two rows in the gondola car 53.

By the third embodiment of the method, one further aspect of the efficient transport is provided in that there is efficient transfer of the bulk cargo 51 into the gondola car 53. The lift-liner 62 divides the bulk cargo 51 at the point of origin into the units 52 for transport. In this context, such efficient transport means that it takes a minimum number of operations of the crane 66, for example, to fill the volume of the gondola car 53 with the lift-liners 62. In the example of the second embodiment of the container-lifter 62-2, with only seven lift-liners 62 easily filling the volume of the gondola car 53 and using seventy percent of the weight-carrying capacity of the gondola car 53, as compared to the twenty-two Love Canal bags that fit in the volume of the gondola car 53, the fifteen crane operations are saved in only loading seven lift-liners 62 to fill the volume of the gondola car 53.

In the example of the third embodiment of the container-lifter 62-3, seven lift-liners 62-3 easily fill the volume of the gondola car 53, and use eighty four percent of the weight-carrying capacity of the gondola car 53, as compared to the twenty-two Love Canal bags that fit in the volume of the gondola car 53. Thus, fifteen crane operations are saved in only loading seven lift-liners 62 to fill the volume of the gondola car 53.

In the example of the demolition debris lift-liner 62-1 having a footprint of four feet by seventeen feet, twelve demolition debris lift-liners 62-2 can easily fit in the volume of the gondola car 53 and result in use of sixty-five percent of the weight-carrying capacity of the gondola car 53. As compared to the twenty-two Love Canal bags that fit into the volume of the gondola car 53, ten crane operations are saved in only loading the twelve demolition debris lift-liners 62 to fill the volume of the gondola car 53.

Fourth Embodiment of The Methods

Figure 9:
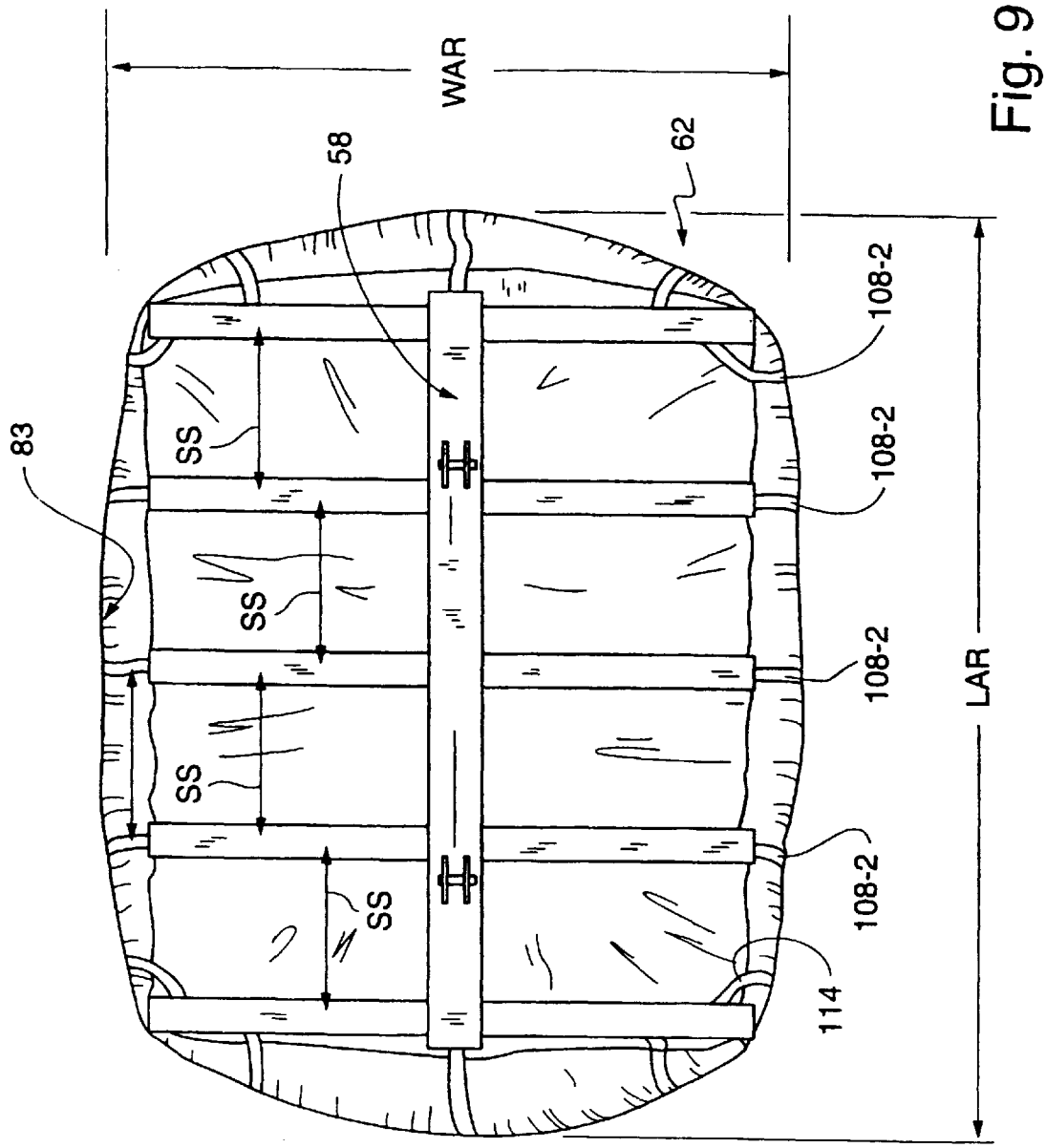
FIG. 9 is a plan view taken along line 9—9 in FIG. 8, looking down on the top of the closed container, showing the perimeter of the top when the container is at rest on a support surface, with the lift grid ready to lift the container.

Another aspect of the methods of the present invention is shown by a fourth method embodiment in which individual units 52 of bulk cargo 51 may be formed by the respective second embodiment or the third embodiment of the container-lifter 62-2 or 62-3 having a weight in excess of three tons (and preferably ten tons for the second embodiment 62-2 or twelve tons for the third embodiment 62-3). The individual units are both contained and lifted, and are efficiently loaded into a standard gondola car 53 described above. The gondola car 53 has the same dimensions and net load weight-carrying capacity as described above. Referring to FIG. 9, the method includes the step 231 of dividing the bulk cargo 51 into a plurality of the units 52. During lifting, the unit length dimension may vary from the "at-rest" length LAR, which for the second embodiment of the container 63-2 has a value about equal to the given width GW, and which for the third embodiment of the container 63-3 has a value of about nine feet two inches. Also referring to FIG. 14B, the "lifted-length" LL of such unit 52-2 has a value less than the given width GW of the gondola car 53. The units 52 also have a unit width dimension which is a smaller fraction of the given length GL than the first embodiment of the container 63-2. During lifting, such unit width dimension varies from an "at-rest" width WAR having a value greater than the value of the "lifted" width WL. The units 52 have an "at-rest" height HAR having a value less than a "lifted" height HL, wherein both the heights HAR and HL are less than the height GH of the gondola car 53.

In the second embodiment, the at-rest length LAR will fit in the width WT of the bed 134 of the standard tandem dump truck 136 (FIG. 37A) or the bed 137 of the semi-trailer truck 138 (FIG. 37B). The at-rest length LAR is a whole number multiple of the length LT of the bed 134 of such standard tandem dump truck 136, such that two units 52 will fit into such bed 134. The at-rest length LAR is also a whole number multiple of the length LT of the bed 137 of the semi-trailer truck 138, such that three units 52 will fit into the semi-trailer truck 138. In the example shown for the fourth method embodiment, the weight of the bulk cargo 51 of each of the units 52 is ten tons, for example, so the weight-carrying capacities of such trucks 136 and 138, respectively, are not exceeded.

In the third embodiment, the at-rest length LAR will fit in the width WT of the bed 134 of the standard tandem dump truck 136 (FIG. 37A) or the bed 137 of the semi-trailer truck 138 (FIG. 37B). The at-rest length LAR is about nine feet, a whole number multiple of the length LT of the bed 134 of such standard tandem dump truck 136, such that two units 52 will fit into such bed 134. The at-rest length LAR is about nine feet, also a whole number multiple of the length LT of the bed 137 of the semi-trailer truck 138, such that three units 52 will fit into the volume of a semi-trailer truck 138. In the example based on the third embodiment 50-2 and for the fourth method embodiment, the weight of the bulk cargo 51 of each of the units 52 is twelve tons, for example. Thus, depending on the density of the bulk material, the weight-carrying capacities of such trucks 136 and 138, respectively, may be met by the load of bulk cargo.

Step 232 of the method also lifts a first of the units 52. The unit 52 assumes the lifted width WL and lifted length LL dimensions. In step 233 the lifted unit 52 is placed in the gondola car 53 with the lifted length LL transverse to the direction of travel T and the lifted width parallel to such direction T. In step 234, by repeating the respective lifting and placing steps 232 and 233 in succession with respect to all of the other units 52 of the plurality of units, each next unit 52 is placed in the gondola car 53 adjacent to and touching the next previous unit 52 that was placed into the gondola car 53. This step 234 of lifting and placing is repeated until the volume of the gondola car 53 is filled with the units 52. As each of the units 52 is placed on the floor 131 of the gondola car 53, the unit 52 assumes the at-rest dimensions WAR and LAR. The at-rest length LAR easily fits into the width GW. Also, seven of the units 52 having an at-rest width WAR easily fit into the volume of the gondola car 53.

Another aspect of efficient transport is provided when as much as possible of the load capacity of the gondola car 53 is used. For transporting hazardous material waste and radioactive hazardous material waste as the bulk cargo 51 with the described containment and lift, and with all of the other aspects of efficient transport, the seventy percent achieved with the second embodiment of the lift-liner 62 is acceptable.

Further Descriptions

First Embodiment of the System 50-1

Referring now in greater detail to FIG. 1A of the drawings, the first embodiment of the system 50-1 is shown for lifting the substantial volume and weight of the bulk cargo 51 in the unit 52. The density of the bulk cargo 51 in the form of the demolition debris 54 varies according to the type of debris and the amount of any one kind of such debris that is in the unit 52. In general, the weight of the demolition debris 54 in a seventeen by four by two foot container 63-1 is from ten to twenty thousand pounds.

As shown in FIG. 25A, with one layer of six of the container-lifters 62-1 shown in the gondola car 53, the volume of each unit 52-1 is less than the volume of the interior of the gondola car 53 described above and shown in FIG. 1A, but substantially more than the volume or weight of the typical prior one ton, or three ton (Love Canal) bags (not shown). A second layer of six of the container-lifters 62-1 is placed on the first row.

First Embodiment of Lift Device 57-1

The lift device 57-1 of the first embodiment 50-1 is shown in FIG. 1A as the fork lift truck 67 type of hoist, which is capable of lifting the units 52 of the bulk cargo 51 weighing as much as fifteen tons to heights of twenty feet, for example. The fork lift truck 67 has the two forks 77 and a column (or mast) 141 on which a base 142 of the two forks 77 moves up and down to raise and lower the forks 77. Each fork 77 is designed to enter one of the two pipes 78, or other hollow member, that are connected to the lift grid 58-1 for applying the vertical force components 72 to the lift grid 58-1.

First Embodiment of Lift Grid 58-1

Referring to FIGS. 1A, 31A, and 31B, the first embodiment of the lift grid 58-1 is shown receiving the vertical force components 72 from the fork lift truck 67 via the two pipes 78-1, and distributing the vertical force components 72 from the forks 77 to a plurality of the connectors 73-1. The pipes 78 are welded or otherwise secured to two longitudinal beams 143 which extend in the longitudinal (or length L) direction of the container 63-1. The pipes 78-1 are centered between opposite ends of the beams 143 so that the weight of the bulk cargo 51 will be balanced from end-to-end as the fork lift truck 67 raises the lift grid 58-1. The beams 143 are also welded (or otherwise secured to) a series of lateral (or spreader) beams 144 that extend in the direction of the width W of the container 63-1. The lateral beams 144 are spaced by equal distances Si that correspond to the distances SS1 by which the straps 108 are spaced along the first wall 91-1 and the second wall 92-1 of the first embodiment of the container 63-1. Thus, for each strap 108-1 that is secured to the first wall 91-1 and the second wall 92-1 of the container 63-1, there is also one lateral beam 144. Opposite ends of the lateral beams 144 define the vertical-lift perimeter 81 (FIG. 11) of the lift grid 58-1. One of the connectors 73-1 is secured to each such opposite end 146. As shown in FIGS. 11, 31A, and 31B, each connector 73-1 is vertically aligned with the lifted-container perimeter 82 of the container-lifter 62-1 of the system 50-1 and with a loop 114-1 of the straps 108-1. The lifted-container perimeter 82 is shown slightly outward of the vertical-lift perimeter 81 for clarity of illustration. Such lifted-container perimeter 82 is inside, or smaller than, the at-rest-container perimeter 83 of the container-lifter 62-1. Referring to FIG. 31B, the connectors 73-1 may be in the form of the hooks 128-1 bolted to the opposite ends 146 of the lateral beams 144-1.

It may be understood that the pipes 78 receive the vertical force components 72 from the forks 77. The pipes 78 transfer, or distribute, the vertical force components 72 through the longitudinal beams 143, which further distribute the plural vertical force components 72 to the lateral beams 144. The lateral beams 144 further distribute the many vertical force components 72 to the ends 146 of the lateral beams 144 at which the connectors 73-1 are located. In this manner, the original two vertical force components 72 from the two forks 77 are distributed to each of the hooks 128-1 of the connectors 73-1 as a separate one of the vertical forces 74-1. The two vertical force components 72 become a number of the vertical forces 74-1 corresponding to twice the number of the straps 108-1 secured to the container 63-1 of the container-lifter 62-1, which number is equal to the number of free ends 115 of the straps 108-1.

Alternatively, the longitudinal beams 143 shown in FIG. 1A may be spaced further apart to coincide with the vertical lift perimeter 81 (FIG. 11). Also, only two lateral beams 144 may be used, and spaced apart to the ends 147 of the longitudinal beams 143 to coincide with the vertical lift perimeter 81 (FIG. 11). The connectors 73 (via the hooks 128) are secured to the longitudinal beams 143 and the lateral beams 144, which define a rectangle coinciding with the vertical lift perimeter 81.

It may be understood that the lift grid 58 serves to evenly distribute the vertical force components 72, which may be called "primary force components", so that the many vertical force components 74, which may be called "secondary force components", are provided at the vertical lift perimeter 81. The lift perimeter 81 is spaced horizontally away from the primary force components. Thus, as the lift grid 58 performs the distribution, the primary force or forces 72 are divided into many secondary ones of the vertical forces 74, and provide those secondary vertical forces 74 substantially vertically aligned with the container perimeters 82 and 83. The lift grid 74 also serves to apply those secondary vertical forces 74 separately to the connectors 73, which serve to connect the secondary vertical forces 74 to the couplings 114. The couplings then, serve to receive the secondary forces 74 and separately apply the secondary forces 74 to the container 63 along the separate continuous paths P1 and P2.

Embodiments of The Container 63

The respective first, second, and third embodiments of the container-lifter 62-1, 62-2, and 62-3 include the flexible container 63. For each embodiment, the sheet-like material 84, or sheet, defines the respective three dimensional enclosure 87-1, 87-2, or 87-3 as having an inside 151 (FIGS. 24 and 3) of the container 63 and an outside 152 (FIGS. 24 and 19) of the container 63. The sheet 84 may be provided for each embodiment 87-1, 87-2, or 87-3 formed from one laminated sheet 153, or may be two separate sheets 154 and 156, one of which nests within the other. For economy of description, the first embodiment 50-1 is shown using one sheet 84 (referred to as the laminated sheet 153) and the second embodiment 50-2 is shown using the sheet 84 in the form of the separate inner sheet 154 and the separate outer sheet 156. It is to be understood that any of the embodiments 50-1, 50-2 and 50-3 may be made from either of the one sheet 84, or of the separate inner sheet 154 and the separate outer sheet 156.

Laminated Sheet 153 of The Container

Considering the laminated sheet 153, FIG. 30 shows the laminated sheet 153 including a plurality of layers, such as an inside layer 157 and an outside layer 158. The inside layer 157 defines the inside 151 (FIG. 24) and the outside layer defines the outside 152. The inside layer 157 is made from high density material having a smooth surface 160-1. The inside layer may be made, for example, from semi-rigid high density polyethylene sheet-like material. In a preferred embodiment, the inside layer 157 is forty mils thick, has a high puncture resistance of eighty (measured per ASTM D 4833), and a strength at break of one hundred sixty pounds per square inch. The inside layer 157 is supplied by Poly Flex, Inc., of Grand Prairie, Tex. a smooth HDPE geomembrane. It may be understood, then, that the inner layer 157 serves to provide the smooth surface 160 which allows the bulk cargo 51 to settle, or flow to the lowest point, in the container 63 immediately upon being loaded into the container 63. The inner surface 160 thus serves to reduce friction at the inside of the walls 91 through 94 as the bulk cargo 51 settles, so as to minimize the formation of air pockets which might otherwise form in the container if the bulk cargo 51 adheres to the walls. The smooth surface thus serves to prevent subsidence.

The outside layer 158 may be made, for example, from certain heavy woven and coated flexible polyolefin sheet-like materials which have a bursting strength of 865 pounds per square inch (Mullen burst, per ASTM D 3786-87). Such polyolefin materials include polyvinylchloride, polyester, polypropylene, and polyethylene. The outside layer 158 is supplied by Intertape Polymer, Inc., of Truro, Nova Scotia as a NOVA-THENE IBC fabric. The laminated sheet 153 is formed from the inside layer 157 and the outside layer 158 by joining such layers using heat and adhesive, for example.

It may be understood, then, that the inner layer 157 and the outer layer 158 serve the functions of the walls 91 through 94, and provide a leak-resistant liner for the vehicle which is used to carry the lift-liner 62, such as the gondola car 53. The inner layer 157 and the outer layer 158 also serve to enable the lift-liner 62 to be economically disposable because the cost thereof, combined with the cost of the straps 108 and the thread 118, is substantially less than that of the used S/L IMCs, for example.

Multi-Sheet Embodiment of The Container

Considering the multi-sheet embodiment of the sheet 84, FIG. 39 shows the inner (or first) sheet 154-2 that defines the inside 151 of the container 63 and the outer (or second) sheet 156-2 that defines the outside 152 of the container 63. The first sheet 154 is made from high density material having a smooth surface 160-2. As an example, the first sheet 154-2 may also be made from the same semi-rigid high density polyethylene sheet-like material as is used to make the inside layer 157. The second sheet 156 may also be made, for example, from one of the same heavy woven and coated flexible polyolefin sheet-like materials as are used to make the outside layer 158.

Other aspects of efficient transport are provided when the lift-liner 62 that forms or defines the unit 52 of the bulk cargo need not be used with a dedicated transport vehicle, such as a dedicated IMC (not shown). After the lift-liner 62 made from either the laminated sheet 153 or the two sheets 154 and 156 is placed in the gondola car 53, for example, the lift-liner 62 is effective to line an inside 161 of the gondola car 53 and provide integrity so as to prevent leakage or seepage of the bulk cargo 51 from the container 63. Also, with the sheet 84 and the straps 108 assembled as described above, the container-lifter 62 is strong enough to keep ten tons of bulk cargo 51 safely together as the unit 51 during lifting to place the container 62 into the gondola car 53. Another aspect of efficient transport is provided by the characteristic of the sheets 153, or the sheets 154 and 156, of the container-lifter 62 to both resist deterioration and to collapse upon being stacked to prevent air pockets from forming in the container 63 during stacking of one lift-liner 62 on another lift-liner 62. In this manner, the container-lifter 62 reduces the likelihood of occurrence of subsidence of the stored bulk cargo 51 and the container-lifters 62 after time in storage because there are no air pockets in the container 63 at the time of stacking.

In another aspect of efficient transport, even though the container-lifter 62 has been placed on such surface 116, within the container-lifter 62 there is a minimum of sag of an upper part 188 of the bulk cargo 51 to a lower part 189 of the container-lifter 63. Thus, when full and at rest, the three dimensional configuration of the container-lifter 62 on the support surface 116 is preserved in that settling of the bulk cargo 51 occurs relatively uniformly. Such uniform settling is facilitated by the smooth inner surface 160 (FIG. 30) of the laminated sheet 153, and of a similar smooth surface 160-2 of the inner sheet 154 facing the bulk cargo 51 in the container 63. These smooth surfaces avoid allowing the rough edges of the bulk cargo 51 to catch on the inner surface of the inside layer 157 or inner sheet 154, so that the bulk cargo 51 tends to settle vertically.

It may be understood, then, that the walls 91 through 94, and the bottom 106, serve to define the shape of the container 63. The walls 91 through 94, and the bottom 106, contain the bulk cargo 51, with the bottom 106 bearing the direct weight of the bulk cargo 51.

Forming The Container-Lifter 62-1

A single large sheet of such laminated sheets 153 may be used to form the container 63, or many smaller ones of such laminated sheets 153 may be sewn together to form the one large laminated sheet. Similarly, each of the first (inside) sheet 154 and the second (outside) sheet 156 may be a single large sheet, or many smaller ones of such first sheets 154 may be sewn together to form the one large first sheet, or many smaller ones of such second sheets 156 may be sewn together to form one large second sheet.

In either case, such large laminated sheet 153, or such large first sheet 154 and such large second sheet 156, (referred to separately as the respective "large sheet" 153, 154, or 156) has large enough dimensions to form either the first or the second embodiments of the container-lifter 62-1 or 62-2, respectively.

The following description refers to the large sheet 153, and is also applicable to the large sheets 154 and 156. Such large sheet 153 is spread out on a work surface (not shown) and four sections 162 are cut out to define the four walls 91-1 through 94-1, the four flaps 107-1 and the bottom 106-1. One of the flaps 107-1 is integral with each wall (91-1 through 94-1), and a transition section 163 is provided between each wall 91-1 through 94-1 and each respective flap 107-1. The bottom 106-1 is also integral with each of the walls 91-1 through 94-1. The cut-out sections 162 leave edges 164 (shown by dashed lines). With the large sheet 153 (or 156) still spread out on the work surface, according to the embodiment of the sheet 84 and of the container-lifter 62 that is being fabricated, the straps 108 are sewn to the appropriate walls 91 and 92, or 91 through 94, (i.e., to the sheets 153 or 156 that form those walls) and to the bottom 106. The sewing is done after positioning the straps 108 with the appropriate spacings SS1 or SS2 as shown in FIGS. 14A, 27 and 29 (embodiment 62-1), as shown in FIGS. 14B, 18, 19, and 23 (embodiment 62-2), and as shown in FIG. 44 (embodiment 62-3).

Figure 38:
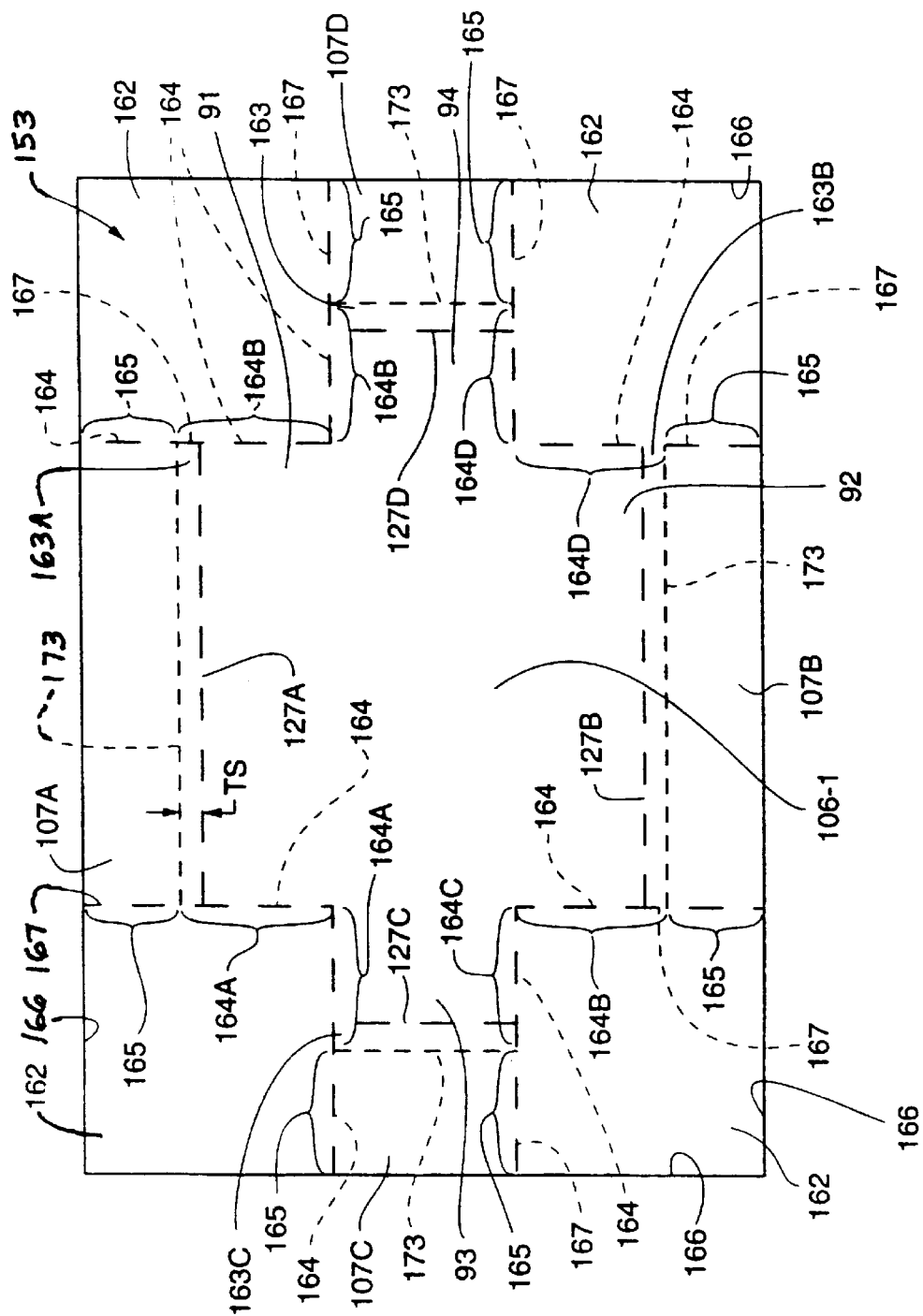
FIG. 38 is a plan view of a large sheet of material from which the container is made, showing the structure of the sheet prior to securing the straps to the container.

In FIG. 38, adjacent portions of the edges 164 are identified by the same letters following the reference number 164. Brackets 164A denote the two adjacent portions of the edges 164 that are joined together to form the corners 101-1. Brackets 164B denote the two adjacent portions of the edges 164 that are joined together to form the corners 102-1. Brackets 164C denote the two adjacent portions of the edges 164 that are joined together to form the corners 103-1. Brackets 164D denote the two adjacent portions of the edges 164 that are joined together to form the corners 104-1. Each two adjacent portions of the edges (e.g., 164A and 164A) are secured to each other (as by sewing) to form the respective corners 101-1 through 104-1 of the three-dimensional enclosure 87.

Further portions of the edges 164 (identified by brackets 165) extend beyond the respective secured portions 164A through 164D to an outside perimeter 166 of the large sheet 153 and are not connected to each other. The edge portions 165 form sides 167 (FIG. 2) of the flaps 107-1.

With the large sheet 153 so cut, with the straps 108 so sewn, and with the portions 164A through 164D so joined, the three dimensional enclosure 87 is ready for use. For reference purposes, FIG. 38 shows a first of the flaps 107A which is connected to the transition section 163A adjacent to the first wall 91-1. A second of the flaps 107B is shown connected to the transition section 163B adjacent to the second wall 92-1. A third of the flaps 107C is shown connected to the transition section 163C adjacent to the third wall 93-1. A fourth of the flaps 107D is shown connected to the transition section 163D adjacent to the fourth wall 94-1. In each case, the flap 107 is connected to the transition section 163 along the flap line Loading Frame 59

Figure 24B:
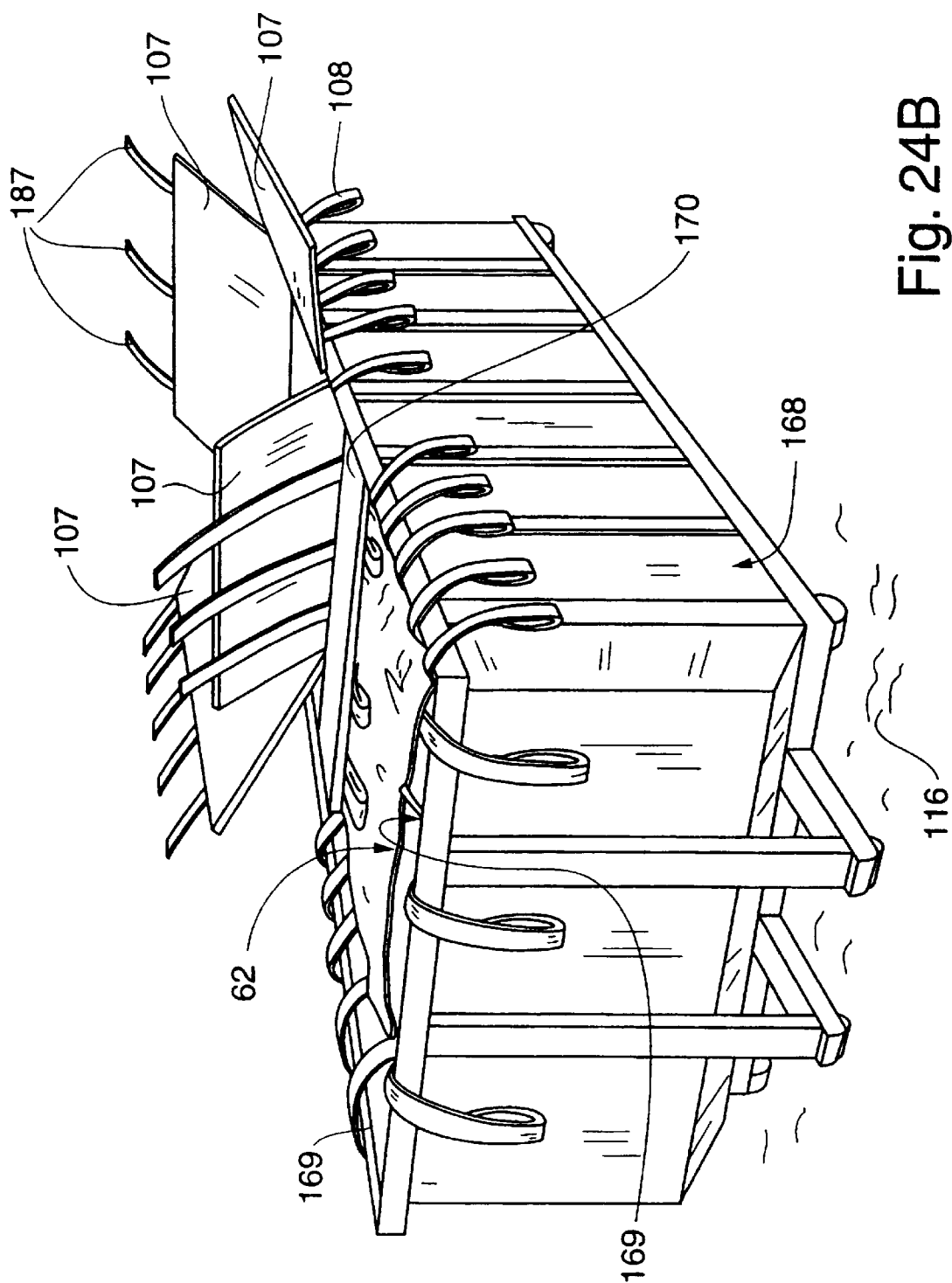

The first use of the three dimensional enclosure 87 is in connection with the loading frame 59. The three dimensional enclosure 87 is held in the open, load-receiving position (FIG. 2) by the loading frame 59 shown in FIGS. 2 through 7. The loading frame 59 has the horizontal top frame 120 (FIGS. 6 and 7) which is supported by vertical supports 176 and diagonal braces 177. The top frame 120 is at the height HF from the support surface 116 so that the top of the transition sections 163 hang over the loading perimeter 121 defined by the top frame 120. The flaps 107 and the straps 108 hang down on the outside of the enclosure 87. The loading frame 59 may be made of lumber, such as two by fours, for example. Alternatively, a loading frame 59 may be provided by using a roll off container 168 (FIGS. 24A and 24B). Such roll off container 168 has a top surface 169 twice the size of the loading perimeter 121. Therefore, the roll off container 168 is modified by adding a bridge 170 in the middle to provide the loading perimeter 121. The overall length and width of the horizontal top frame 120, the top surface 169 and the bridge 170, are just larger than the length L and the width W and the height H of the at-rest container 63 so that the loaded and closed container 63 may easily be lifted out of the loading frame 59, or the roll off container 168.

It may be understood, then, that the loading frame 59 serves to support the open container 63 for loading. Thus, the frame 59 serves to hold the walls 91 through 94, and to hold the transition section 163, vertical with the flaps 107 open to define the open top 88. The top 88 thus serves as a wide and long opening for receiving the bulk cargo from large material handling equipment, such as the front end loader 122.

The Transition Section 163 of the Container 63

Closing The Top 88 Of the Container 63

With the loading frame 59 (or the roll off container 168) on the ground or other support surface 116, the first embodiment of the enclosure 87-1 is placed in the loading frame 59 (or the roll off container 168) with the bottom 106 on the surface 116 (or on the bottom of the roll off container 168). The three-dimensional walls 91 through 94 are vertical, and the flaps 107 are open and extend over the top section 121 of the loading frame 59 (or the top 169 and the bridge 170). The straps 108 also drape over the top frame 121 and are underneath the flaps 108. The frame 59 (or the top 169 and the frame 170) and the flaps 107 assist in holding the walls 91 through 94 vertical, with the bottom 106 being horizontal so that the enclosure 87 is ready to receive the bulk cargo 51.

When the three dimensional enclosure 87 is in the form of the inner three dimensional enclosure 171 (made from the inner large sheet 154) and the outer three dimensional enclosure 172 (made from the outer large sheet 156), the outer enclosure 172 is first placed in the loading frame 59 (or roll off container 168) as described above. FIG. 2 shows the inner three dimensional enclosure 171 nested into the outer three dimensional enclosure 172.

To avoid duplication, the following description of the two three dimensional enclosures 171 and 172 is applicable to the one three dimensional enclosure 87 made from the one large laminated sheet 153, it being understood that the large laminated sheet 153 only has the four flaps 107 and the one transition section 163, whereas each of the large sheets 154 and 156 has such flaps 107 and transition section 163.

The three dimensional nested configuration of the three dimensional enclosure 171 and 172 shown in FIG. 2 is of the second embodiment of the container-lifter 62-2. Each of the corners 101-2 through 104-2 extends up from the bottom 106-2 for the vertical distance H-2 to the load line 127 (see dash-dot, and dash-dash, lines in FIG. 2). The load line 127 provides a general indication as to the height to which the bulk cargo 51 should be loaded within the container 63-2. The indication is general because, for example, with a very dense bulk cargo 51 (density above eighty pounds per cubic foot), the container 63 may be considered "loaded" even though the bulk cargo has not reached the load line 127 (see Chart I where the loaded height was forty-two inches, six inches below the load line 127).

CHART I

| DIMENSIONS OF CONTAINER-LIFTER 62-2 | |
|---|---|
| 1. STANDING IN LOADING FRAME 59, NOT LOADED | |
| A. CIRCUMFERENCE AT WAIST | 368 INCHES |
| B. LENGTH | 96 INCHES |
| C. WIDTH | 88 INCHES |
| D. DEPTH (SURFACE 116 TO TOP 120) | 60 INCHES |
| E. DEPTH (SURFACE 116 TO LINE 127) | 48 INCHES |
| 2. LOADED WITH GRAVEL 51, AT REST ON SURFACE 116 | |
| A. CIRCUMFERENCE AT WAIST | 372 INCHES |
| B. LENGTH | 123 INCHES |
| C. WIDTH | 105 INCHES |
| D. HEIGHT OF LOAD | 42 INCHES |
| 3. LOADED WITH GRAVEL 51, LIFTED OFF SURFACE 116 | |
| A. CIRCUMFERENCE AT WAIST | 348 INCHES |
| B. LENGTH | 113 INCHES |
| C. WIDTH | 94 INCHES |
| D. HEIGHT OF LOAD | 59 INCHES |

Each of the corners 101-2 through 104-2 extends vertically beyond the load line 127 for a further vertical distance TS to a flap line 173 (see dash-dash lines in FIGS. 3 and 38). The vertical distance TS between the load line 127 and the flap line 173 defines the height of the transition section 163. Each of the corners 101-2 through 104-2 stops, or terminates, at the flap line 173 at a point 184A in FIG. 12D. As shown in FIG. 4, the transition section 163 provides a four-sided enclosure 174 extending vertically from the tops of the walls 91-2 through 94-2 (above the loaded bulk cargo 51) to the flaps 107-2 for increasing the security of the containing of the bulk cargo 51 in the container 63-2. Such transition section 163 may be referred to as a "transition-containment section", because it extends vertically beyond each of the respective first, second, third, and fourth walls 91-2 through 94-2 and has a respective one of the corners 101-2 through 104-2, and because, as described below, it cooperates with the flaps to securely contain the bulk cargo 51 in the container 63.

Considering the two three dimensional enclosures 171 and 172 shown in the loading frame 59 in FIGS. 2 through 7 which define the container 63-2, after such container 63-2 is loaded (FIG. 4) with the bulk cargo 51 (to the load line 127, FIG. 2), the respective first, second, third, and fourth flaps 107A, 107B, 107C and 107D of each of the enclosures 171 and 172 are still draped over the horizontal top frame 120. As shown in FIG. 4, the first flap 107A is then pulled across the container 63-2 from the first wall 91-2 over the loaded bulk cargo 51 toward and to the second, opposite wall 92-2.

Figure 12B:
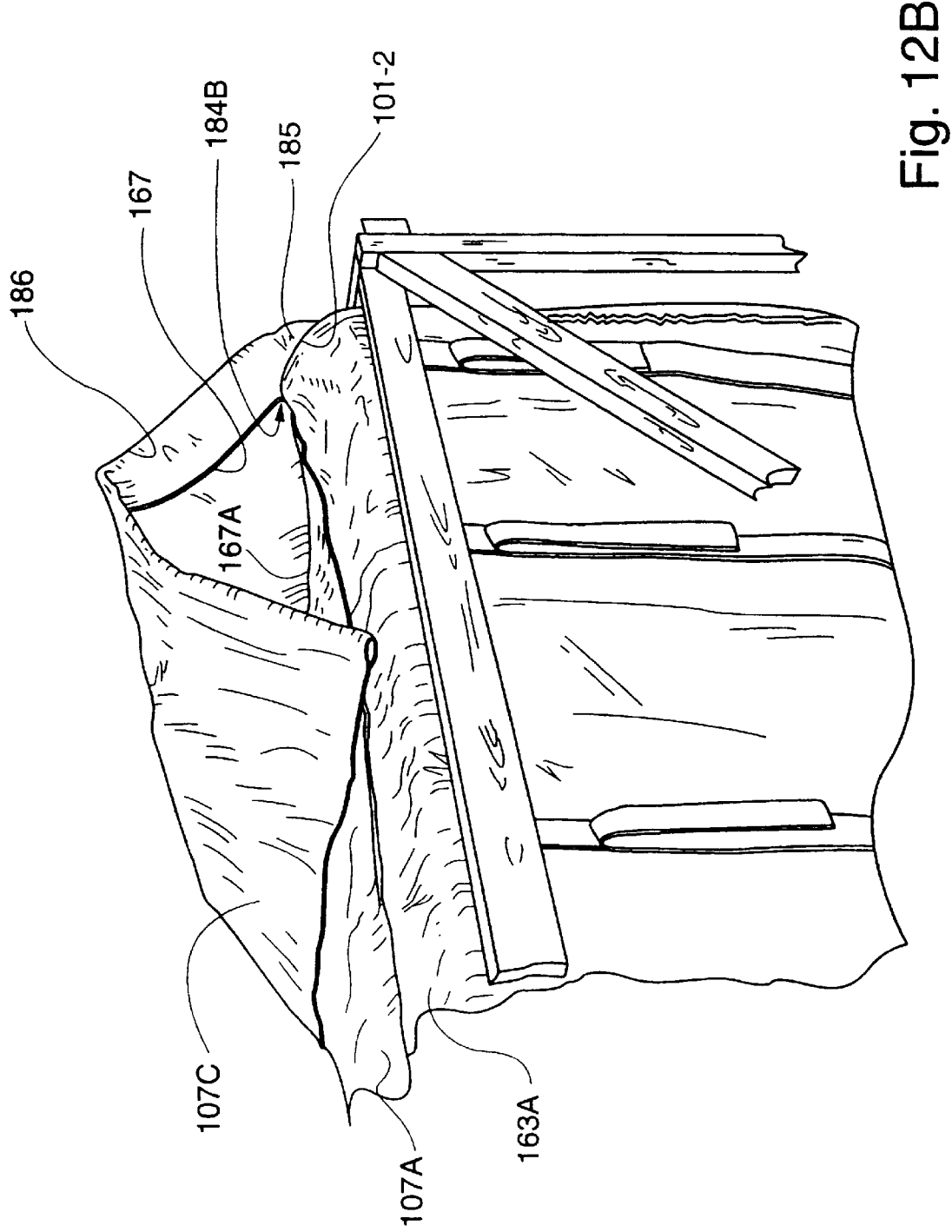
Figure 12C:
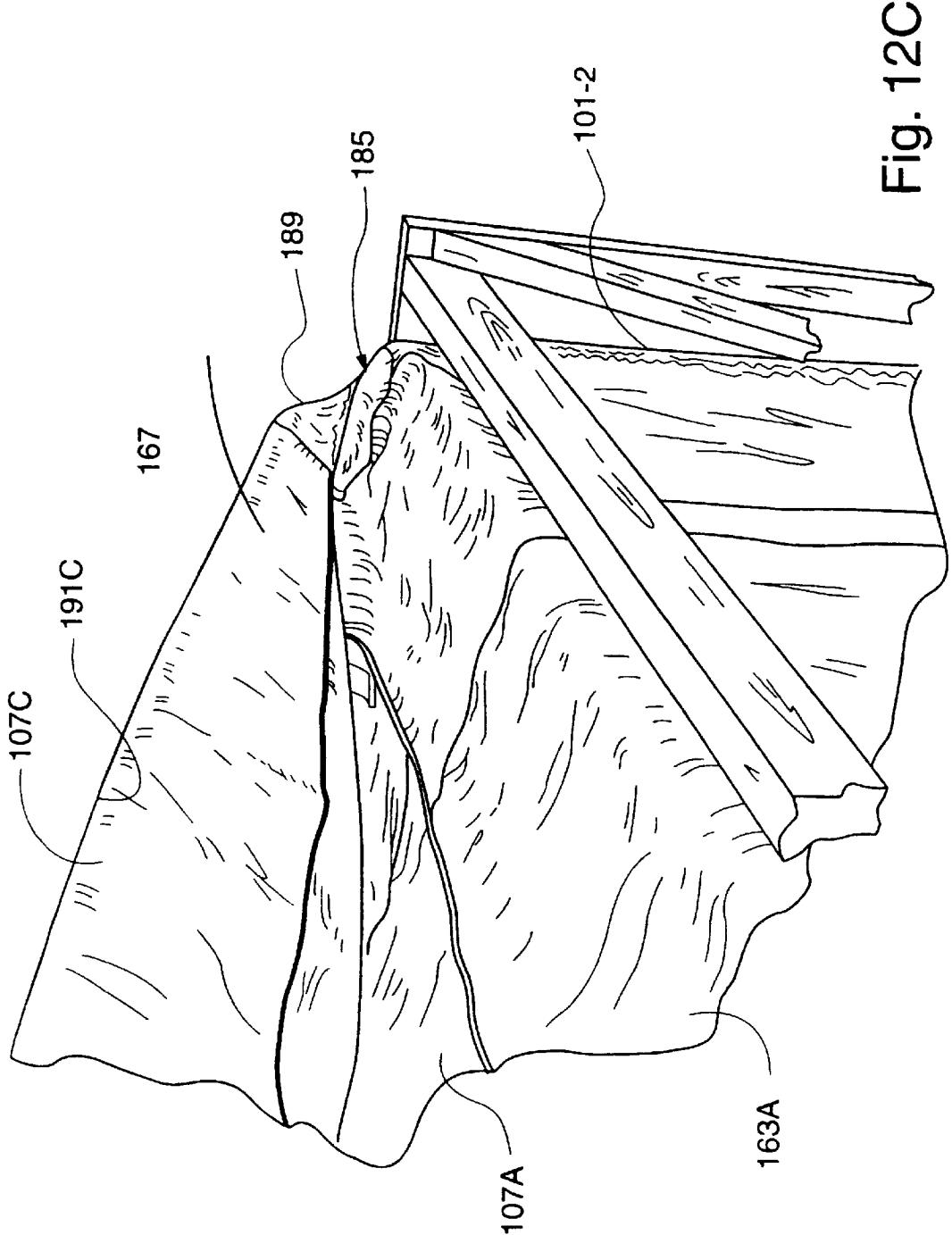
Figure 12D:
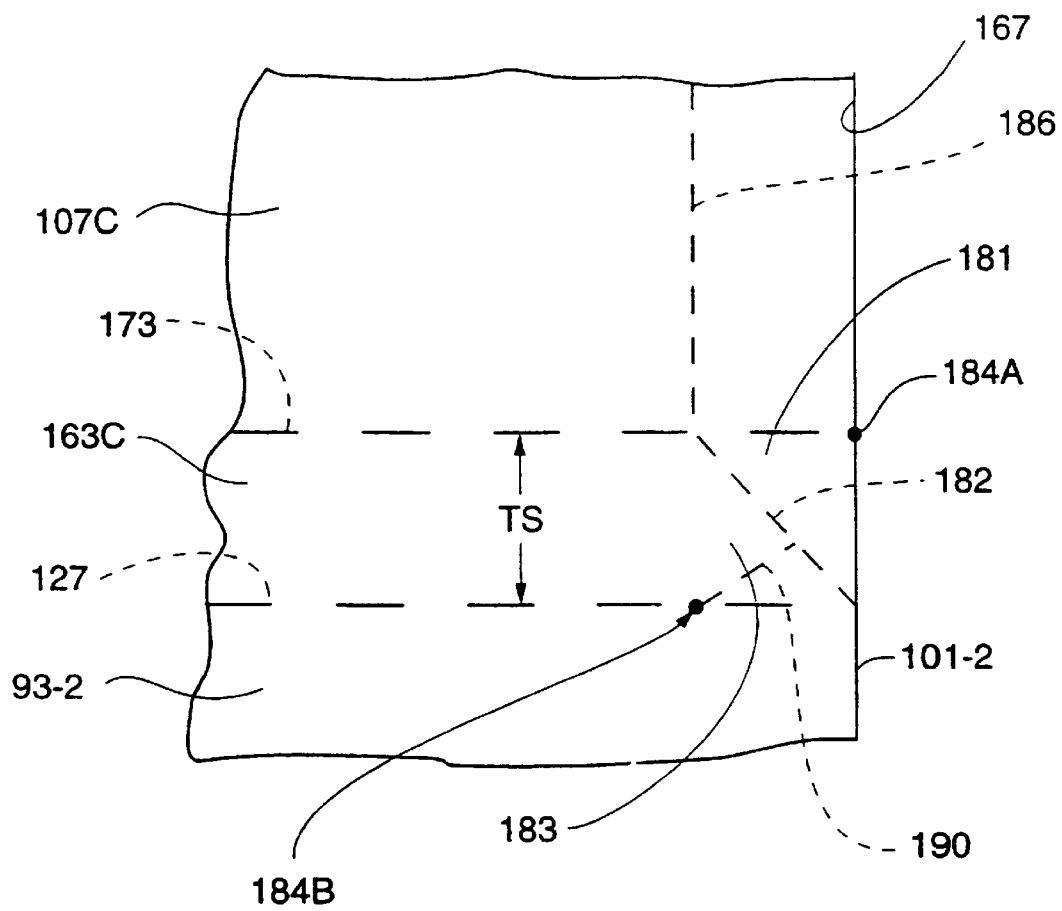
Figure 12E:
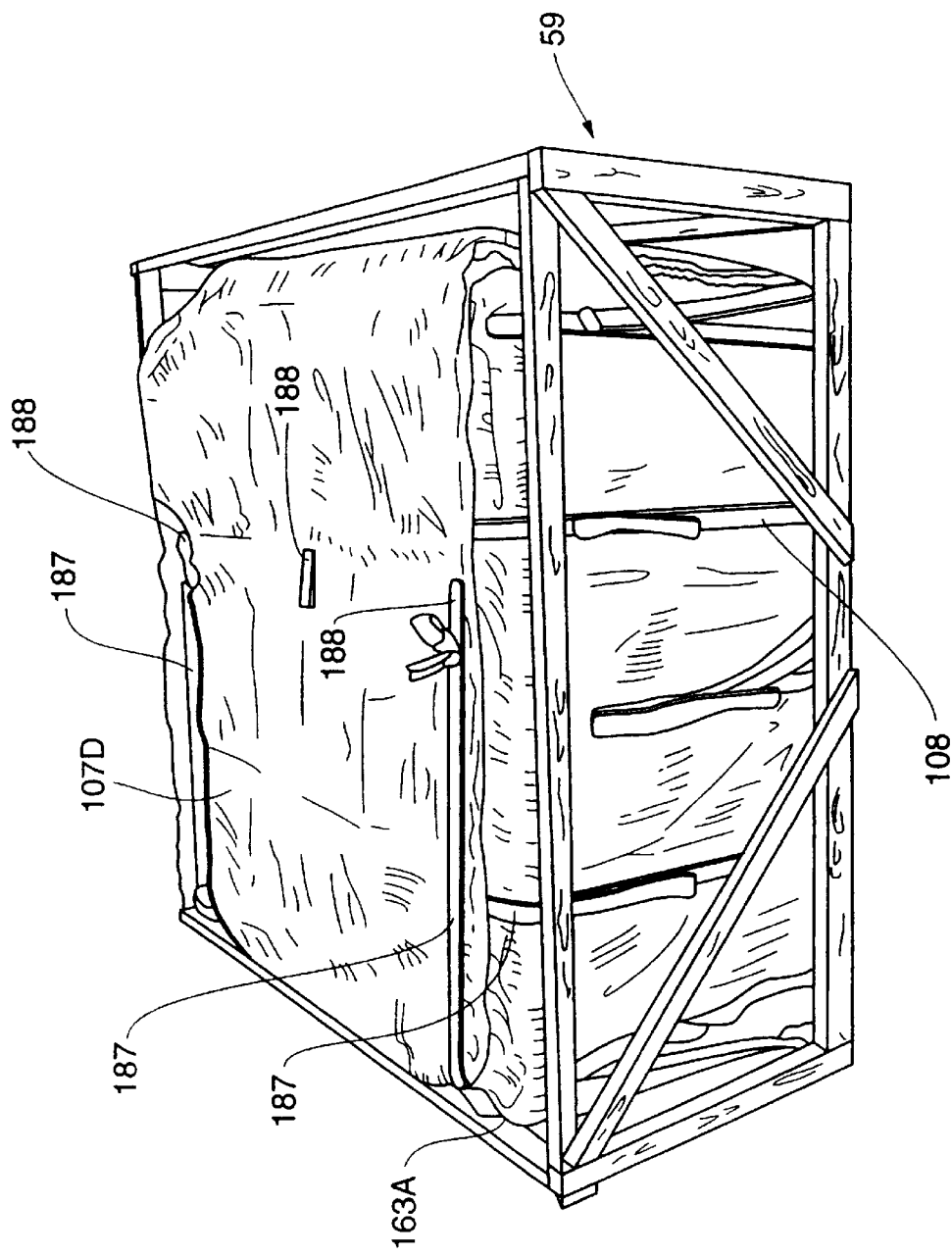

This pulling tightens a first side 163A (FIGS. 4 and 38) of the transition section 163 that is attached to the first flap 107A. Referring to FIGS. 12A through 12D, in response to such tightening, such first side 163A bends (e.g., along the load line 127 for a normal load of bulk cargo 51). The first side 163A extends over the load of the bulk cargo 51. Considering one of the corners 101-2 adjacent to the flap 107A, the first side 163A folds a part 181 of the third side 163C of the transition section 163 onto itself along a tuck fold line 182 (FIG. 12D). When the first side 163A is horizontal on the bulk cargo 51 (FIGS. 12B and 12C), the part 181 is completely folded onto a second part 183 of the section 163C. The second part 183 remains vertical with the flap 107C still draped over the top frame 120 of the loading frame 59. Also, the point 184A at the top of the corner 101-2 moves with the first side 163A to a location 184B (FIGS. 12A and 12B). This part 181 folded onto the part 183 forms a tuck 185 adjacent to the corner 101-2. The edge 167 of the flap 107C moves with the point 184A and folds the flap 107C along a flap fold line 186. With the opposite sides 167A of the first flap 107A extending completely across the width W of the container 63-2, and with the first flap 107A extending all the way to the second (opposite) wall 92-2, the first flap 107A is tied to the second wall 92-2 by tying ties 187 to loops 188 (FIG. 12E). Upon completion of the tying, the load of bulk cargo 51 is tightly contained along the first wall 91-2. The tuck 185 permits the opposite edges 167A of the flap 107A to touch, or at least extend very close to, the adjacent third and fourth walls 93-2 and 94-2, respectively, along the load line 127 (assuming a normal load of the bulk cargo 51 in the container 63-2).

Figure 5:
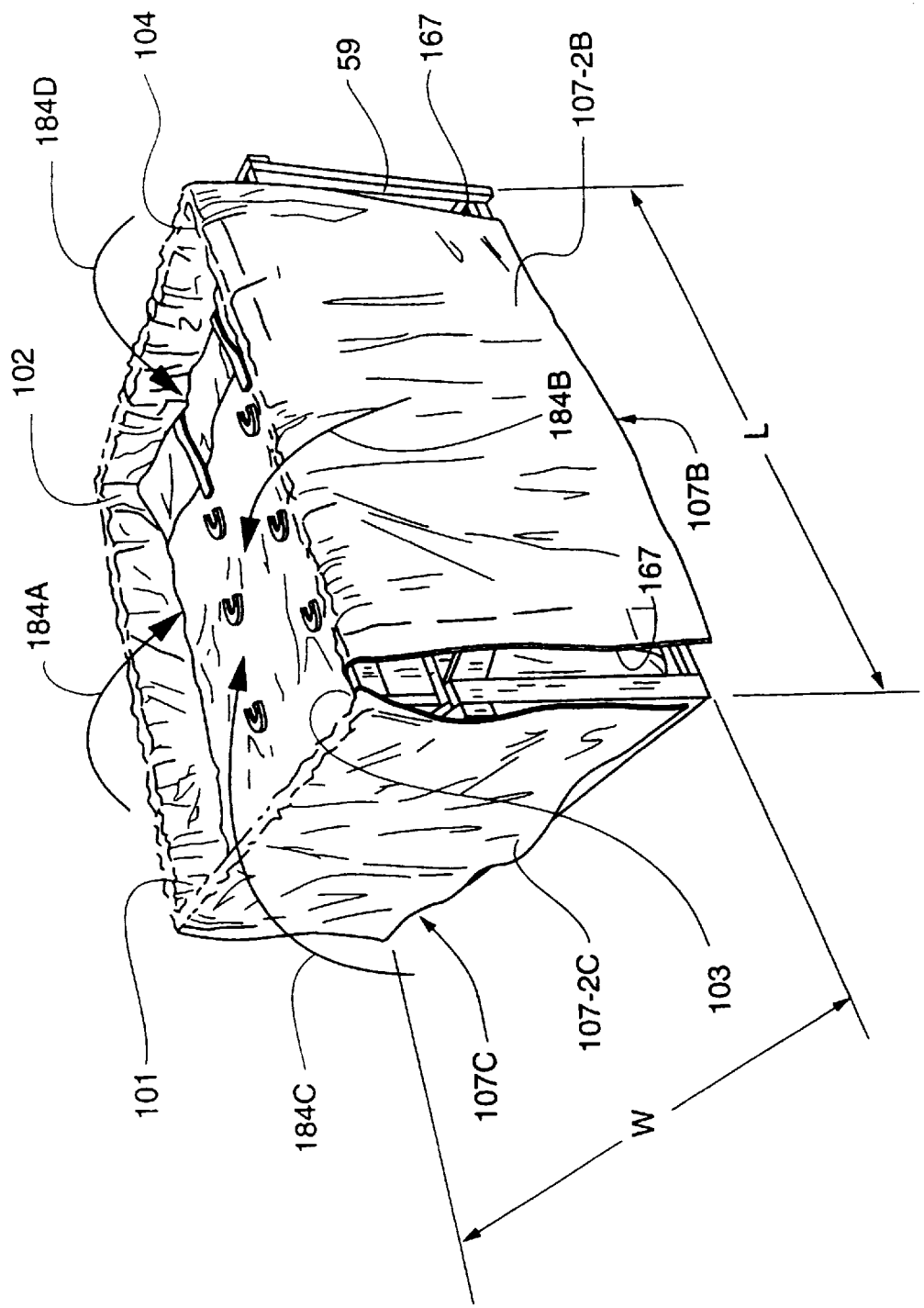
FIGS. 5 and 6 are perspective views of the second embodiment of the system of the present invention showing other flaps of the container being folded over the loaded bulk cargo to close a top of the container.
Figure 6:
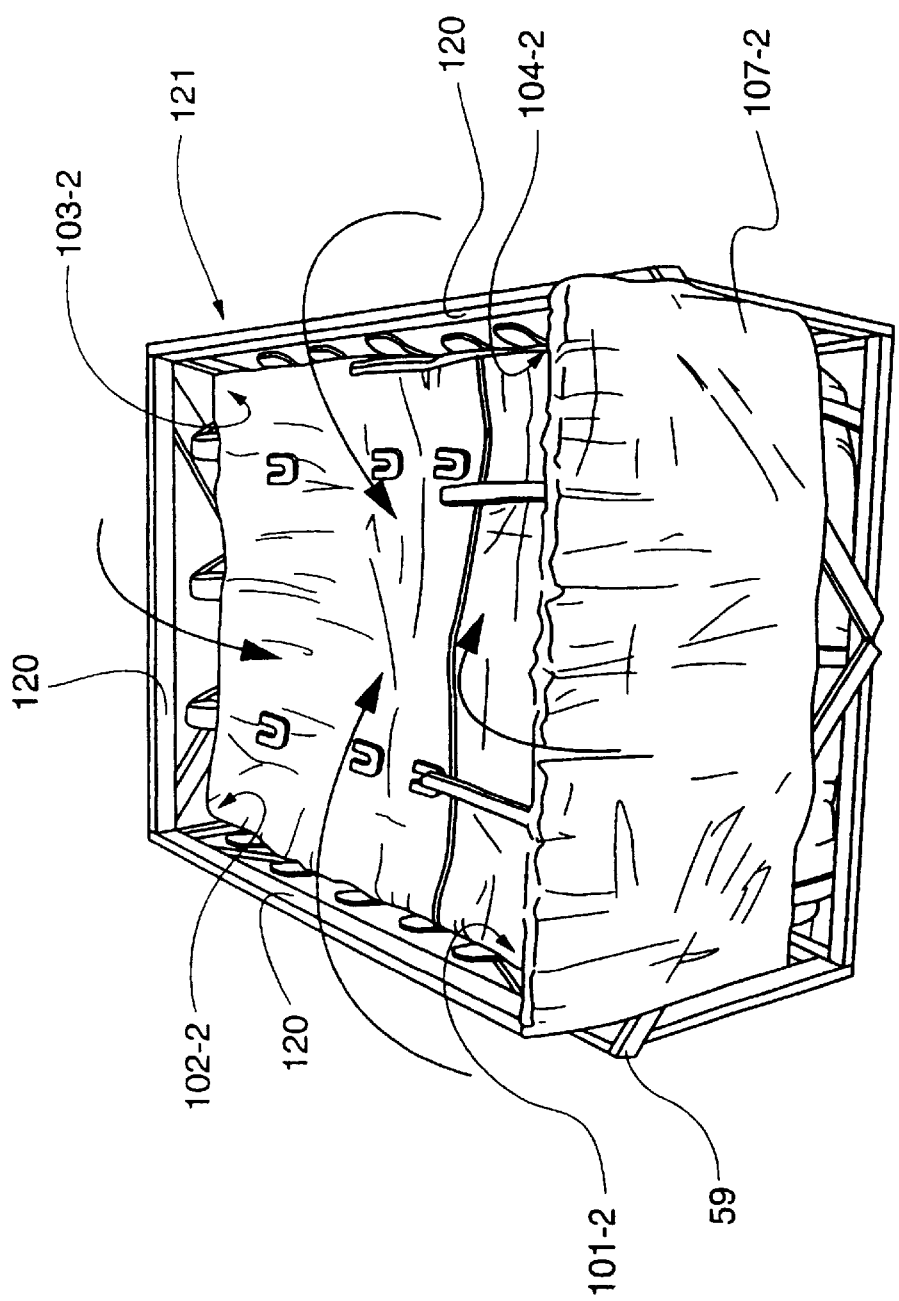

As shown by arrows 184 in FIG. 5, after folding the first flap 107A (arrow 184A), the folding process is repeated with the second flap 1072 (arrow 184B). Thus, the second flap 107B is then pulled across the container 63-2 from the second wall 92-2 over the first flap 107A toward and to the first, opposite wall 91-2. This pulling bends a second side 163B (FIG. 38) of the transition section 163 that is attached to the second flap 107B. In response, such second side 163B folds over the first flap 107A. The same procedure results in a tuck 185B (not shown) at the corner 103-2.

With the opposite sides 167 of the second flap 107B extending completely across the width W of the container 63-1, and with the second flap 107B extending all the way to the first opposite wall 91-2, and with tucks 185C and 185D at each opposite corner 103-2 and 104-2, the second flap 107B is tied to the first wall 91-2 in the same manner as the flap 107A. The bulk cargo 51 is thereby tightly contained along the second wall 92-2 and around the second wall 92-2 to the adjacent third and fourth walls 93-2 and 94-2, respectively.

Referring to FIGS. 12A through 12E, the third flap 107C has been draped over the top frame 120 of the loading frame 59. The third flap 107C is then pulled across the container 63 and extends over the first and second flaps 107A and 107B, respectively. The third flap 107C bends the transition containment section 163C on the load line 127 (FIG. 12D) so that the section 163C also extends over the first and second flaps 107A and 107B, respectively. The bent section 163C bends a portion 189 (FIG. 12C) of the tuck 185A ninety degrees along a second tuck bend line 190 (FIG. 12D) so that the portion 189 is over the now horizontal transition section 163A, holding the tuck 185A closed. The flap 107C now has a folded edge 191C. The flap 107C extends across the length L of the container 63 to further close the top 88.

This process is repeated with the fourth flap 107D to hold the tucks 185C and 185D closed at the respective opposite corners 103-2 and 104-2.

It may be understood that the four tucks 185, one at each of the corners 101-2, 102-2, 103-2, and 104-2, contribute to such tight containment of the bulk cargo 51 because the tucks 185A and 185B at the respective first and second corners 101-2 and 102-2, for example, allow the first flap 107A to extend for the full extent of its width across the entire width W of the container 63-2 and to thus engage the bulk cargo 51 across the full width W of the container 63-1.

With this description in mind, it may be understood that for the three dimensional enclosure 87 made from the laminated sheet 153, the above folding and closing process is performed once, whereas for the multi-sheet embodiment using the inner sheet 154 and the outer sheet 156, the flaps 107 of the inner enclosure 171 are folded and tied, and then the flaps 107 of the outer enclosure 171 are folded and tied.

It may be understood, then that the flaps 107 serve to assist in defining the shape of the container 63. The flaps 107, with the ties 187 and the loops 188, also serve to hold the tucks 185 closed. The tucks 185 thus serve to seal closed the top of each of the corners 101 through 104, assisting in retaining the bulk cargo 51 in the container 63. Thus, by tightly closing the open top 88, the flaps 107, with the ties 187, the loops 188, and the tucks 185 serve to contain the bulk cargo 51 and additionally serve to prevent environmental conditions, such as rain and snow, from entering the container 63.

The three dimensional configuration of the three dimensional container 63-3 shown in FIG. 40 is of the third embodiment of the container-lifter 62-2. Each of the corners 101-3 through 103-3 extends up from the bottom 106-3 for a vertical distance just past the load line 127-3 (see dash-dash line in FIG. 40). The load line 127-3 provides a general indication as to the height to which the bulk cargo 51 should be loaded within the container 63-3. The indication is general because, for example, with a very dense bulk cargo 51 (density above eighty pounds per cubic foot), the container 63-3 may be considered "loaded" even though the bulk cargo 51 has not reached the load line 127-3. Chart II identifies dimensions of the third embodiment of the container-lifter 62-3, for example.

CHART II

DIMENSIONS OF CONTAINER-LIFTER 62-3

1. STANDING IN LOADING FRAME 59, NOT LOADED

| | |
|---|---|
| A. CIRCUMFERENCE AT WAIST | 360 INCHES |
| B. LENGTH | 96 INCHES |
| C. WIDTH | 84 INCHES |
| D. DEPTH (SURFACE 116 TO TOP 120) | 60 INCHES |
| E. DEPTH (SURFACE 116 TO LOAD LINE 127) | 54 INCHES |

2. LOADED WITH GRAVEL 51, AT REST ON SURFACE 116

| | |
|---|---|
| A. CIRCUMFERENCE AT WAIST | 370 INCHES |
| B. LENGTH | 118 INCHES |
| C. WIDTH | 98 INCHES |
| D. HEIGHT OF LOAD | 54 INCHES |

3. LOADED WITH GRAVEL 51, LIFTED OFF SURFACE 116

| | |
|---|---|
| A. CIRCUMFERENCE AT WAIST | 358 INCHES |
| B. LENGTH | 103 INCHES |

CHART II-continued

DIMENSIONS OF CONTAINER-LIFTER 62-3

| | |
|---|---|
| C. WIDTH | 90 INCHES |
| D. HEIGHT OF LOAD | 56 INCHES |

It is noted that the height of the load is shown as fifty four inches, as compared to the forty two inch height of the second embodiment 50-2. The fifty four inch height offsets the smaller length and width dimensions of the third embodiment 50-3 example, as compared to the second embodiment 50-2.

Embodiments of Lifter 64

The lifter 64 of the container-lifter 62 may be secured to the container 63. The first embodiment of the lifter 64-1 (shown in FIGS. 1A, 27, 28, and 29) may include eight straps 108-1 in the first set of straps 111-1, each strap 108-1 having the length LS1 (FIG. 28) greater than twice the height H plus the length L. The second embodiment of the lifter 64-2 may include the first set 111-2 (FIGS. 18 and 19) having the five straps 108-2 and the second set 112-2 including the three straps 108-2. The third embodiment of the lifter 64-3 may include the first set 111-3 (FIGS. 18 and 19) having the five straps 108-3 and the second set 112-3 including the four straps 108-3.

At the free end 115 of each strap 108 the coupling 114 is provided to facilitate connection of each strap end 115 to one of the connectors 73 of the lift grid 58. Such strap couplings 114 are made by forming a loop of the strap 108 and sewing opposite sides of the loop together using filament twisted bonded/polyester thread 118. In a preferred embodiment of the present invention, such thread is T 135 thread sold under the brand name "ANEFIL" by A and E of Mount Holly, N.C. The thread is sewn with four and one-half stitches per inch per each of two needles. This method of forming the coupling 114 provides the loops with greater strength than the unlooped lengths of the straps 108, such that there is no weakening of the straps 108 due to forming the loops 114.

For each embodiment of the container-lifter 62, the straps 108 may be made from single ply, seat belt webbing 132 woven from Nylon threads. Such straps 108 have a width of two inches and a thickness of fifty mils, for example. Such straps 108 have a rated (maximum) tensile strength of 6,500 pounds. Each such strap 108 is sewn to the respective walls 91 through 94 and bottoms 106 along the continuous paths P1 and P2 described above. The sewing may be performed using the T 135 thread 118 described above. The sewn connection between the straps 108 and the respective sheets 153 and 156 secures each of the straps 108 in place at the desired spacing SS1 and/or SS2 from the other straps and from the corners 101 through 104. The thread itself adds to the load-lifting capacity of the container-lifter 62.

In the first and second embodiments of the container-lifter 62, to provide a rated lifting capacity of the container-lifter 62 of ten tons (twenty-thousand pounds), for example, eight straps 108-3 may be used and secured to the walls 91 and 92 in embodiment 62-1. Five straps may be secured to the walls 91 and 92, and three straps 108-2 may be secured to the walls 93 and 94 in embodiment 62-2.

In the third embodiment of the container-lifter 62-3, to provide a rated lifting capacity of the container-lifter 62-3 of twelve tons, for example, five straps 108-3 are secured to the walls 91 and 92, and four straps 108-3 to the walls 93 and 94. The straps are spaced from the corners 101-3 through 104-3, as described above, and provide eighteen strap ends 115.

For a desired three to one safety rating of the first and second embodiments, the ten ton load results in a sixty-thousand pounds rated load. Thus, the total of the rated vertical lifting forces 74 applied to each of the sixteen strap ends 115 is 3,750 pounds. With each strap 108 having a rated capacity of 6500 pounds, and sixteen strap ends 115 receiving the vertical lifting forces 74, the eight straps 108 are at least 1.7 times stronger than required to provide the three to one safety ratio.

For a desired three to one safety rating of the third embodiment, the twelve ton load results in a twenty four thousand pound rated load. Thus, the total of the rated vertical lifting forces 74 applied to each of the eighteen strap ends 115 is 1333 pounds. With each strap 108-3 having a rated capacity of 6500 pounds, and eighteen strap ends 115 receiving the vertical lifting forces 74, the nine straps 108-3 are at least 1.6 times stronger than required to provide the three to one safety ratio.

Another aspect of efficient transport is provided by having the lift-liner straps 108 connected to the load-carrying container 63 spaced by the even spacings SS1 and SS2. This assures an even, uniform, distribution of the lifting forces 74 to the bottom 106 of the container 63.

It may be understood, then, that the straps 108, via the free ends 115 and the couplings 114, receive the vertical forces 74. Further, the straps 108, via the sewn threads 118, transfer some of the vertical forces 74 to the walls 91 through 94. The straps 108, via the continuous paths P1 and P2, also assist the walls 91 through 94 in containing the bulk cargo 51 horizontally (i.e., increase the resistance of the walls 91 through 94 to horizontal bursting). The walls 91 through 94 transfer the vertical forces 74 to the bottom 106 and assist the bottom in bearing the weight of the bulk cargo 51. At the outer bottom perimeter 194 (FIG. 8) of the container 63, the walls 91 through 94 and the outer straps 108-2-OLC and 108-2-ORC (FIG. 18) serve to support the portions of the bottom 106 that are outside of the areas A3.

Also, the straps 108, extending in the continuous paths P1 and P2 from the couplings 114 and along the walls 91 through 94, serve to transfer the vertical forces 94. The straps 108 then extend across the bottom 106, where they serve to define the grid 119. The grid 119 serves to create the areas A3 which are smaller than the entire area (W times L) of the bottom 106. The straps 108 of the grid 119 apply the vertical forces 74 to the bottom 106. The straps 108 defining the grid 119 thus serve to surround each area A3 of the bottom 106 and serve to apply those forces 74 uniformly to the bottom 106.

Closing the Lifter 64-3

FIG. 40 shows the lifter 64-3, provided with ties 187-3 and loops 188-3 to secure flaps 107-3 tightly closed over any container 63-3 (not shown) with which the lifter 64-3 may be used. A web 200-3 may be secured to each of the respective second side 93-2 (or side B) and third side 94-3 (or side C) at the edge of the respective flap 107-3. For example, the web 200-3 may be a one inch wide web that is one-hundred forty-four inches long so as to extend completely across the ninety-six inch length L of the lifter 64-3 to facilitate tying the web 200-3 to the loop 188-3 that is adjacent to the corner 103-3.

FIG. 40 shows four flaps, designated 107-3A, 107-3B, 107-3C, and 107-3D. To tightly tie the flap 107-3D over the inner container 63, the flaps 107-3 are folded in the sequence A, B, C, and D as shown in FIGS. 41A through 41D. The flap 107-3A is pulled across between the open flaps 107-3B and 107-3C (which are shown cut-away for clarity). The flap 107-3A fully covers the container 63-3 within the lifter 64-3. As shown in FIG. 41B, the flap 107-B is pulled to the right to partially cover the container 63-3 within the lifter 64-3. The flap 107-3B is provided with a first web 200-3B that may be twelve feet long and one inch wide. The first web 200-3B is secured to the flap 107-3B at the mid-point of the edge of the flap 107-3B, and is pulled across the lifter 64-3 and secured to a loop 188-3 that is adjacent to the corner 103-3. The corner 103-3 is between the flap 107-3D and 107-3C. One of the tucks 185 described above for the container 63-3 is also formed in the lifter 64-3 as the flaps 107-3A and 107-3B are pulled across, and the first web 200-3B holds the tuck 185 closed.

In FIG. 40, the top of the transition section 163-3 is defined by dash dash lines 199 which are at the corners 102-3 and 104-3 and designate the height to which the corners 102-3 and 104-3 are sewn. The dash dash lines 199 may, for example, be seventy two inches from the bottom. As shown in FIG. 40, the corners 103-3 and 101-3 are sewn to a height of sixty inches above the bottom. The corners 102-3 and 104-3 at the seventy two inch sewn height provide eighteen inches of material above the load line 127-3 with which to form the tucks 175 at the corners 102-3 and 104-3. The eighteen inch value provides a large tuck 175 at each corner 102-3 and 104-3 so that the tucks 175 remain secure even though the leading edge 107-3AL of the flap 107-3A is not tied to any opposing surface or structure.

As shown in FIG. 41C, the flap 107-3C is pulled across in the opposite direction between the flaps 107-3A and 107-3D to partially cover the container 63-3 within the lifter 64-3. The flap 107-3C is provided with a second web 200-3C that may be twelve feet long and one inch wide. The web 200-3C is secured to the flap 107-3C at the mid-point of the edge of the flap 107-3C, and is pulled across the lifter 64-3 and secured to a loop 188-3 adjacent to the corner 101-3. The corner 101-3 is between the flaps 107-3D and 107-3B. One of the above-described tucks 185 is also formed in the lifter 64-3 as the flap 107-3C is pulled across, and the second web 200-3C holds this tuck 185 closed.

As shown in FIG. 41D, the flap 107-3D is pulled across in the direction opposite to that of the flap 107-3A, such that two tucks 185 are formed at the corners 101-3 and 103-3. Flap 107-3D is provided with two series of loops 188D1 that extend parallel to the edge 201 of the flap 107-3D. One series is at the edge of the flap 107-3D, and one series is spaced from such edge. The wall 91-3A is provided with five webs 187-3, each such web 187-3 being aligned with one of the loops 188D1 that are attached to the flap 107-3D. The flap 107-3D is held in position across the lifter 64-3 by tying each of the webs 187-3 of the flap 107-3A to one of the loops 188D1. Depending on the amount of bulk cargo 51 that is in the lifter 64-3, the loops 188D1 that are used are either one or the other of the series of loops 188D1. The flap 107-3D is also provided with two series of loops 188D2L and 188D2R that extend perpendicular to the edge 201 of the flap 107-3D. One series 188D2L is near the left edge 202 of the flap 107-3D, and one series 188D2R is near the right edge 203 of the flap 107-3D. The walls 92-B and 92-C adjacent to the straps 108-3 have webs 187-3B and 187-3C secured thereto. One of the webs 187-3B is tied to one of the loops 188D2L, and one of the webs 187C is tied to one of the loops 188D2R.

The webs 200-3B and 200-3C, in cooperation with the webs 187-3A, 187-3B and 187-3C, serve to hold the tucks 185 in place as the respective flaps 107-3 are pulled across the lifter 64-3.

Lifting The Container-Lifter 62

The container 63 and the lifter 64, constructed as described above with the straps 108 secured to the container 63, have shape characteristics described both at-rest on the support surface 116 and during lifting of the bulk cargo 51. At rest on the surface 116, the container 63 is bowed out at the waist 196, with the load contained by the sheet 1S3 or the sheets 154 and 156 that form the container 63. As the fully-loaded container-lifter 62 is lifted by the lift grid 68, the connectors 73 (vertically above the loops 114 at the free ends 115 of the straps 108) cause the straps 108 to apply the vertical lifting forces 74 to the walls 91 through 94 of the container 63 and to the bottom 106. The load of the bulk cargo 51 settles in the container 63 as the bulk cargo 51 slides along the smooth inside surface 160. The settling tends to cause the walls 91 through 94, and the straps 108 secured to the walls, to become vertical; and the bottom 106 to assume a bowed shape (FIGS. 10 and 13B). The final shape assumed by the bottom 106 and the walls 91 through 94 (and the straps 108 along the walls) is determined by (i) a balance between resistive forces applied horizontally and inwardly by the walls 91 through 94 and by the straps 108 along the walls, e.g., at a waist 196 of the container 63 (which forces resist the tendency of the bulk cargo 51 to move horizontally), and (ii) the vertical forces 74 which the straps 108 apply across the bottom 106.

The placing of the loaded and lifted container-lifter 63 depends on whether further transport is next, or whether the storage cell is the next location for the container-lifter 62. If the container-lifter 62 has just been loaded at a remediation site, for example, and the site is not rail-served, the container-lifter 62 would be placed in a dump truck or a semi-trailer truck depending on the room available. If the site is rail-served, the container-lifter 62 would be placed in the gondola car 53 shown in FIG. 1A. With the lift-liner 62 vertically aligned with the top opening of the car 53 or the truck 136, the crane 66 or fork lift truck 67 lowers the lift grid 58, and hence the loaded lift-liner 62, until the bottom 106 rests on the floor of the vehicle. The loops 114 of the straps 108 are then removed from the connectors 73 of the lift grid 58, and the lift grid 58 is raised.

The foregoing description of the present invention illustrates and describes the invention and is not intended to limit the invention to the form disclosed herein. The embodiments disclosed are intended to describe the best modes known of practicing the invention and to enable those skilled in the art to use such invention in such or other embodiments. It is intended that the appended claims define the invention and be interpreted so as to include alternative embodiments to the extent permitted by the prior art.

What is claimed is:

1. A bulk cargo unit container-lifter comprising:
 a flexible container made from sheet-like material that defines a tree dimensional enclosure having an open top, a length, a width, and a container height; the open top being defined by a perimeter at the container height; the width being defined by first and second opposite walls, the length being defined by third and fourth opposite walls; the container having at least one bottom between the first, second, third, and fourth walls; the at least one bottom being a continuous uncut extension of at least the respective first and second walls or the respective third and fourth walls; and
 a lifter for the container, the lifter comprising at least five straps formed separately from the container, each of the straps having opposite strap ends provided with a separate first and second connector loop and a continuous uncut length between the strap ends, each of the at least five straps having a length greater than twice the height plus the length, the at least five straps being arranged uncut and extending in a continuous path in a uniformly spaced parallel relationship along and being secured to the first wall and to the at least one bottom and to the second wall with the respective first and second connector loops and the corresponding strap ends extending away from the perimeter and spaced from the respective first and second walls;

the lifter further comprising at least four further straps in addition to the at least five straps; the at least four further straps each being formed separately from the container, each of the at least four straps having opposite strap ends provided with a separate first and second connector loop and a continuous uncut length between the strap ends, each of the at least four straps having a length greater than twice the height plus the length, the at least four further straps being arranged uncut and extending in a continuous path in a uniformly spaced parallel relationship along and being secured to the third wall and to the at least one bottom and to the fourth wall with the respective first and second connector loops and the corresponding strap ends extending away from the perimeter and spaced from the respective third and fourth walls;

the connection to the at least one bottom of the at least five straps and of the at least four straps being to arrange the respective at least five straps and the at least four straps in the respective spaced parallel relationships and extending into intersection with each other across bottom to define a grid of continuous uncut separate straps secured to the continuous uncut at least one bottom;

the respective first and second connector loops of the lifter being able to receive an aggregate of at least eight tons of vertical lifting force and via the at least nine straps associated with the respective connector loops to apply to the container at least eight tons of lifting force;

said container being made from material capable of containing and lifting bulk cargo weighing more than eight tons when the straps collectively apply the at least eight tons of lifting force to the container to lift the container from a support surface.

2. A bulk cargo unit container lifter according to claim 1, further comprising:

the walls of the flexible container defining four elongated corners; and each of the at least five straps and each of the at least four further straps being spaced from all of the elongated corners and extending in the respective continuous paths to and along and secured to the at least one bottom into the intersections with each other to define at least twenty strap crossings on the at least one bottom and adjacent to the respective corner;

the strap ends of the at least nine straps collectively being capable of applying to the container a lifting force of at least twelve tons.

3. A bulk cargo unit designed to contain and support a cargo unit in the range of about eight to twelve tons when lifted above a support surface, comprising:

at least one sheet defining a three dimensional open top container having a length, a width, and a height; the width being defined by first and second opposite walls, the length being defined by third and fourth opposite walls; the at least one sheet defining at least one bottom between the first, second, third and fourth walls, the at least one bottom being a continuous uncut extension of at least the respective first and second walls or the third and fourth walls; and a plurality of straps; the, straps comprising:

a first group of the straps, each of the straps having a length greater than twice the height plus the length, each strap of the first group of the straps extending uncut along a separate continuous path secured to the first wall, and to the at least one bottom, and to the second wall; the continuous paths of each of the straps in said first group being parallel to each other;

a second group of the straps, each of the straps extending uncut along a separate continuous path secured to the third wall and to the at least one bottom and to the fourth wall; the continuous paths or each of the straps in the second group being parallel to each other;

the respective parallel paths of the respective straps of the respective first and second groups intersecting along the at least one bottom to define a plurality of intersections which form a grid of the intersecting straps on the at least one bottom;

a flap extending from one of the walls and dimensioned to extend at least partially across the open top container;

a loop secured to the flap; and at least one web secured to one of the walls and being dimensioned to extend to the loop to secure the flap at least partially across the container.

4. A bulk cargo according to claim 3, further comprising:

the flap extending from the first wall and dimensioned to extend across substantially all of the open ton of the container;

the loop being secured to the flap aligned with one of the straps of the first group of straps; and the at least one web being secured to the second wall adjacent to the strap of the first group of straps, the web being dimensioned to extend to the loop to secure the flap across the container.

5. A bulk cargo unit according to claim 4, further comprising:

the loop being secured to the flap aligned with each of the strays of the first group of straps; and the at least one web being one web corresponding to each or the loops, each of the webs being secured to the second wall adjacent to one of the straps of the first group of straps, each of the webs being dimensioned to extend to a corresponding one of the loops to secure the flap across the open ton of the container.

6. A bulk cargo unit according to claim 3, further comprising the flap extending from the first wall and dimensioned to extend across substantially all of the open top of the container;

the loop being secured to the flap aligned with one of the straps of the second group of straps; and the at least one web being secured to the third wall adjacent to the strap of the second group of straps, the web being dimensioned to extend to the loop to secure the flap across the open ton of the container.

7. A bulk cargo unit according to claim 3, further comprising the loop being secured to the flap aligned with each the strap of the second group of straps; and the at least one web being one web corresponding to each of the loops, each of the webs being secured to the third wall adjacent to one of the straps of the second group of straps, each the web being dimensioned to extend to a corresponding one of the loops to secure the flap across the container.

8. A bulk cargo unit according to claim 3, further comprising the flap extending from the third wall and dimensioned to extend at least partially across the container, the flap having an edge;

a second loop secured to the fourth wall; and a second web secured adjacent to the edge and being dimensioned to extend to the second loop to secure the flap across the container.

9. A bulk cargo unit container-lifter designed to contain and lift a bulk cargo unit having a weight in a range of about eight to twelve tons, the container-lifter comprising:

a flexible container, the flexible container comprising:
a first three-dimensional enclosure having a first closable top opening, a length, a width, and an inside; the enclosure being fabricated from first and second layers, the first layer being made from heavy woven and coated flexible polyethylene sheet-like material; the second layer being on said inside of the enclosure and being made from semi-rigid high density material taken from the group consisting of polyvinylchloride, polyester, polypropylene, and polyethylene;

the width being defined by first and second opposite vertical walls and the length being defined by third and fourth opposite vertical walls;

the container having a first bottom between the first, second, third and fourth walls; the first bottom having a given area;

a first perimeter defined by the walls at a first height from the bottom and defining a bulk cargo load limit;

the enclosure having first, second, third and fourth flaps extending from the respective first, second, third and fourth walls above the first perimeter to close the first closable top opening; and a lifter secured to the flexible container, the lifter comprising:

at least nine straps formed separately from the first enclosure, at least five of the at least nine straps each having an uncut length greater than twice the height plus the length, at least four of the at least nine straps having an uncut length greater than twice the height plus the width, each of the at least five straps extending in a respective first continuous uncut path along and being secured to the outside of the container, each of the at least five straps in the first continuous path extending along and being secured to the first wall and extending in the first continuous path along and being secured to the bottom and extending in the first continuous path along and being secured to the second wall;

each of the at least four straps extending in a respective second continuous uncut path along and being secured to the outside of the container, each of the at least four straps in the second continuous path extending along and being secured to the third wall and extending in the second continuous path along and being secured to the bottom and extending in the second continuous path along and being secured to the fourth wall, the first and second continuous paths of each of the respective at least five straps and four straps being parallel to each other along the respective first, second, third and fourth walls;

the straps being made from material capable of collectively applying to the container a total lifting force in the range of from about eight tons to about twelve tons.

10. A disposable bulk cargo unit container-lifter according to claim 9, wherein the bulk cargo is radioactive hazardous material waste which is to be stored with the container-lifter, with the container-lifter being designed so that prior to the storage the container-lifter is capable of containing and lifting a bulk cargo unit having a weight in the range, the container-lifter further comprising:

the material being resistant to leakage of radioactive hazardous material waste;

the at least five straps being five straps;

the at least four straps being four straps;

the five straps that extend along and secured to the bottom intersecting the four straps as the four straps extend along and secured to the bottom to define a plurality of strap intersections on the bottom; and the enclosure and lifter being designed to be stored with the radioactive waste.

11. A bulk cargo unit lift-liner container, wherein the bulk cargo is radioactive hazardous material waste having a weight of from about eight tons to about twelve tons, said lift-liner container comprising:

a first flexible container, said first flexible container comprising:
a first three-dimensional enclosure having a closable top opening, a length, a width, an inside, and an outside surface; said enclosure being fabricated from woven, sheet-like material;

the width being defined by first and second opposite walls and the length being defined by third and fourth opposite walls; the container having at least one bottom between the first, second, third and fourth walls;

a first perimeter defined by the walls at a first height from the bottom and defiling a bulk cargo load limit;

a second perimeter defined by the walls and having a second height from the bottom, the second height being greater than the first height; and the first enclosure having first, second, third and fourth flaps extending from the respective first, second, third and fourth walls at the second perimeter;

a second flexible container received in the first enclosure, the second flexible container comprising:
a second three-dimensional enclosure having a second closable top opening, a second length, and a second width; the enclosure being fabricated from high-density polymer, sheet-like material having a smooth surface facing into the second container;

the second width being less than the first width and being defined by fifth and sixth opposite walls;

the second length being less than the first length and being defined by seventh and eighth opposite walls;

the second enclosure having a second bottom between the fifth, sixth, seventh, and eighth walls; the second bottom being dimensioned to overlap the area of the first bottom;

a third perimeter defined by the fifth, sixth, seventh, and eighth walls at the first height;

a fourth perimeter defined by the fifth, sixth, seventh, and eighth walls and having the second height; and the second enclosure having fifth, sixth, seventh, and eighth flaps extending from the respective fifth, sixth, seventh, and eighth walls at the fourth perimeter; the fifth, sixth, seventh, and eighth flaps being foldable over each other to form a tuck between adjacent ones of the respective fifth, sixth, seventh, and eighth flaps and to form a first cover for the bulk cargo unit received in the second enclosure and extending from the second bottom to about the first height;

the first, second, third and fourth flaps being foldable over each other to form a tuck between adjacent ones of the respective first, second, third, and fourth flaps and to form a second cover over the first cover; and a lifter secured to the outside of the first flexible container, the lifter comprising:

at least five first straps, each of the first straps having a length greater than twice the first height plus the first length, the first straps extending in first continuous paths along and being secured to the outside of the first container, each of the first straps in the first continuous paths extending along and being secured to the first wall, each of the first straps in the first continuous paths extending along and being secured to the bottom, each of the first straps in the first continuous paths extending along and being secured to the, second wall; the first continuous paths of each of the first straps being parallel to each other; and at least four second straps, each of the second straps having a length greater than twice the first height plus the first width, the second straps extending in second continuous paths along and being secured to the outside of said first container, each of the second straps in the second continuous paths extending along and being secured to the third wall, each of the second straps in the second continuous paths extending along and being secured to the bottom, each of the second straps in the second continuous paths extending along and being secured to the fourth wall; the second continuous paths of each of the second straps being parallel to each other;

the first at least five straps and the second at least four straps each having opposite strap ends and being made from material capable of receiving at the strap ends a collective maximum total vertical lifting force in the range of about eight to about twelve tons so that the straps collectively apply to the container sufficient force to lift the container containing a bulk cargo unit weighing from about eight tons to about twelve tons off a support surface; and the first and second flexible containers being collectively capable of containing the about eight tons to about twelve tons of radioactive hazardous material waste as the at least five first straps and the at least four second straps lift the container off the support surface.

12. A bulk cargo container-lifter comprising:

a flexible container made from sheet-like material that defines a three dimensional enclosure having an open top, a length, a width, and a container height; the open top being defined by a perimeter at the container height, the enclosure being defined by first and second opposite walls, the length being defined by third and fourth opposite walls; the container having at least one bottom between the first, second, third, and fourth walls, the at least one bottom being a continuous uncut extension of at least the respective first and second walls or the respective third and fourth walls; and a lifter for the container, the lifter comprising at least nine straps formed separately from the container, each of the straps having opposite strap ends provided with a separate first and second connector loop and a continuous uncut length between the strap ends, at least five of the straps being arranged uncut and continuously in a uniformly spaced parallel relationship connected to the first wall and to the bottom and to the second opposite wall with the respective first and second connector loops and the corresponding strap ends extending away from the perimeter and spaced from the respective first and second walls; at least four of the straps being arranged uncut and continuously in a uniformly spaced parallel relationship connected to the third wall and to the bottom and to the fourth opposite wall with the respective first and second connector loops and the corresponding strap ends extending away from the perimeter and spaced from the respective third and fourth walls; the connection to the bottom of the at least five straps and the at least four straps being to arrange the respective at least five straps and the at least four straps in the respective spaced parallel relationships and extending into intersection with each other across the bottom to define a grid of continuous uncut separate straps secured to the continuous uncut bottom; the respective first and second connector loops of the lifter being able to receive at least an aggregate of eight tons of vertical lifting force and via the at least nine straps associated with the respective connector loops to apply to the container at least eight tons of lifting force.

13. A bulk cargo container-lifter according to claim 12, further comprising:

the at least five straps being five straps; and the at least four straps being four straps.

14. A bulk cargo container-lifter according to claim 12, further comprising:

the respective first and second connector loops of the lifter being able to receive from eight to twelve tons of vertical lifting force;

the at least nine straps associated with the respective connector loops being nine straps; and via the nine straps associated with the connector loops the lifter being able to apply to the container from about eight to about twelve tons of lifting force.

15. A bulk cargo container-lifter according to claim 12, wherein the bulk cargo is hazardous material waste that is to be securely contained, the container-lifter further comprising:

a flap corresponding to each of the walls;

a container closure in the form of a transition section connected to each wall at the container height and extending from the respective wall for a transition distance, at the transition distance the transition section being connected to a respective flap, the transition section having four transition corners respectively corresponding to the container corners, the transition distance of the transition section being sufficient to define a tuck at one of the transition corners when the one of the flaps adjacent to the one transition corner is pulled across the open top of the container.

16. A bulk cargo container-lifter according to claim 12, wherein the bulk cargo is hazardous material waste that is to be securely contained, the container-lifter further comprising:

each of the first and third walls, the third and second walls, the second and fourth walls, and the fourth and first walls being respectively sewn together along a line extending parallel to the container height to define respective first, second, third and fourth container corners of the container, each of the container corners extending from the bottom to the perimeter at the container height, the container height defining the intended height of the cargo to be contained by the container;

a first flap having a length about equal to the enclosure length and a cover dimension about equal to the enclosure width;

a second flap having a length about equal to the enclosure length and a cover dimension about equal to the enclosure width;

a third flap having a length about equal to the enclosure width and a cover dimension about equal to the enclosure length;

a fourth flap having a length about equal to the enclosure width and a cover dimension about equal to the enclosure length;

a transition-containment section secured to and extending from each of the first, second, third, and fourth walls for a containment distance to define a containment height spaced from the container height by the containment distance, the section having respective first, second, third, and fourth portions corresponding to and secured to a respective one of the first, second, third, and fourth walls; each of the respective first, second, third, and fourth portions also corresponding to and being secured to a respective one of the first, second, third, and fourth flaps; each of the first and third portions, the third and second portions, the second and fourth portions, and the fourth and first portions being respectively sewn together along a line extending parallel to the containment height to define respective first, second, third and fourth containment corners as extensions of the respective container corners, each of the containment corners extending from the respective wall at the container height to the respective flap at the containment height; the containment distance being sufficient to enable each one of the portions to be capable of folding onto itself to define a tuck when another portion adjacent to the one portion moves with its respective flap across the container over the cargo, so that each of the portions is capable of defining one of the tucks.

17. A bulk cargo container-lifter, comprising:

at least one sheet configured to define a three-dimensional container having a length, a width, and a height; the width being defined by first and second opposite walls; the length being defined by third and fourth opposite walls; the at least one sheet defining a bottom between the first, second, third, and fourth walls; a first corner being defined between the first and third walls; a second corner being defined between the third and second walls; a third corner being defined between the second and fourth walls; a fourth corner being defined between the first and fourth walls; each of the first and the second walls having an upper edge defining two length portions of a container perimeter; each of the third and the fourth walls having an upper edge defining two width portions of the container perimeter;

a first group of at least five straps, each strap of the first group being separate from the container and having a strap length greater than twice the height plus the length; each strap of the first group having ends spaced by the strap length, a coupling loop being provided at each of the ends; each strap of the first group being arranged parallel to the other straps of the first group, substantially equally spaced across the length, and extending uncut, continuously, secured to, and across the first wall, the bottom, and the second wall with the ends extending beyond the container perimeter;

a second group of at least four straps, each strap of the second group being defined separately from the container and having a strap length greater than twice the height plus the width; each strap of the second group having ends spaced by the strap length, a coupling loop being provided at each of the ends of each strap of the second group; each strap of the second group being arranged parallel to the other straps of the second group, substantially equally spaced across the width, and extending uncut, continuously, secured to, and across the third wall, the bottom, and the fourth wall with the respective ends extending beyond the container perimeter;

the straps of the first and second groups of straps being collectively capable of applying to the container a total vertical lifting force of more than about eight tons; and a lift frame having lift connectors arranged along a lift perimeter corresponding to the container perimeter and in spaced relation corresponding to the substantially equal spacings of the straps of the first and second groups of straps across the respective length and width, the correspondence of the lifting perimeter and the container perimeter being effective to enable each of the lift connectors to substantially vertically apply to a respective one of the coupling loops a substantially vertical lifting force, the substantially vertical lifting forces having an aggregate value of more than about eight tons of force.

18. A container for containing between about eight and about twelve toils of bulk cargo to be lifted from a support surface, comprising:

a three dimensional enclosure having two opposite vertical walls and two opposite vertical sides defining an open lop;

the enclosure having a bottom between the opposite sides and opposite walls, the vertical walls and the vertical sides having a top edge defining a load height, a first one of the walls having a first part of the top edge and a second one of the walls having a second part of the top edge; a first one of the sides having a third part of the top edge;

the enclosure having a closure section provided with a first portion connected to the first part of the top edge and a second portion connected to the second part of the top edge and a third portion connected to the third part of the top edge;

adjacent ones of the walls and the sides, and adjacent ones of the portions of the closure section, defining corners of the enclosure, a first of the corners being between the first wall and the first side and between the first portion and the third portion;

a first flap extending from the first part along and secured to the first portion;

a second flap extending from the third part along and secured to the third portion;

the first flap being bendable along a bend line at the top edge to permit the first portion and the first flap to extend toward the opposite wall;

the third portion being foldable along a first fold line extending from the first corner to permit the third portion to fold onto itself and define a first tuck as the first portion and the first flap extend toward the opposite wall;

the second flap being bendable along a bend line at the top edge to permit the third portion and the second flap to extend toward the opposite side;

the third portion being foldable along a second fold line intersecting the first fold line to permit the first tuck to fold onto itself as the third portion extends toward the opposite side.

* * * * *